(12) United States Patent
Anderson et al.

(10) Patent No.: US 7,472,172 B2
(45) Date of Patent: Dec. 30, 2008

(54) METHOD AND SYSTEM TO INITIATE GEOLOCATION ACTIVITIES ON DEMAND AND RESPONSIVE TO RECEIPT OF A QUERY

(75) Inventors: Mark Anderson, Westminster, CO (US); Ajay Bansal, Cupertino, CA (US); Brad Doctor, Broomfield, CO (US); George Hadjiyiannis, Boston, MA (US); Christopher Herringshaw, West Wardsboro, VT (US); Eli E. Karplus, Baden Württemberg (DE); Derald Muniz, Midlothian, TX (US)

(73) Assignee: Quova, Inc., Mountain View, CA (US)

( * ) Notice: Subject to any disclaimer, the term of this patent is extended or adjusted under 35 U.S.C. 154(b) by 0 days.

(21) Appl. No.: 10/686,102

(22) Filed: Oct. 14, 2003

(65) Prior Publication Data

US 2004/0068582 A1 Apr. 8, 2004

Related U.S. Application Data

(63) Continuation of application No. 09/825,675, filed on Apr. 3, 2001, now Pat. No. 6,684,250.

(60) Provisional application No. 60/194,761, filed on Apr. 3, 2000, provisional application No. 60/241,776, filed on Oct. 18, 2000.

(51) Int. Cl.
*G06F 17/30* (2006.01)

(52) U.S. Cl. .................. 709/219; 709/203; 707/10; 707/200

(58) Field of Classification Search .............. 709/206, 709/217, 220, 224, 226, 228, 229, 231, 201, 709/245, 225; 370/351, 352; 707/10, 3, 707/100; 705/10, 14; 701/207; 455/426
See application file for complete search history.

(56) References Cited

U.S. PATENT DOCUMENTS

| 4,939,726 A | 7/1990 | Flammer et al. |
| 5,042,032 A | 8/1991 | Dighe et al. |
| 5,115,433 A | 5/1992 | Baran et al. |
| 5,291,550 A | 3/1994 | Levy et al. |
| 5,418,713 A | 5/1995 | Allen |

(Continued)

FOREIGN PATENT DOCUMENTS

AU PQ 5456 2/2000

(Continued)

OTHER PUBLICATIONS

U.S. Appl. No. 09/541,451, filed Mar. 31, 2000, Parekh, Sanjay, et al.

(Continued)

*Primary Examiner*—Khanh Dinh
(74) *Attorney, Agent, or Firm*—Schwegman, Lundberg & Woessner, P.A.

(57) ABSTRACT

A method and the system perform geolocation activities relating to a network address. A query, including a network address, is received from an external entity at a geolocation system. Responsive to receipt of the query, geolocation activities are initiated at the geolocation system to map the network address to a geographic location.

32 Claims, 64 Drawing Sheets

U.S. PATENT DOCUMENTS

| | | | |
|---|---|---|---|
| 5,421,024 A | | 5/1995 | Faulk, Jr. et al. |
| 5,488,608 A | | 1/1996 | Flammer |
| 5,490,252 A | | 2/1996 | Macera et al. |
| 5,493,689 A | | 2/1996 | Waclawsky et al. |
| 5,636,276 A | | 6/1997 | Brugger |
| 5,659,596 A | | 8/1997 | Dunn |
| 5,734,651 A | | 3/1998 | Blakeley et al. |
| 5,734,823 A | | 3/1998 | Saigh et al. |
| 5,734,891 A | | 3/1998 | Saigh |
| 5,777,989 A | | 7/1998 | McGarvey |
| 5,794,217 A | | 8/1998 | Allen |
| 5,862,325 A | * | 1/1999 | Reed et al. ............... 709/201 |
| 5,870,561 A | | 2/1999 | Jarvis et al. |
| 5,878,126 A | | 3/1999 | Velamuri et al. |
| 5,884,038 A | * | 3/1999 | Kapoor ................. 709/226 |
| 5,930,474 A | | 7/1999 | Dunworth et al. |
| 5,937,163 A | | 8/1999 | Lee et al. |
| 5,944,787 A | * | 8/1999 | Zoken ................. 709/206 |
| 5,944,790 A | | 8/1999 | Levy |
| 5,948,061 A | | 9/1999 | Merriman et al. |
| 5,978,845 A | | 11/1999 | Reisacher |
| 6,009,081 A | | 12/1999 | Wheeler et al. |
| 6,012,052 A | | 1/2000 | Altschuler et al. |
| 6,012,088 A | | 1/2000 | Li et al. |
| 6,012,090 A | | 1/2000 | Chung et al. |
| 6,014,634 A | | 1/2000 | Scroggie et al. |
| 6,035,332 A | | 3/2000 | Ingrassia, Jr. et al. |
| 6,091,959 A | | 7/2000 | Souissi et al. |
| 6,130,890 A | | 10/2000 | Leinwand et al. |
| 6,151,631 A | | 11/2000 | Ansell et al. |
| 6,154,172 A | * | 11/2000 | Piccionelli et al. ....... 342/357.1 |
| 6,154,745 A | * | 11/2000 | Kari et al. ............... 707/100 |
| 6,167,259 A | | 12/2000 | Shah |
| 6,192,312 B1 | | 2/2001 | Hummelsheim |
| 6,236,365 B1 | | 5/2001 | LeBlanc et al. |
| 6,243,746 B1 | | 6/2001 | Sondur et al. |
| 6,249,252 B1 | | 6/2001 | Dupray |
| 6,259,701 B1 | | 7/2001 | Shur et al. |
| 6,272,343 B1 | | 8/2001 | Pon et al. |
| 6,343,290 B1 | * | 1/2002 | Cossins et al. ............. 707/10 |
| 6,356,929 B1 | | 3/2002 | Gall et al. |
| 6,389,291 B1 | * | 5/2002 | Pande et al. ............ 455/456.5 |
| 6,415,064 B1 | * | 7/2002 | Oh ..................... 382/289 |
| 6,442,565 B1 | | 8/2002 | Tyra et al. |
| 6,477,150 B1 | | 11/2002 | Maggenti et al. |
| 6,523,064 B1 | * | 2/2003 | Akatsu et al. ............. 709/226 |
| 6,542,739 B1 | | 4/2003 | Garner |
| 6,665,611 B1 | * | 12/2003 | Oran et al. ............... 701/213 |
| 6,665,715 B1 | | 12/2003 | Houri |
| 6,674,745 B1 | * | 1/2004 | Schuster et al. .......... 370/352 |
| 6,681,232 B1 | | 1/2004 | Sistanizadeh et al. |
| 6,684,158 B1 | * | 1/2004 | Garin et al. .............. 701/213 |
| 6,684,250 B2 | * | 1/2004 | Anderson et al. .......... 709/225 |
| 6,760,775 B1 | | 7/2004 | Anerousis et al. |
| 6,873,854 B2 | | 3/2005 | Crockett et al. |
| 6,904,449 B1 | | 6/2005 | Quinones |
| 6,947,978 B2 | | 9/2005 | Huffman et al. |
| 7,007,228 B1 | * | 2/2006 | Carro .................... 715/513 |
| 7,062,572 B1 | * | 6/2006 | Hampton ................ 709/245 |
| 7,072,963 B2 | | 7/2006 | Anderson et al. |
| 7,100,204 B1 | | 8/2006 | Myllymaki et al. |
| 2002/0078367 A1 | | 6/2002 | Lang et al. |
| 2002/0099955 A1 | | 7/2002 | Peled et al. |
| 2002/0199018 A1 | * | 12/2002 | Diedrich et al. .......... 709/245 |
| 2003/0065763 A1 | | 4/2003 | Swildens et al. |
| 2003/0125021 A1 | * | 7/2003 | Tell et al. ............... 455/426 |
| 2003/0212909 A1 | | 11/2003 | Chandrashekhar et al. |
| 2004/0010571 A1 | | 1/2004 | Hutchinson et al. |
| 2004/0103315 A1 | | 5/2004 | Cooper et al. |
| 2005/0004978 A1 | * | 1/2005 | Reed et al. .............. 709/203 |
| 2005/0138144 A1 | | 6/2005 | Sethi |
| 2005/0198265 A1 | | 9/2005 | Veprek et al. |
| 2006/0010252 A1 | | 1/2006 | Miltonberger et al. |
| 2006/0025158 A1 | | 2/2006 | Leblanc et al. |
| 2006/0128397 A1 | | 6/2006 | Choti et al. |
| 2006/0212601 A1 | * | 9/2006 | Hampton ................ 709/245 |
| 2006/0242072 A1 | | 10/2006 | Peled et al. |

FOREIGN PATENT DOCUMENTS

| | | |
|---|---|---|
| EP | 1039265 A1 | 9/2000 |
| WO | WO9613108 | 5/1996 |
| WO | WO-9613108 A2 | 5/1996 |
| WO | WO-9934305 A1 | 7/1999 |
| WO | WO-9951359 A1 | 10/1999 |
| WO | WO0022495 | 4/2000 |
| WO | WO-0022495 A2 | 4/2000 |
| WO | WO-0029979 A1 | 5/2000 |
| WO | WO0067450 | 11/2000 |
| WO | WO 0067450 | 11/2000 |
| WO | WO-0067450 A1 | 11/2000 |
| WO | WO0157696 | 8/2001 |
| WO | WO0175632 | 10/2001 |
| WO | WO-0175632 A1 | 10/2001 |
| WO | WO 02/13459 | 2/2002 |
| WO | WO-0213459 A2 | 2/2002 |
| WO | WO0217139 | 2/2002 |
| WO | WO-2005086681 A3 | 9/2005 |

OTHER PUBLICATIONS

U.S. Appl. No. 09/632,959, filed Aug. 4, 2000, Parekh, Sanjay.

U.S. Appl. No. 60/132,147, filed May 3, 1999, Parekh, Sanjay M.

U.S. Appl. No. 60/133,939, filed May 13, 1999, Doctor, Brad, et al.

U.S. Appl. No. 60/226,405, filed Aug. 18, 2000, Yerushalmi, Yoav.

"Content Delivery Services: Footprint Streaming Solutions", *Digital Island* San Francisco, CA, 1-4.

"DHCP", internet.com *Webopedia*, www.pcwebopedia.com/TERM/D/DHCP.html, (Dec. 23, 1996),1-2.

"Geographic Location Representation in DNS", www.bovine.net/~jlawson/hmc/dns/location.html, (Mar. 28, 2002),1-3.

"Geographic Routing Project Description", www.cs.Rutgers.edu/~navas/dataman/abstract.html, 1-3.

"ICMP", internet.com *Webopedia*, www.pcwebopedia.com/TERM/I/ICMP.html, (Jul. 28, 1997),1-2.

"Prominent Internet Industry Executives Launch Quova, Provide Internet Intelligence to E-businesses", www.quova.com/pressrelease.cfm., (Sep. 18, 2000),1-2.

"Quova Brings Geography to the Internet with Introduction of GeoPoint 2.0", www.Quova.com/pressrelease.cfm., (Feb. 12, 2001),1-3.

"TraceWare White Paper", *Digital Island* San Francisco, CA, (Jun. 1999),8.

"Using IP Subnet Masks", www.wizard.com/users/baker/public_html, 1.

"What's a Netmask? And Why do I Need One?", www.johnscloset.net/primer/subnet.html., 1-3.

Buyukkokten, Orkut, "Exploiting Geographical Location Information of Web Pages", *Department of Computer Science*, Stanford University, Stanford, CA 94035, 1-6.

Cooney, Ron , "Subnet Addressing", www.networkcomputing.com/unixworld/tutorial/001.html, 1-7.

Davis, C. , et al., "A Means for Expressing Location Information in the Domain Name System Status of this Memo", www.ckdhr.com-dns-los/rfc1876.txt, (Jan. 1996),1-17.

Debellis, Matthew , "Digital Envoy Greets $1.1 Million", *VC & Startups*, (Feb. 29, 2000),3.

Dodge, Martin , et al., "Where on Earth is the Internet", *Center for Advanced Spatial Analysis*, University College London, www.geog.ulc.ac.uk/casa/martin/internetspace/paper-telecom.html,(Mar. 1998),1-15.

Dommety, Gopal , et al., "Potential Networking Applications of Global Positioning Systems (GPS)", *Dept. of Computer and Information Science*, The Ohio State University, Columbus, Ohio, 1-40.

Eastlake, "Domain Name System Security Extensions; Network Working Group; Request for Comments", http://www.jetf.org/rfc/rfc2151.txt, (Mar. 1999),1-42.

Farrell, C. , et al., "DSN Encoding of Geographical Location", Curtin University of Technology; www.cis.ohio-state.edu/cgi-bin/rfc1712.html, (Nov. 1994),1-6.

Filedrive, F , "Mapping the Internet", www.jevans.com/pubnetmap.html, (Oct. 1995),1-4.

Hamilton, Martin , "Uniform Resource Identifiers & the Simple Discovery Protocol", *Dept. of Computer Studies*, Loughborough University of Technology, (Jun. 20, 1995),1-23.

Harrenstein, et al., "Nicname/Whois"Network Working Group; Request For Comments, http://www.jetf.org/rcf0954.txt, (Oct. 1985),1-4.

Harris, Nicole , "Digital Envoy Offers A Way TO 'Geo Target'", file://C:\WINNT\Profiles\jwilkins\temporary%20Internet% 20Files\OLK12\WSJ.com%20--%20From%20the% . . . , (Apr. 12, 2001),1-3.

Imielinski, Tomasz , et al., "Geographic Addressing, Routing, and Resource Discovery with the Global Positioning System", *Computer Science Dept.* Rutgers, The State University, Piscataway, NJ 08855, (Oct. 19, 1996),1-10.

Imielinski, Tomasz , et al., "GPS-Based Addressing and Routing", *Computer Science Dept.* Rutgers, The State University, Piscataway, NJ 08855, (Mar. 7, 1996),1-35.

Kessler, et al., "A Primer on Internet and TCP/IP Tools and Utilities Network Working Group; Request for Comments", http://www.jetf.org/rfc2151.txt, (Jun. 1997),1-46.

Lambert, John , "Subnet Masking Definition", www.exabyte.net/lambert/subnet/subnet_masking_definition.htm, (1999),1-2.

Lamm, Stephen , et al., "Real-Time Geographic Visualization of World Wide Web Traffic", *WWW Journal Issue 3*, (1996),1-14.

McCurley, Kevin S., "Geospacial Mapping and Navigation of the Web", *IBM Almaden Research Center*, San Jose, CA 95120, (May 1-5, 2001),221-229.

Moore, David , et al., "Where in the World is Netgo.caida.org", *Cooperative Association of Internet Data Analysis—CAIDA*, San Diego, CA, (2000),1-13.

Navas, Julio C., et al., "On Reducing the Computational Cost of Geographic Routing", Rutgers University, New Brunswick, NJ, (Jan. 24, 2000),1-28.

Padmanadhan, Venkata N., et al., "Determining the Geographic Location of Internet Hosts", www.research.microsoft.com~padmanab/; *Microsoft Research*, University of California Berkley, 15.

Quarterman, John S., et al., "Internet Integration Pinged and Mapped", *Internet Interaction Proc INET*, (1994),522-1 through 522-10.

Raz, Uri , "How to Find a Host's Geographical Location?", www.private.org.il/IP2geo.html, (Mar. 28, 2002),1-3.

Schwartz, Michael F., "Applying an Information Gathering Architecture to NetFind: A White pages Tool for a Changing and Growing Internet", *University of Colorado Technical Report; IEEE/ACM Transactions on Networking*, (Dec. 1993),1-23.

Shiode, Narushige , "Analyzing the Geography of the Internet Address Space", http://geog.ucl.uk/casa/martine/internetspace, 1-3, Mar. 16, 1998.

Subramanian, Lakshminarayanan , et al., "Geographic Properties of Internet Routing: Analysis and Implications", *Technical Report MSR-TR-2001-89; Microsoft Research*; Redmond, WA, (Sep. 2001),1-12.

Wooley, Scott , "We Know Where You Live,", http://forbes/200/1113/6613332a.html;$sessionid$Q4DBX0QAACP0, (Nov. 13, 2002),2.

U.S. Appl. No. 60/194,761, filed Apr. 3, 2000, Herringshaw, C., et al.

U.S. Appl. No. 60/241,776, filed Oct. 18, 2000, Doctor, B., et al.

"English Translation of WO 00/29979", *Obtained from Transperfect*, (May 25, 2000).

"The UUCP Mapping Project", *Academ Consulting Services* http://www.academ.com/academ/maps.html, 1 page.

Author Unknown, "Geographic Location Representation in DNS", http://www.bovine.net/~JLAWSON/HMC/DNS/LOCATION.HTML, (Mar. 28, 2002),1-3.

Connolly, G. , et al., "Distributed Traceroute Approach to Geographically Locating IP Devices", *IEEE International Workshop on Intelligent Data Acquisition and Advanced Computing Systems: Technology and Applications*, (Sep. 8, 2003),128-131.

Digital Envoy, "SPOT (Systematic Position Online Targetter)", *Digital Envoy—Products and Services*, http://web.archive.org/web/19991127165432/http://digitalenvoy.com/products/products.htm,(Nov. 27, 1999),1 pg.

Digital Island, "Content Delivery Services: Footprint Streaming Solutions", *Digital Island, Inc.*, 4 pages.

Digital Island, "TraceWare White Paper", *Digital Island, Inc.*,(Jun. 1999),1-8.

Imielinski, Tomasz , et al., "GPS-Based Addressing and Routing", *Computer Science Department*, Rutgers, Piscataway, NJ, (Aug. 9, 1996),1-35.

Imielinski, et al., "GPS-Based Geographic Addressing, Routing and Resource Discovery with the Global Positioning System", *Computer Science Department*, Rutgers State University, Piscataway, NJ 088555, (Oct. 19, 1996),7 pgs.

JOHNSCLOSET.NET, "What's A Netmask? And Why Do I Need One?", http://www.johnscloset.net/primer/subnet.html, (Apr. 21, 2000),3 pages.

May, M , European Search Report for Application No. 01926668.3-2201-US0111163, (Jan. 14, 2005),4 pages.

Navas, Julio C., "Geographic Routing Project Description", http://www.research.rutgers.edu/~navas/dataman/abstract.html, (Dec. 18, 1998),1-3.

Padmanabhan, Venkata , et al., "Determining the Geographic Location of Internet Hosts", *Technical Report—MSR-TR-2000-110—Microsoft Research*, University of California Berkley, www.research.microsoft.com-padmanab,(Nov. 2000),1-17.

Quova, "Prominent Internet Industry Executives Launch Quova . . . Provide Internet Intelligence to E-Businesses", http://www.quova.com/pressrelease.cfm?ID=1, (right side of text cut off),(Sep. 18, 2000),2 pages.

Quova, "Quova Brings Geography to the Internet with Introduction of Geopoint 2.0", http://www.quova.com/pressrelease.cfm?ID=5, (right side of text cut off),(Feb. 21, 2001),3 pages.

Webopedia, "DHCP", http://www.pcwebopedia.com/TERM/DHCP.html, 2 pages.

Webopedia, "ICMP", http://www.pcwebopedia.com/TERM/I/ICMP.html, 2 pages.

WIZZARD.COM, "Using IP Subnet Masks", http://www.wizard.com/users/baker/public_html/Network/Subnet.html, 1 page.

U.S. Appl. No. 11/073,149, filed Mar. 4, 2005, Geo-Location and Geo-Compliance Utilizing a Client Agent.

U.S. Appl. No. 10/685,991, filed Oct. 14, 2003, Method and Apparatus to Modify Geolocation Activities Based on Logged Query Information.

U.S. Appl. No. 10/686,135, filed Oct. 14, 2003, Method and System to Collect Geographic Location Information for a Network Address Utilizing Geographically Dispersed Data Collection Agents.

U.S. Appl. No. 10/685,692, filed Oct. 14, 2003, Method and System to Associate Geographic Location Information With a Network Address Using a Combination of Automated and Manual Processes.

U.S. Appl. No. 60/550,300, filed Mar. 4, 2004, Method and System to Facilitate Geo-Location and Geo-Compliance Utilizing a Client Agent—Provisional.

"U.S. Appl. No. 10/685,692 Advisory Action mailed Dec. 21, 2005", 5 pgs.

"U.S. Appl. No. 10/685,692 Final Office Action mailed Sep. 21, 2005", 16 pgs.

"U.S. Appl. No. 10/685,692 Non Final Office Action mailed May 3, 2005", 11 pgs.

"U.S. Appl. No. 10/685,692 Non Final Office Action mailed Aug. 25, 2004", 30 pgs.

"U.S. Appl. No. 10/685,692 Response filed Jan. 25, 2005 to Non Final Office Action mailed Aug. 25, 2004", 19 pgs.

"U.S. Appl. No. 10/685,692 Response filed Jun. 23, 2005 to Non Final Office Action mailed May 3, 2005", 10 pgs.

"U.S. Appl. No. 10/685,692 Response filed Nov. 21, 2005 to Final Office Action mailed Sep. 21, 2005", 16 pgs.

"U.S. Appl. No. 10/685,991 Non Final Office Action mailed Aug. 24, 2004", 40 pgs.

"U.S. Appl. No. 10/685,991 Notice of Allowance mailed May 6, 2005", 8 pgs.

"U.S. Appl. No. 10/685,991 Notice of Allowance mailed Sep. 19, 2005", 17 pgs.

"U.S. Appl. No. 10/685,991 Response filed Jan. 24, 2005 to Non Final Office Action mailed Aug. 24, 2004", 23 pgs.

"U.S. Appl. No. 10/686,135 Non Final Office Action mailed Jun. 27, 2007", 22 pgs.

"U.S. Appl. No. 10/686,135, Final Office Action Mailed Nov. 27, 2007", 11 pgs.

"U.S. Appl. No. 11/397,527, Response filed Jan. 10, 2006 Final Office Action mailed Sep. 21, 2005", 5 pgs.

"U.S. Appl. No. 10/686,135, Response filed Jan. 25, 2008 to Final Office Action mailed Nov. 27, 2007", 11 pgs.

"International Application Serial No. 01926668.3-2001, European Search Report mailed Jan. 14, 2005", 4 pgs.

"International Application Serial No. 01926668.3-2201, Office Action mailed Jan. 18, 2005", 1 pgs.

"International Application Serial No. 01926668.3-2201, Office Action mailed Nov. 16, 2005", 4 pgs.

"International Application Serial No. 01926668.3-2201, Office Action mailed Mar. 10, 2005", 5 pgs.

"International Application Serial No. 01926668.3-2201, Office Action mailed Jun. 9, 2006", 6 pgs.

"International Application Serial No. 01926668.3-2201, Response filed Jan. 19, 2007 to Office Action mailed Jan. 16, 2007", 1 pgs.

"International Application Serial No. 01926668.3-2201, Response filed Oct. 20, 2005 to Office Action mailed Mar. 10, 2005", 55 pgs.

"International Application Serial No. 01926668.3-2201, Response filed Nov. 16, 2005 to Office Action mailed Mar. 10, 2005", 4 pgs.

"International Application Serial No. 01926668.3-2201, Response filed Feb. 14, 2005 to Office Action mailed Jan. 18, 2005", 1 pgs.

"International Application Serial No. 2001253189, Response filed Jun. 2, 2004 to Examiner's Report mailed Feb. 20, 2004", 19 pgs.

"International Application Serial No. PCT/US01/11163, International Search Report mailed Aug. 20, 2001", 6 pgs.

"International Application Serial No. PCT/US05/07034, International Search Report mailed Jul. 13, 2006", 5 pgs.

"International Application Serial No. PCT/US05/07034, Written Opinion mailed Jul. 13, 2006", 4 pgs.

"International Application Serial No. PCT/US2005/007034, Preliminary Report on Patentability mailed Sep. 14, 2006", 5 pgs.

U.S. Appl. No. 10/686,135, Non-Final Office Action mailed Jul. 21, 2008, 12 pgs.

U.S. Appl. No. 11/073,149, Non-Final Office Action mailed Aug. 18, 2008, 21 pgs.

* cited by examiner

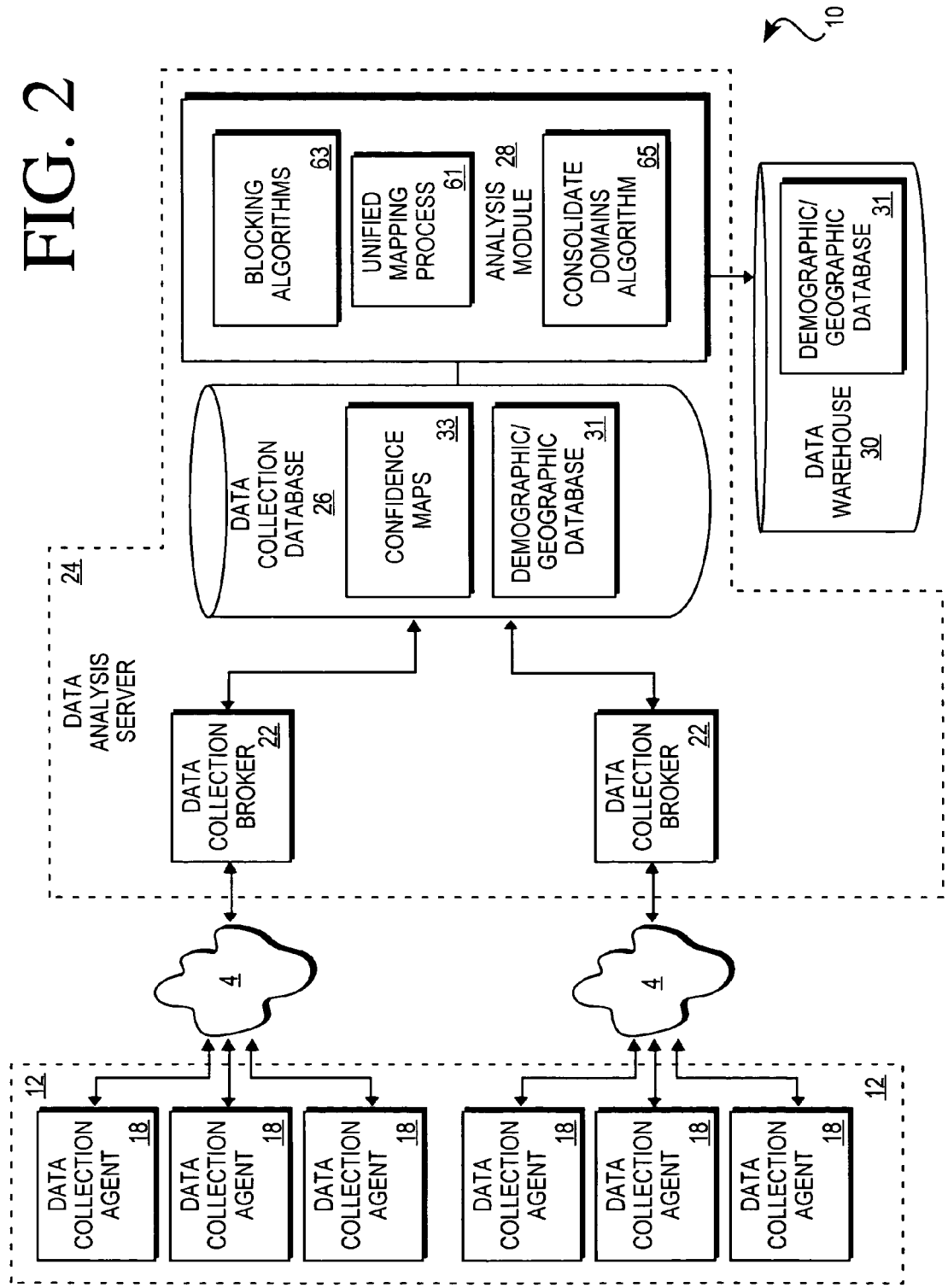

METHOD AND SYSTEM TO INITIATE GEOLOCATION ACTIVITIES ON DEMAND AND RESPONSIVE TO RECEIPT OF A QUERY

CROSS REFERENCE TO RELATED APPLICATIONS

This application is a continuation of U.S. application Ser. No. 09/825,675 filed on Apr. 3, 2001 now U.S. Pat. No. 6,684,250, which in turn claims the priority benefit of U.S. Provisional Application No. 60/194,761, filed Apr. 3, 2000, and U.S. Provisional Application No. 60/241,776 filed Oct. 18, 2000. Each of the identified applications is hereby incorporated by reference.

FIELD OF THE INVENTION

The present invention relates generally to the field of geographic location determination and, more specifically, to a method and apparatus for estimating the geographic location of a network entity, such as a node coupled to the Internet.

BACKGROUND OF THE INVENTION

Geography plays a fundamental role in everyday life and effects, for example, of the products that consumers purchase, shows displayed on TV, and languages spoken. Information concerning the geographic location of a networked entity, such as a network node, may be useful for any number of reasons.

Geographic location may be utilized to infer demographic characteristics of a network user. Accordingly, geographic information may be utilized to direct advertisements or offer other information via a network that has a higher likelihood of being the relevant to a network user at a specific geographic location.

Geographic information may also be utilized by network-based content distribution systems as part of a Digital Rights Management (DRM) program or an authorization process to determine whether particular content may validly be distributed to a certain network location. For example, in terms of a broadcast or distribution agreement, certain content may be blocked from distribution to certain geographic areas or locations.

Content delivered to a specific network entity, at a known geographic location, may also be customized according to the known geographic location. For example, localized news, weather, and events listings may be targeted at a network entity where the geographic location of the networked entity is known. Furthermore content may be presented in a local language and format.

Knowing the location of network entity can also be useful in combating fraud. For example, where a credit card transaction is initiated at a network entity, the location of which is known and far removed from a geographic location associated with a owner of credit card, a credit card fraud check may be initiated to establish the validity of the credit card transaction.

SUMMARY OF THE INVENTION

According to a first aspect of the present intention, there is provided a method to perform geolocation activities relating to a network address. A query, including a network address, is received from an external entity at a geolocation system. Responsive to receipt of the query, geolocation activities are initiated at the geolocation system to map the network address to a geographic location.

Other aspects of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 2 is a block diagram illustrating software architecture for a geolocation system, according to an exemplary embodiment of the present invention.

The file of this patent contains at least one drawing executed in color. Copies of this patent with color drawing(s) will be provided by the Patent and Trademark Office upon request and payment of the necessary fee.

DETAILED DESCRIPTION

A method and system to initiate geolocation activities on demand and responsive to receipt of a query are described. In the following description, for purposes of explanation, numerous specific details are set forth in order to provide a thorough understanding of the present invention. It will be evident, however, to one skilled in the art that the present invention may be practiced without these specific details.

For the purposes of the present specification, the term "geographic location" shall be taken to refer to any geographic location or area that is identifiable utilizing any descriptor, metric or characteristic. The term "geographic location" shall accordingly be taken to include a continent, a country, a state, a province, a county, a city, a town, village, an address, a Designated Marketing Area (DMA), a Metropolitan Statistical Area (MSA), a Primary Metropolitan Statistical Area (PMSA), location (latitude and longitude), zip or postal code areas, and congressional districts. Furthermore, the term "location determinant" shall be taken to include any indication or identification of a geographic location.

The term "network address", for purposes of the present specification, shall be taken to include any address that identifies a networked entity, and shall include Internet Protocol (IP) addresses.

Typically, most network addresses (e.g., IP addresses) are associated with a particular geographic location. This is because routers that receive packets for a particular set of machines are fixed in location and have a fixed set of network addresses for which they receive packets. The machines that routers receive packets for tend to be geographically proximal to the routers. Roaming Internet-Ready devices are rare exceptions. For certain contexts, it is important to know the location of a particular network address. Mapping a particular network address to a geographic location may be termed "geolocation". An exemplary system and methodology by which geographic locations can be derived for a specific network addresses, and for address blocks, are described below. Various methods of obtaining geographic information, combining such geographic information, and inferring a "block" to which a network address corresponds and which shares the same geographic information are described.

The exemplary system and method described below include (1) a data collection stage, (2) a data analyses stage, and (3) a delivery stage.

System Architecture

Figure 1A:
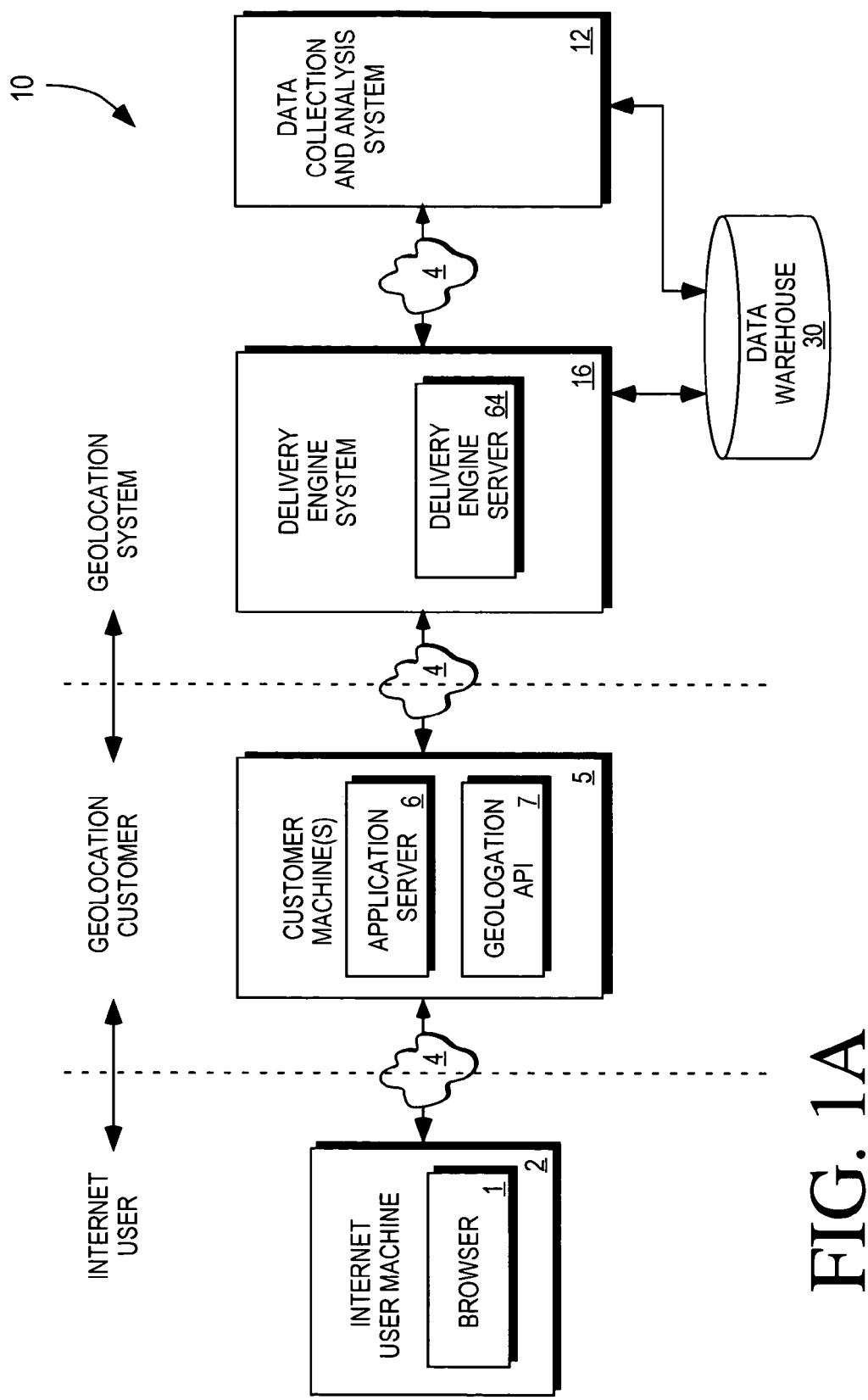
FIG. 1A is a diagrammatic representation of a deployment of a geolocation system, according to an exemplary embodiment of the present invention, within a network environment.

FIG. 1A is a diagrammatic representation of a deployment of a geolocation system 10, according to an exemplary embodiment of the present invention, within a networked environment 8. Various components of the system 10 are shown in the attached Figures to be coupled by networks 4. The geolocation system 10 is shown to include: (1) a data collection and analysis system 12 that is responsible for the collection and analysis of information useful in geolocating a network address; (2) a delivery engine system 16, including a number of delivery engine servers 64, which operate to provide geolocation information to a customer; and (3) a data warehouse 30 that stores collected information useful for geolocation purposes and determining geolocations for specific network addresses (or blocks of network addresses).

Geolocation data is distributed from the data warehouse 30 to the delivery engine system 16 for delivery to a customer in response to a query.

More specifically, in one exemplary embodiment, the data collection and analysis system 12 operates continuously to identify blocks of network addresses (e.g., Class B or Class C subnets) as will be described in further detail below, and to associate a geographic location (geolocation) with the identified blocks of network addresses. A record is then written to the data warehouse 30 for each identified block of network addresses, and associated geolocation. In one exemplary embodiment, a record within the data warehouse 30 identifies a block of network addresses utilizing a subnet identifier. In a further exemplary embodiment, a record within the data warehouse identifies a start and end network address for a relevant block of network addresses. In an even further exemplary embodiment, a record identifies only a single network address and associated geolocation. The data collection and analysis system 12 operates to continually updated and expand the collection of records contained within the data warehouse 30. An administrator of the data collection and analysis system 12 may furthermore optionally directed the system 12 to focus geolocation activities on a specific range of network addresses, or to prioritize geolocation activities with respect to specific range of network addresses. The data collection and analysis system 12 furthermore maintains a log of network addresses received that did not map toga block of network addresses for which a record exists within the data warehouse 30. The data collection and analysis system may operate to prioritize geolocation activities to determine geolocation information for network addresses in the log.

In an exemplary use scenario, an Internet user may, utilizing a user machine that hosts a browser 1, access a web site operated by the customer. The custom website is supported by the application server 6, which upon receiving an IP address associated with the user machine 2, communicates this IP address to the geolocation Application Program Interface (API) 7 hosted that the customer site. Responsive to receiving the IP address, the API 7 communicates the IP address to a delivery engine server 64 of the delivery engine system 16.

In the manner described in further detail below, the data collection and analysis system 12 generates a location determinant, indicating at least one geographic location, and an associated location probability table, that is communicated back to the customer. More specifically, the delivery engine server 64 attempts to identify a record for a block of network addresses to which the received IP address belongs. If the delivery engine server 64 is successful in locating such a record, geolocation information (e.g., a location determinant) stored within that record is retrieved and communicated back to the customer. On the other hand, if the delivery engine server 64 is unsuccessful in locating a record within the data warehouse 30, the relevant IP address is logged, and a "not found" message is communicated to the customer indicating the absence of any geolocation information for the relevant IP address.

The customer is then able to utilize the location determinant for any one of multiple purposes (e.g., targeted advertising, content customization, digital rights management, fraud detection etc.)

Figure 1B:
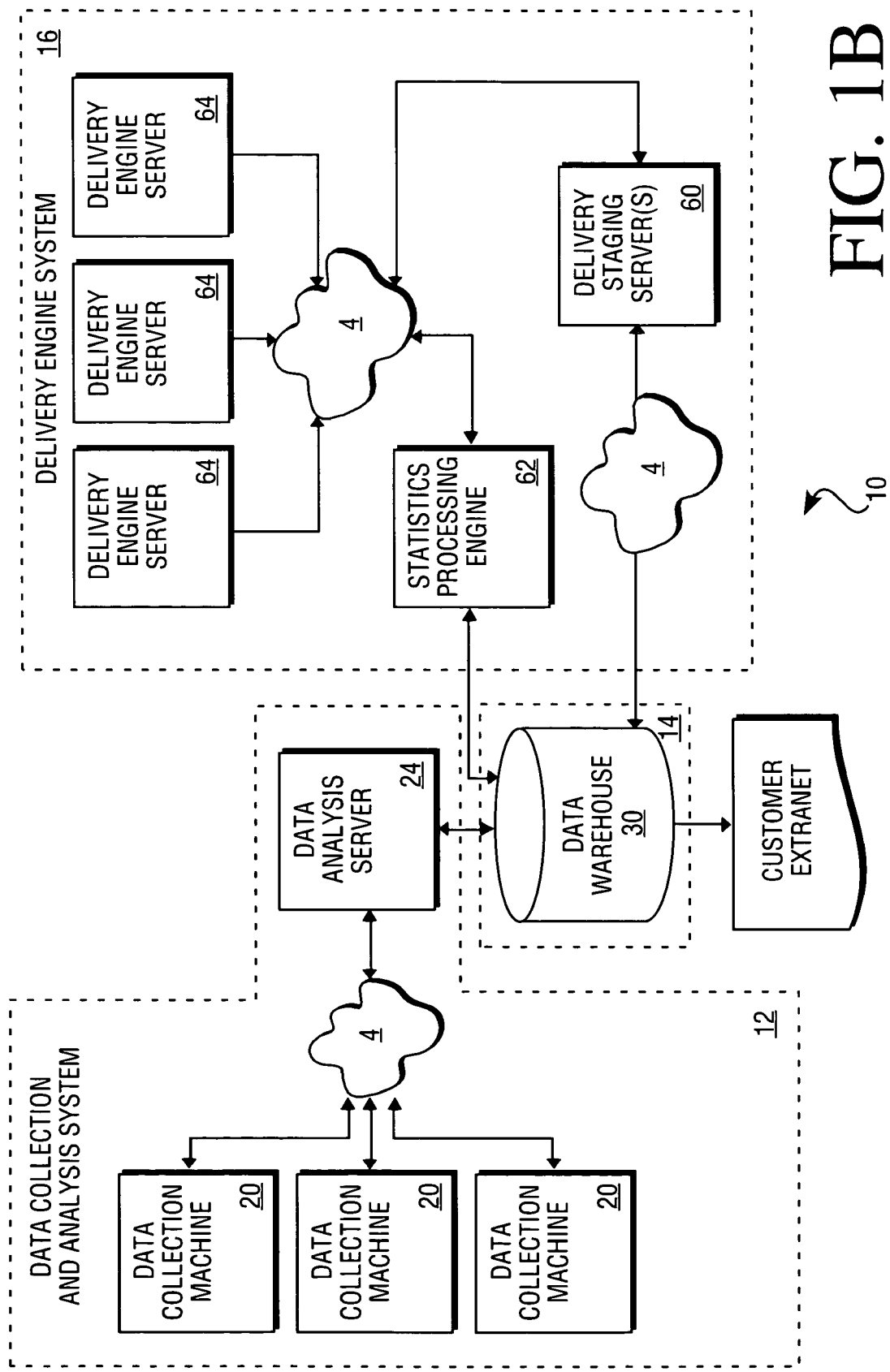
FIG. 1B is a block diagram providing architectural details regarding a geolocation system, according to an exemplary embodiment of the present invention.

FIG. 1B is a block diagram providing further details regarding a physical architecture for the geolocation system 10, according to an exemplary embodiment of the present invention. At a high level, the geolocation system 10 comprises the data collection and analysis system 12, a data warehouse system 14, and the delivery engine system 16. FIG. 2 is a block diagram illustrating software architecture for the geolocation system 10, according to an exemplary embodiment of the present invention.

The data collection and analysis system 12 is shown to collect data from geographically dispersed, strategically placed remote data collection agents 18, hosted on data collection machines 20. A group of data collection agents 18 is controlled by a data collection broker 22, which may be hosted on a data analysis server 24. The data collected by a data collection broker 22, as shown in FIG. 2, is delivered to a data collection database 26, and is analyzed utilizing an analysis module 28. The analysis module 28 implements a number of analysis techniques to attach a known or estimated geographic location to certain network information (e.g., the source or destination address of a network request). A resulting location record, along with all supporting information, is then written into a data warehouse 30 of the data warehouse system 14. The geolocation system 10, in one embodiment, supports the following features:

Implementation of a data collection agent 18 capable of individually performing a number of data collection operations in accordance with a number of analysis techniques utilized by the analysis module 28; and Implementation of a data collection broker 22 capable of determining which of a number of analysis techniques, utilized by the analysis module 28, to utilize for a given network information (e.g., an IP address).

FIG. 2 illustrates a number of a data collection agents 18 hosted at geographically disperse locations. For example, these disperse locations may be with separate service providers. The location of the data collection agents 18 at disperse locations assists the geolocation system 10 by providing different "points of view" on the network target.

Each data collection agent 18 is responsible for actual execution of a data collection process, or search, to locate and extract data that is the useful for the determination of a geolocation. Further details regarding exemplary searches are provided below. For example, a traceroute search is conducted by a data collection agent 18 responsive to a search request received at a data collection agent 18 from a data collection broker 22. Each data collection agent 18, responsive to a request, will perform a search (e.g., a traceroute) to collect specified data, and determine the validity of the raw data utilizing built-in metrics. If successful, this data is provided to the data collection database 26, via a data collection broker 22, for analysis by the analysis module 28. Each data collection agent 18 further advises a controlling data collection broker 22 of the success or failure of a particular search.

Each data collection broker 22 controls a group of data collection agents 18. For example, given a network address, or a range of network addresses, a data collection broker 22 determines which data collection agents 18 are most appropriate for the specific search. Once the request has been sent to a group of data collection agents 18 from a data collection broker 22, a response is expected containing a summary of the search. If the search was successful, this information will be placed directly into the data collection database 26, at which time the analysis module 28 will determine an estimated geolocation of the searched addresses.

On the other hand, if a search is not successful, the data collection broker 22 takes the appropriate action, and the data is not entered into the data collection database 26. At this time, the data collection broker 22 hands the search request to another data collection broker 22, which performs the same process.

The data collection database 26 contains current state information, as well as historical state information. The state information includes statistics generated during the data acquisition by the data collection agents 18, as well as failure statistics. This allows an operator of the geolocation system 10 to visualize the actual activity of a data collection process.

Data Collection

Figure 3:
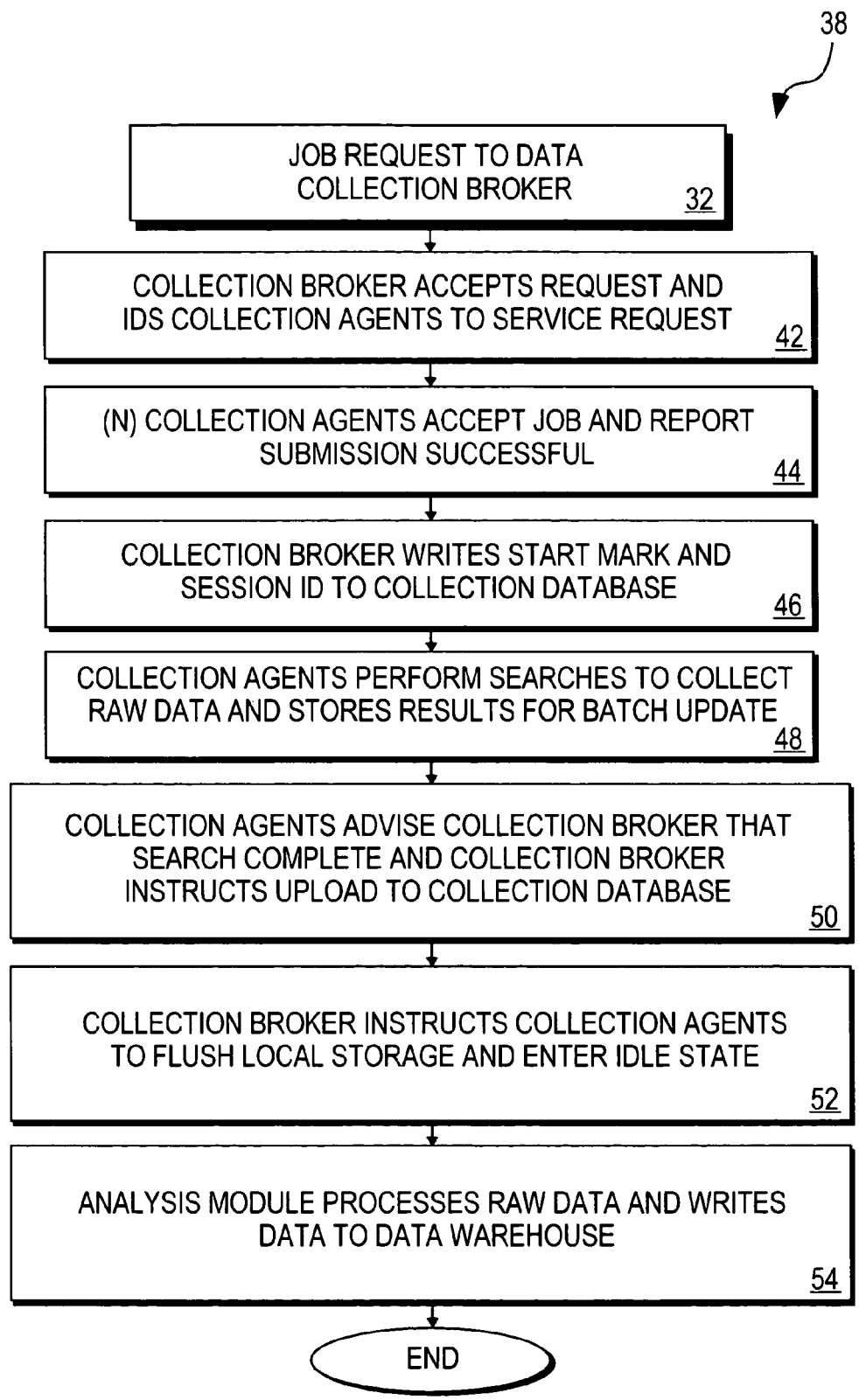
FIG. 3 is a flowchart illustrating a method, according to an exemplary embodiment of the present invention, of collecting data utilizing a number of data collection agents.

FIG. 3 is a flowchart illustrating a method 38, according to an exemplary embodiment of the present invention, of collecting data utilizing a number of data collection agents 18.

At block 40, a user (or process) enters a job request to the data collection broker 22 via, for example, a web interface. Job scheduling is also an option for the, user. At block 42, the relevant data collection broker 22 accepts a request, and determines what data collection agents 18 will service the request. The data collection broker 22 also sets a unique session identifier (USID).

At block 44, one or more data collection agents 18 accept a job, and report to the data collection broker 22 that submission was successful.

At block 46, the data collection broker 22 writes (1) a start mark, indicating that the job is underway, and (2) the unique session identifier to the data collection database 26.

At block 48, the data collection agents 18 perform various searches (e.g., traceroutes) to collect raw data, and stores results locally for later batch update.

At block 50, each of the data collection agents 18 informs the data collection broker 22 that the search has finished, with or without success. After the last data collection agent 18 reports its status, the data collection broker 22 instructs the data collection agents 18 to upload their information to the data collection database 26.

At block 52, after the last data collection agent 18 reports a finished database write, the data collection broker 22 instructs the data collection agents 18 to flush their local storage, and remain idle until the next search job.

At block 54, the analysis module 28 processes the newly entered data within the data collection database 26, and writes this data to the data warehouse 30.

The delivery engine system 16 is responsible for delivering geolocation information generated by the geolocation system 10. With reference to FIG. 1, the delivery engine system 16 may be viewed as comprising a delivery staging server 60, a statistics processing engine 62, one or more delivery engine servers 64 and a delivery engine plant daemon (not shown).

The delivery staging server 60 provides a reliable and scaleable location distribution mechanism for geolocation data and does not modify any data. The delivery staging server 60 provides a read-only copy of the geolocation information to the delivery engine servers 64, and is responsible for preparing geolocation information that should be distributed to the delivery engine servers 64. Each delivery staging server 60 prepares dedicated information for one product offering. The delivery staging server 60 will retrieve the geolocation information from the data warehouse 30 based on the product offering. The delivery staging server 60 configuration includes a customer list and a delivery engine servers list for deployment. At fixed intervals, geolocation information is refreshed from the data warehouse 30 and distributed to the delivery engine service 64. The refresh from the data warehouse 30 may be based on a number of factors such as a new product offering or refining the existing location data. Before each new load of the delivery engine servers 64, the delivery staging server 60 retrieves a current copy of customers and the delivery engine servers 64 associated with the relevant delivery staging server 60.

The administration of the delivery staging servers 60 is performed by a separate server that is also responsible for load balancing and backup configuration for the delivery staging servers 60.

The statistics processing engine 62 is responsible for retrieving customer access logs (hits and misses) and usage data from the delivery engine services 64 on a regular basis. This information is used, for example, as input for the load balancing criteria, and getting update information for the location misses. The usage statistics may also provide the required information to the billing subsystem.

All information sent to delivery engine service 64 is encrypted to prevent unauthorized use.

The delivery engine servers 64 are responsible for serving the clients of the geolocation system 10. The delivery engine servers 64 may be hosted at a client site or at a central data center. The delivery engine servers 64 are able to accept update information from the delivery staging server 60 and to serve current requests. Each delivery engine servers 64 saves all customer access information and provide this information to the statistics processing engine 62. In embodiment, each delivery engine server 64 provides an eXtensible Markup Language (XML)-based Application Program Interface (API) interface to the customers of the geolocation system 10.

A geolocation API 7, as described above with reference FIG. 1A, interfaces with a delivery engine server 64 from a customer application server. The geolocation API 7 may support a local cache to speed up the access, this cache being flushed whenever the delivery engine server 64 is reloaded. The geolocation API 7 may be configured to access an alternate server in case of a failure or high load on a single delivery engine server 64. Each delivery engine server 64 and delivery staging server 60 includes a Simple Network Management Protocol (SNMP) agent for network management.

Data Flow (Collection, Analysis and Delivery)

Figure 4A:
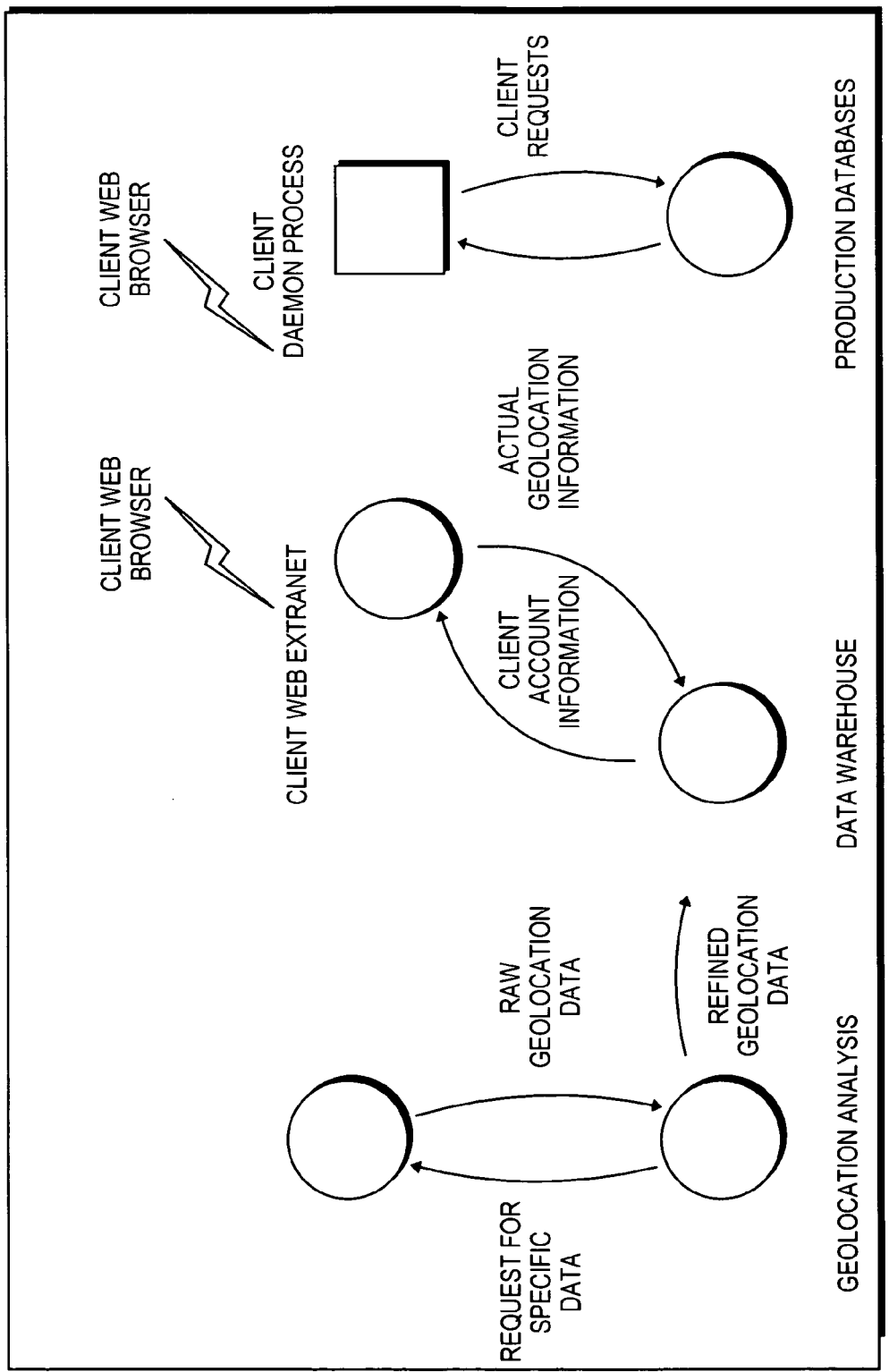
FIG. 4A is a state diagram illustrating general dataflow within the geolocation system, according to an exemplary embodiment of the present invention.
Figure 4B:
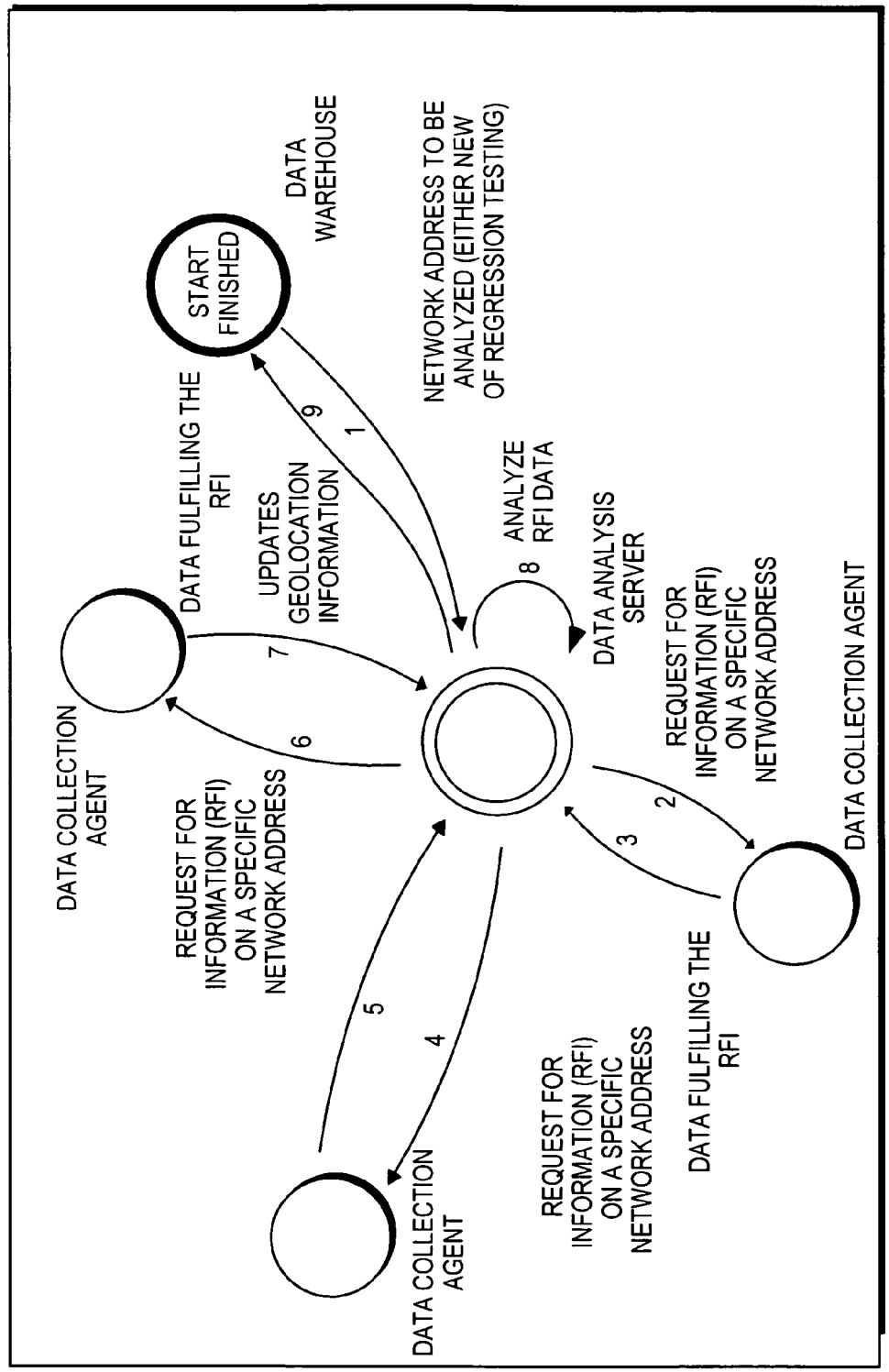
FIG. 4B is a state diagram illustrating dataflow, according to an exemplary embodiment of the present invention, during a geolocation data collection and analysis process.

FIG. 4A is a state diagram illustrating general data flow, as described above and according to an exemplary embodiment of the present invention, within the geolocation system 10. FIG. 4B is a state diagram illustrating data flow, according to an exemplary embodiment of the present invention, during the geolocation data collection and analysis processes described above.

The analysis module 28 retrieves geolocation information from the data collection database 26 to which all data collection agents 18 write such information, in the manner described above. Specifically, the analysis module 28 operates a daemon, polling in a timed interval for new data within the data collection database 26. When new data is found, the analysis techniques embodied within sub-modules (Location Determination Modules LDMs) of the analysis module 28 are initiated, with the results of these analysis techniques being written to the primary data warehouse 30.

Figure 5:
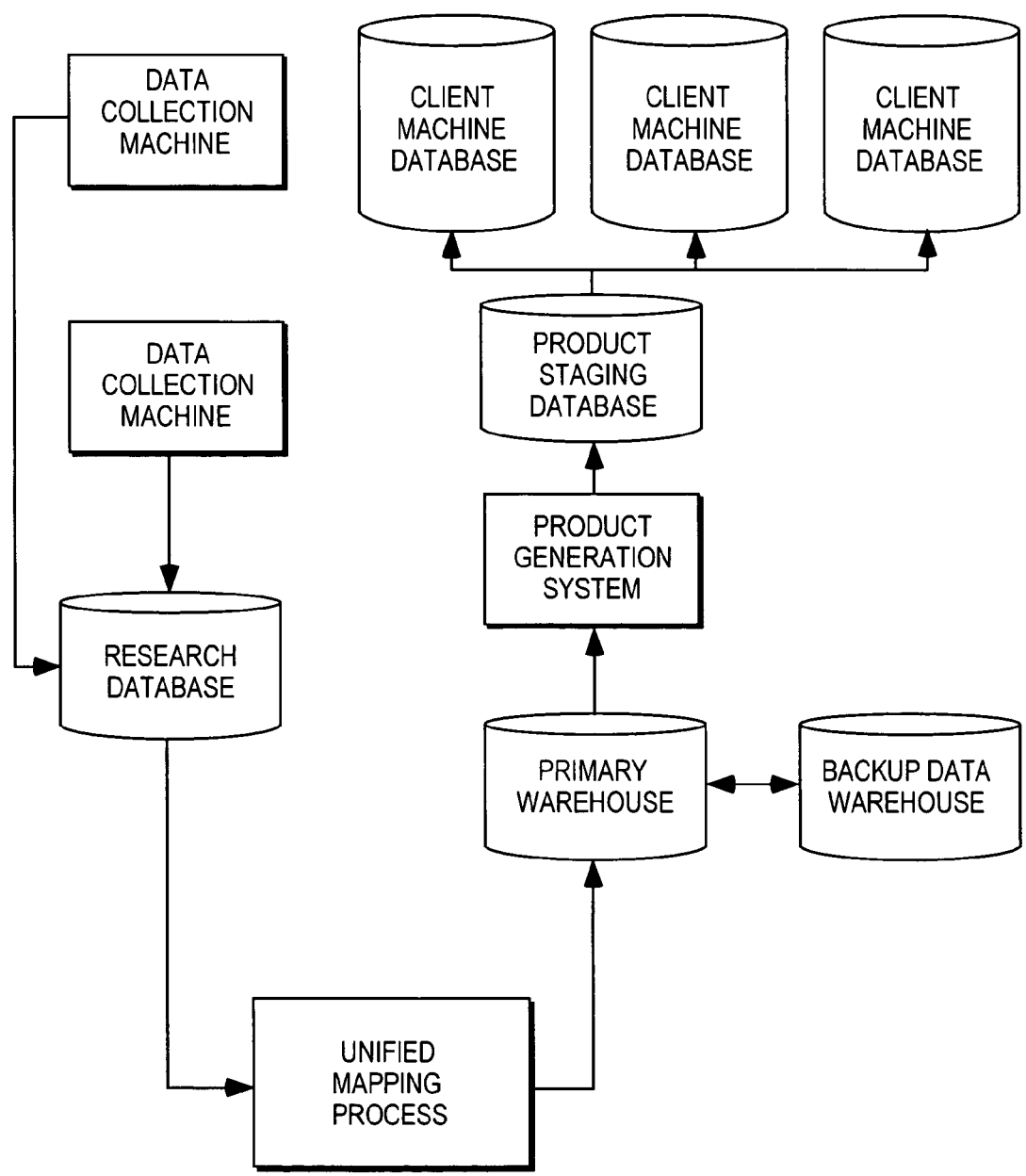
FIG. 5 is a diagrammatic overview of dataflow pertaining to a data warehouse, according to an exemplary embodiment of the present invention.

FIG. 5 provides an overview of data flow pertaining to the data warehouse 30, according to an exemplary embodiment of the present invention. As described above, data collection is performed by the data collection and analysis system 12. The results of the collection process are aggregated in the data collection database 26, which is an intermediary datastore for collection data. At some later point, data is taken from the database 26 by the analysis module 28, and the final analysis, along with all the supporting data, is placed into the data warehouse 30. The delivery staging servers 16 then pull a subset of data from the data warehouse 30 (this defines a product offering), and place this information into a staging database (not shown) associated with the delivery staging server 60. A staging database then pushes a copy of the geolocation information out to all delivery engine servers 64, which run a particular product offering.

The delivery staging servers 60 may provide the following customer information to the data warehouse 30:

Customer Registration

Customer Product License—level of support.

The following data is outputted from the data warehouse 30:
    Product Description (US, whole Europe, UK etc)
    Get customer list for the given product type
    Get location information for the product.
    Get list of delivery engine servers 64 that map to the product offering.
    Store location data on the disk with version number
    Build an in-memory database
    Create customer specific information from the memory database.
    Transfer data to Delivery Engine Production Systems.

The delivery staging servers 60 process requests from a client application by:
    Parsing XML requests received from a client application.
    Logging requests.
    Looking up location information based on level of service.
    Constructing a response and communicating the response back to the client application.

The delivery staging servers 60 process database updates by storing a new database with a version number on disk and building a new in-memory database for updates. Each update is a complete replacement of the existing in-memory database The statistics processing engine 62 activates after a given period of time, checks the data warehouse 30 for a list of active client machines, and retrieves the statistics files from all of the deployed delivery engine servers 64. Once such files have been retrieved, the statistics processing engine 62 pushes the statistics into the data warehouse 30.

The geolocation system 10, according to the one embodiment, utilizes eXtensible Markup Language (XML) as a data transfer format, both within the above-mentioned subsystems, and as the delivery agent to customer systems. XML offers flexibility of format when delivering geolocation information, and extensibility when the geolocation system 10 offers extended data in relation to geographic location, without having to reprogram any part of the client interfaces.

A standard XML parser technology may be deployed throughout the geolocation system 10, the parser technology comprising either the Xerces product, a validating parser offered by the Apache group, or XML for C++, written by the team at IBM's AlphaWorks research facility, which is based on the Xerces parser from Apache, and includes Unicode support and other extensions.

The geolocation system 10 utilizes numerous Document Type Definitions (DTDs) to support the XML messaging. DTDs serve as templates for valid XML messages.

The standard response to a customer system that queries the geolocation system 10, in one exemplary embodiment of the present invention, is in the form of a location probability table (LPT), an example of which is provided below. A location probability table may be an XML formatted message, containing a table of information representing location granularity (or resolution), location description, and a confidence percentage.

```
<?xml version="1.0"?>
<Service provider name>
    <geolocation type="response">
        <ipaddress>128.52.46.11</ipaddress>
        <lpt>
            <continent>
                <value type="string">North America</value>
```

-continued

```
                <confidence>100%</confidence>
            </continent>
            <country>
                <value type="string">United States</value>
                <confidence>99%</confidence>
            </country>
            <region>
                <value type="string">New England</value>
                <confidence>97%</confidence>
            </region>
            <state>
                <value type="string">Massachusetts</value>
                <confidence>96%</confidence>
            </state>
            <areacode>
                <value type="integer">617</value>
                <confidence>94%</confidence>
            </areacode>
            <msa>
                <value type="string">Boston MSA</value>
                <confidence>94%</confidence>
            </msa>
            <city>
                <value type="string">Cambridge</value>
                <confidence>93%</confidence>
            </city>
            <zipcode>
                <value type="integer">02142</value>
                <confidence>91%</confidence>
            </zipcode>
        </lpt>
    </geolocation>
</quova>
```

As will be noted from the above example, the location probability table indicates multiple levels of geographic location granularity or resolution, and provides a location probability (or confidence factor) for each of these levels of geographic resolution. For example, at a "country" level of geographic resolution, a relatively high probability level may be indicated. However, at a "city" level of geographic resolution, a relatively low probability level may be indicated in view of a lower confidence in the geolocation of the network entity at an indicated city.

The above location probability table constitutes a XML response to a geolocation request for the IP address 128.52.46.11. The city where the address is located is Cambridge, Mass., USA, identified with granularity (or geographic resolution) down the zip code level, at a 91% confidence.

In an alternative embodiment, the location probability table may be formatted according to a proprietary bar delimited format specification.

A more detailed description of the various systems that constitute the geolocation system 10, and operation of the geolocation system 10, will now be provided.

Figure 6:
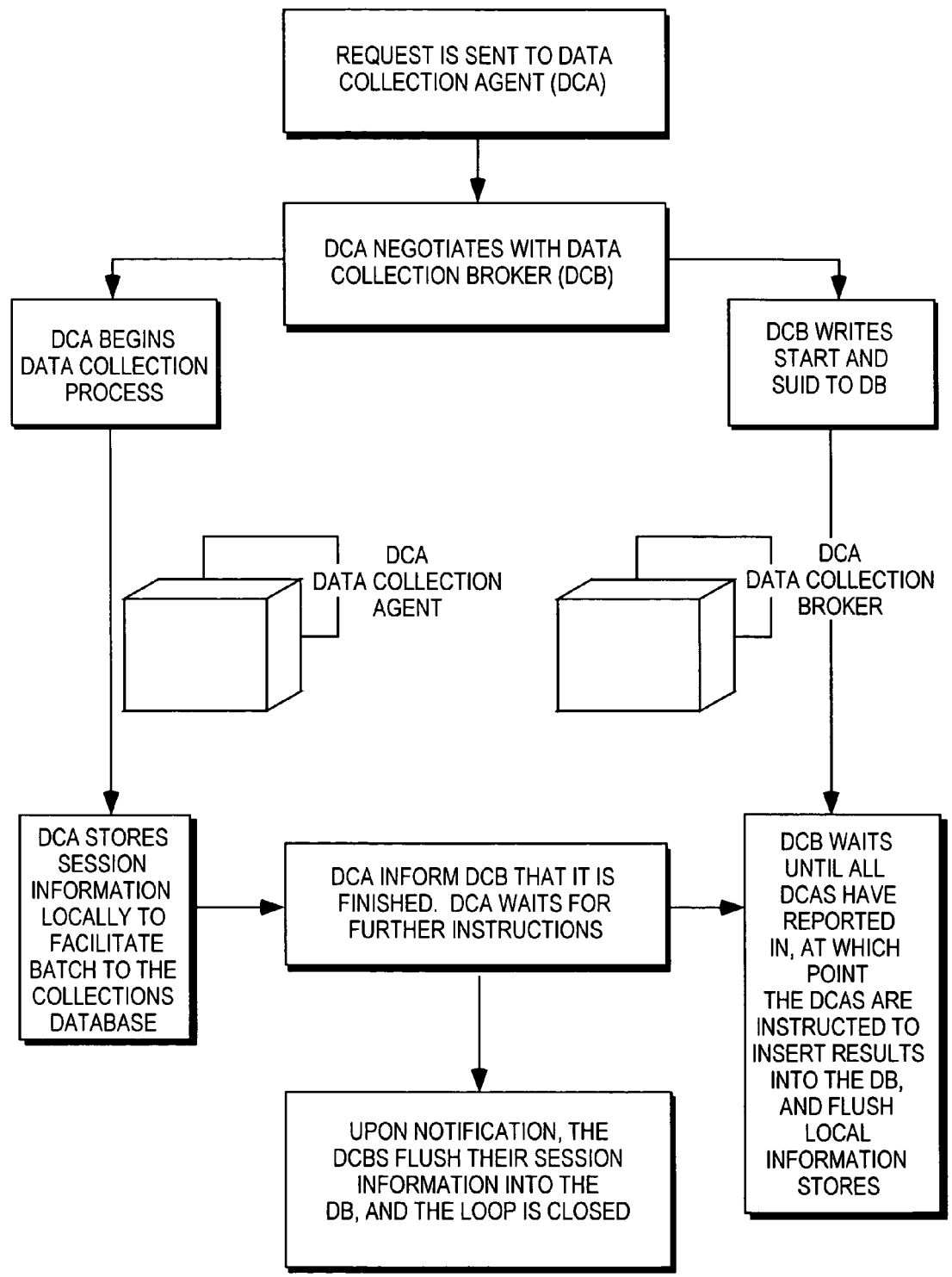
FIG. 6 is a flowchart illustrating operation of a data collection agent, according to an exemplary embodiment of the present invention, upon receipt of a request from an associated data collection broker.

A data collection agent 18 operates to receive commands from an associated data collection broker 22, and includes logic to execute a number of data collection operations specific to a number of analysis processes implemented by the analysis module 28. Each data collection agent 18 reports results back to an associated data collection broker 22 that performs various administrative functions (e.g., start, stop, restart, load, process status). FIG. 6 is a flowchart illustrating functioning of a data collection agent 18, according to an exemplary embodiment of the present invention, upon receipt of a request from an associated data collection broker 22.

A data collection broker 22 determines what actions are required responsive to a request from a customer (e.g., check new addresses, recheck older addresses, etc.), and provides instructions to one or more data collection agents 18 regarding what function(s) to perform with respect to certain network information (e.g., a network address).

Figure 7:
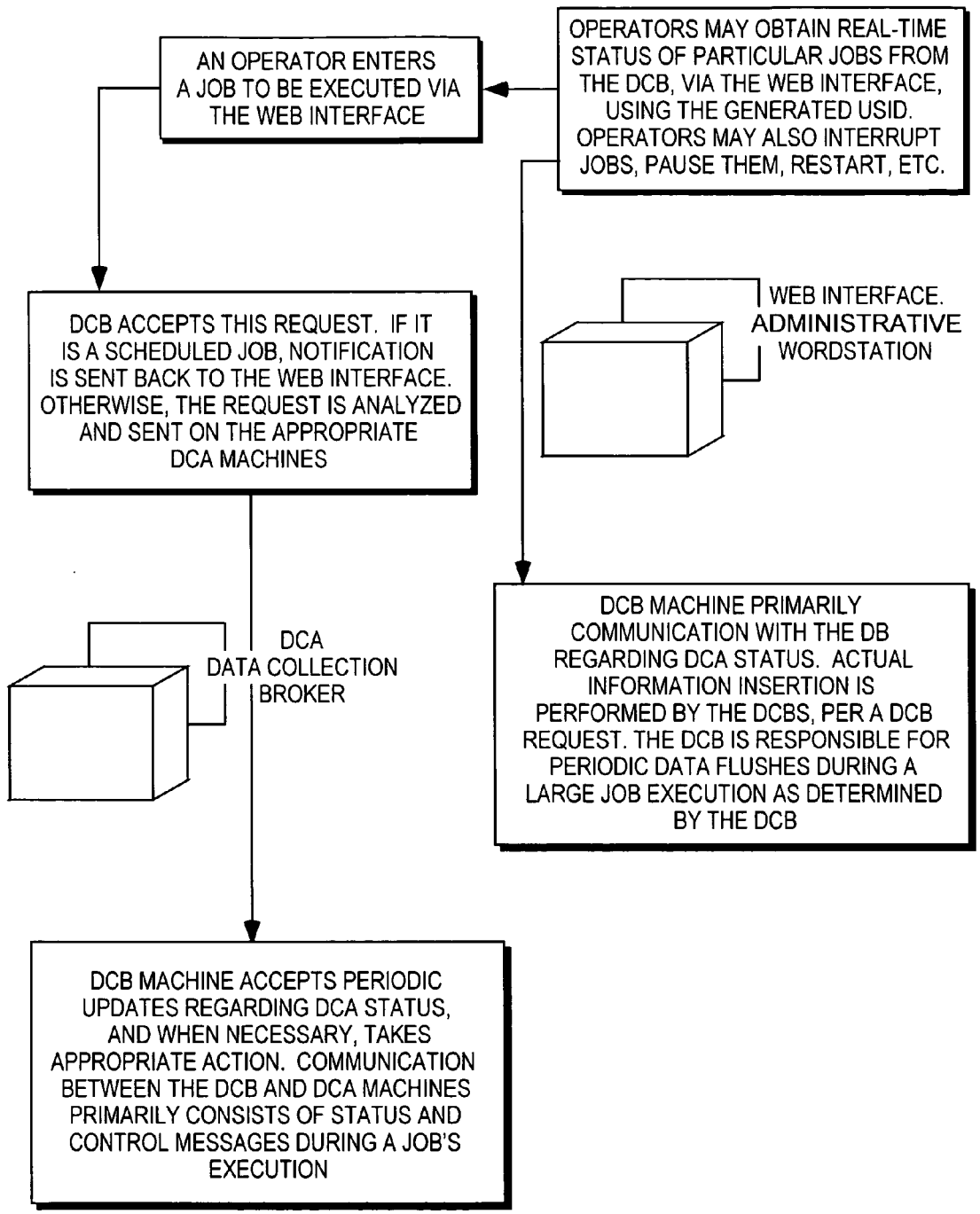
FIG. 7 is a flowchart illustrating operation of a data collection broker, according to an exemplary embodiment of the present invention, upon receipt of a job request from a user via an interface.

Each data collection broker 22 further stores raw data (geolocation information) into the data collection database 26, performs load balancing of requests across multiple data collection agents 18, performs administrative functions with respect to data collection agents 18 (e.g., requests stops, starts, status etc.) and performs various internal administrative functions (e.g. start, stop, restart, load). FIG. 7 is a flowchart illustrating functioning of a data collection broker 22, according to an exemplary embodiment of the present invention, upon receipt of a job request from a user via a Web interface or any other interface.

Figure 8:
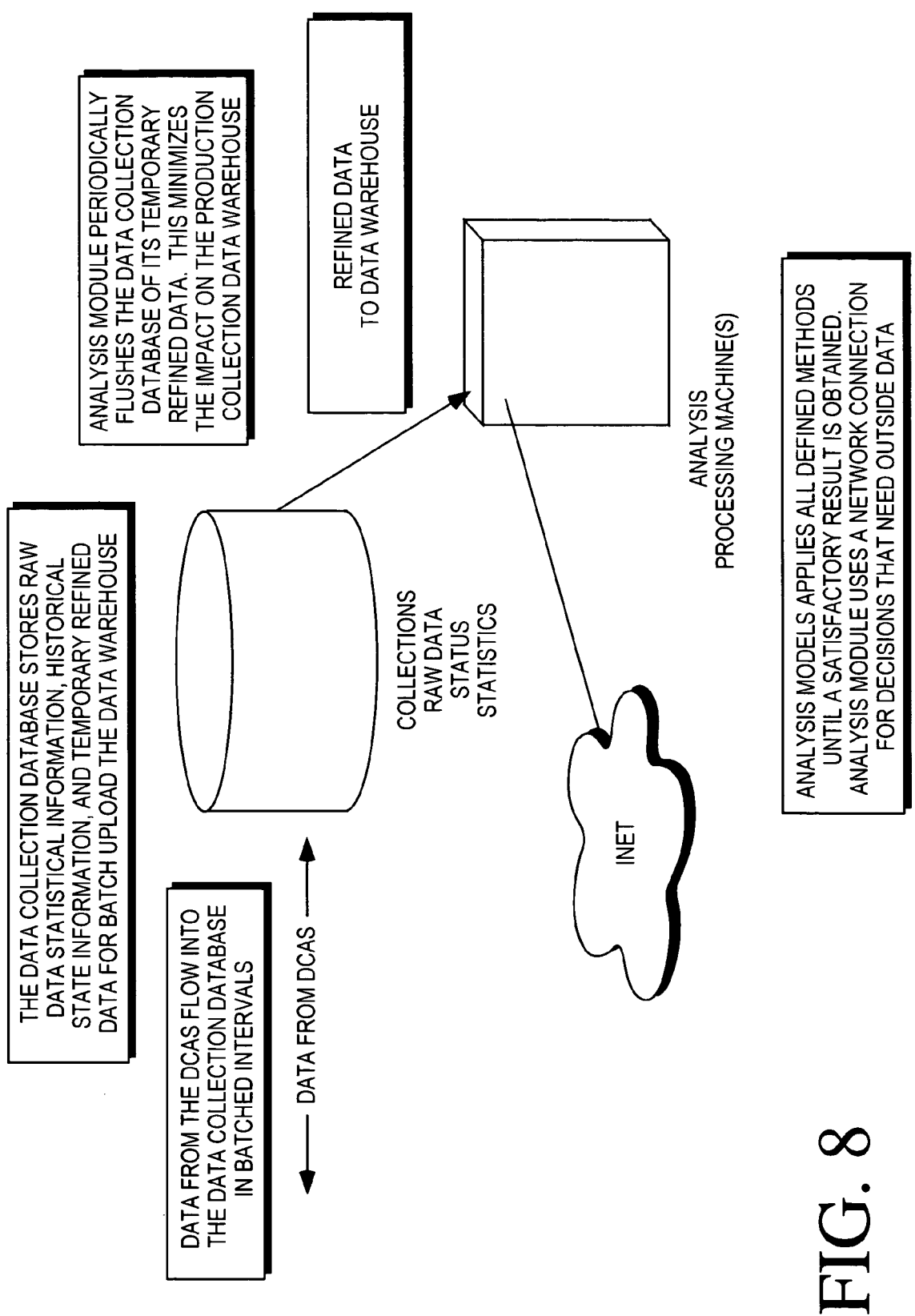
FIG. 8 is a diagrammatic representation of operation of an analysis module, according to an exemplary embodiment of the present invention.

The analysis module 28, according to one exemplary embodiment, operates to extract raw data from the data collection database 26, process the data according to one or more analysis algorithms (or modules) to generate a location probability table, and to store results and the raw data into the data warehouse 30. FIG. 8 is a diagrammatic representation of operation of the analysis module 28, according to an exemplary embodiment of the present invention.

The delivery engine servers 64 except queries (e.g., in XML format), return responses, lookup query information in a main memory database, report statistics to flat files for the data processing, respond to administrative functions, and except push updates to create second run-time databases and perform switchover.

The delivery servers 64 operate to scan content within the data warehouse 30, creating specific service offerings (e.g., North America, by continent, by country), and push content out to the delivery engine servers 64.

Data Collection

As described above, each of the data collection agents 18 may implement one of multiple data collection processes to obtain raw geolocation information. These data collection processes may, in one exemplary embodiment of the present invention, access any one or more of the following data sources:

Net Whois Record: The Net Whois record is an entry in a registry that tracks ownership of blocks of Internet Protocol (IP) addresses and address space. Such records are maintained by RIPE (Reseaux IP Europeens), APNIC (Asia Pacific Network Information Centre), ARIN (American Registry of Internet Numbers), and some smaller regional Internet registries. For instance, the IP network address 192.101.138.0 is registered to Western State College in Gunnison, Colo.

DNS Whois Record: The DNS Whois record is an entry in a registry that tracks ownership of domain names. This is maintained by Network Solutions, Inc. For instance, quova.com is registered to Quova, Inc. in Mountain View, Calif.

ASN Whois Record: An ASN Whois record is an entry in a registry that tracks autonomous systems. An autonomous system (AS) is a collection of routers under a single administrative authority using a common Border Gateway Protocol for routing packets. ASN databases are maintained by a number of organizations.

DNS Loc Record: Occasionally, a DNS Location (Loc for short) record is stored, which indicates the precise latitude, longitude, and elevation of a host.

Traceroute: A traceroute shows the route of a data packet from a data collection machine to a target host. Much information can be derived from the analysis of a traceroute. For instance, if hop #10 is in California, and hop #13 is in California, then with increased certainty, it can be inferred that hops #11 and #12 are also in California.

In addition to the above data that may be collected by the data collection agents 18, the analysis module 28 may also utilize the following information sources in performing an analysis to estimate a geographic location for network address:

Hostname: An IP network address is often tied to a hostname. The hostname may have information indicative of location. Carriers typically implement this to more easily locate their own hardware. For instance, bbr-g2-0.sntc04.exodus.net is in Santa Clara, Calif.; 'sntc' is Exodus' abbreviation for Santa Clara.

Demographic/Geographic Data: Implicit in much of the decision making processes is information about the different locations of the world. The analysis module 28, in one embodiment, utilizes a demographic/geographic database 31, shown in FIGS. 1B and 2 to be part of the data warehouse 30, storing a city record for every city in the U.S.A. and all foreign cities with populations of greater than 100,000 people. Tied to each city are its state, country, continent, DMA (Designated Marketing Area), MSA (Metropolitan Statistical Area), PMSA (Primary Metropolitan Statistical Area), location (latitude & longitude), sets of zip/postal codes, congressional districts, and area codes. Each city record also has population and a connectivity index, which is based on the number of major carriers that have presence in that city.

Analysis Module

Figure 9A:
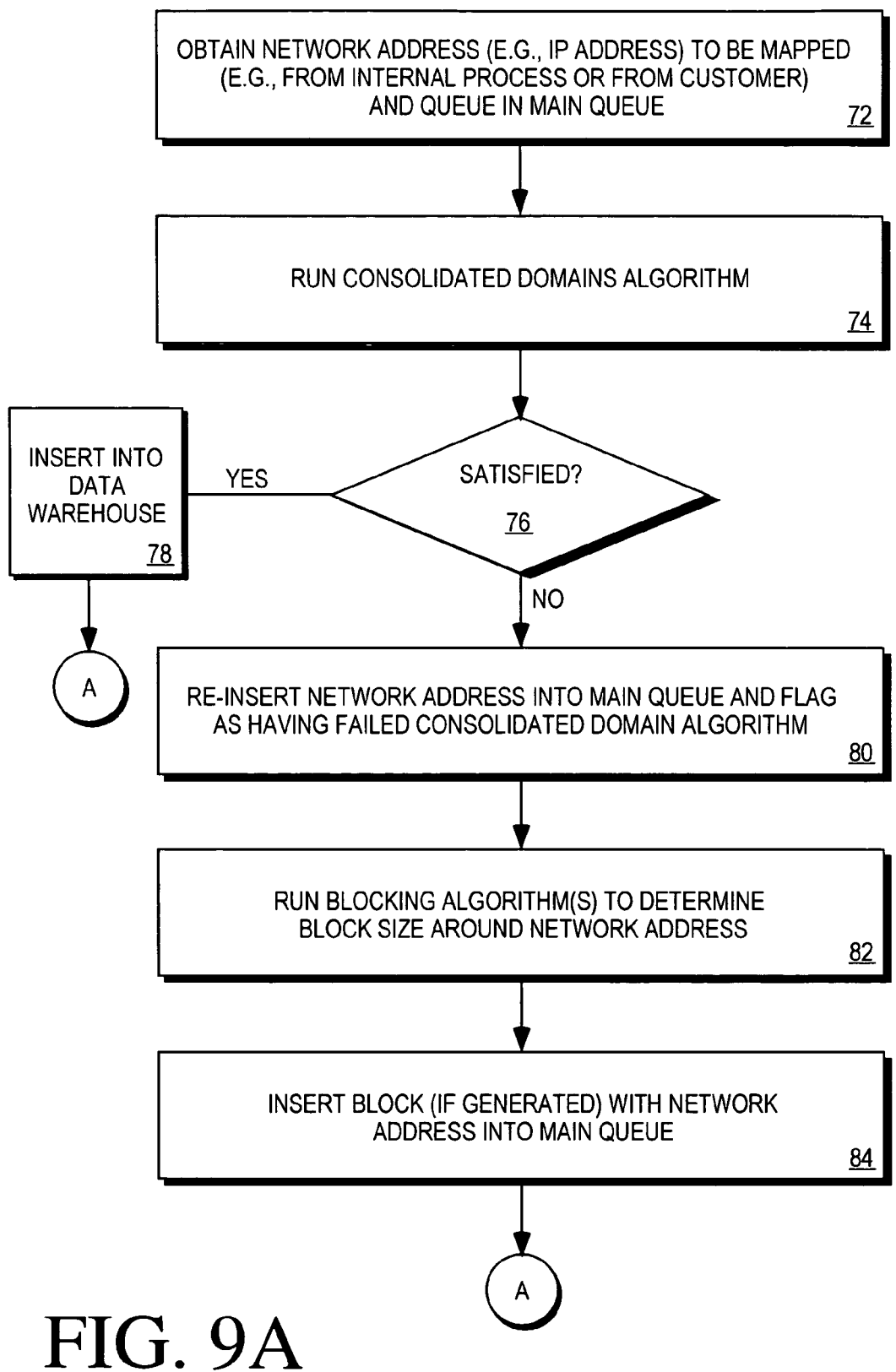
FIGS. 9A and 9B show a flowchart illustrating a method, according to an exemplary embodiment of the present invention, of tiered estimation of a geolocation associated with a network address.
Figure 9B:
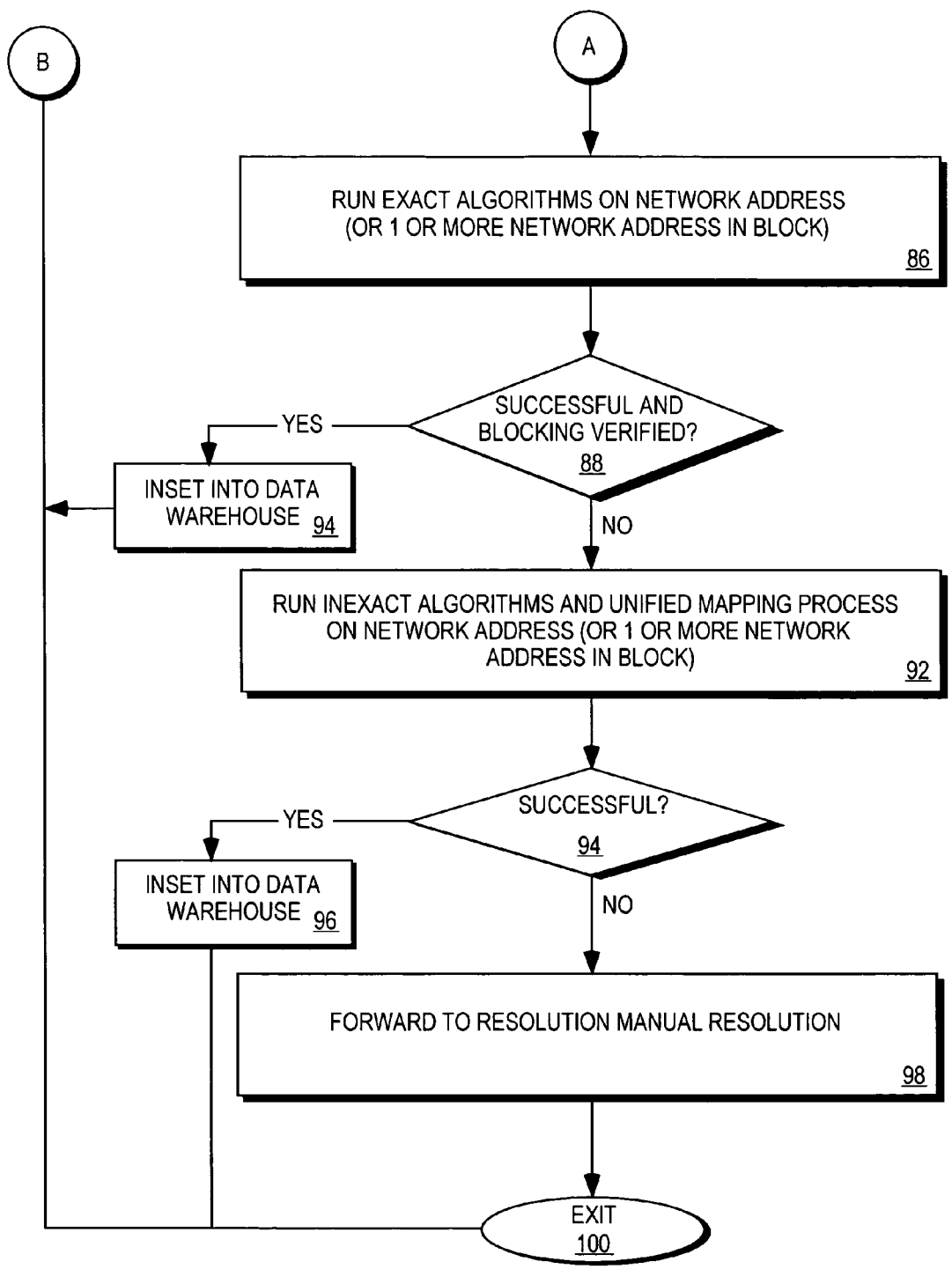
Figure 11:
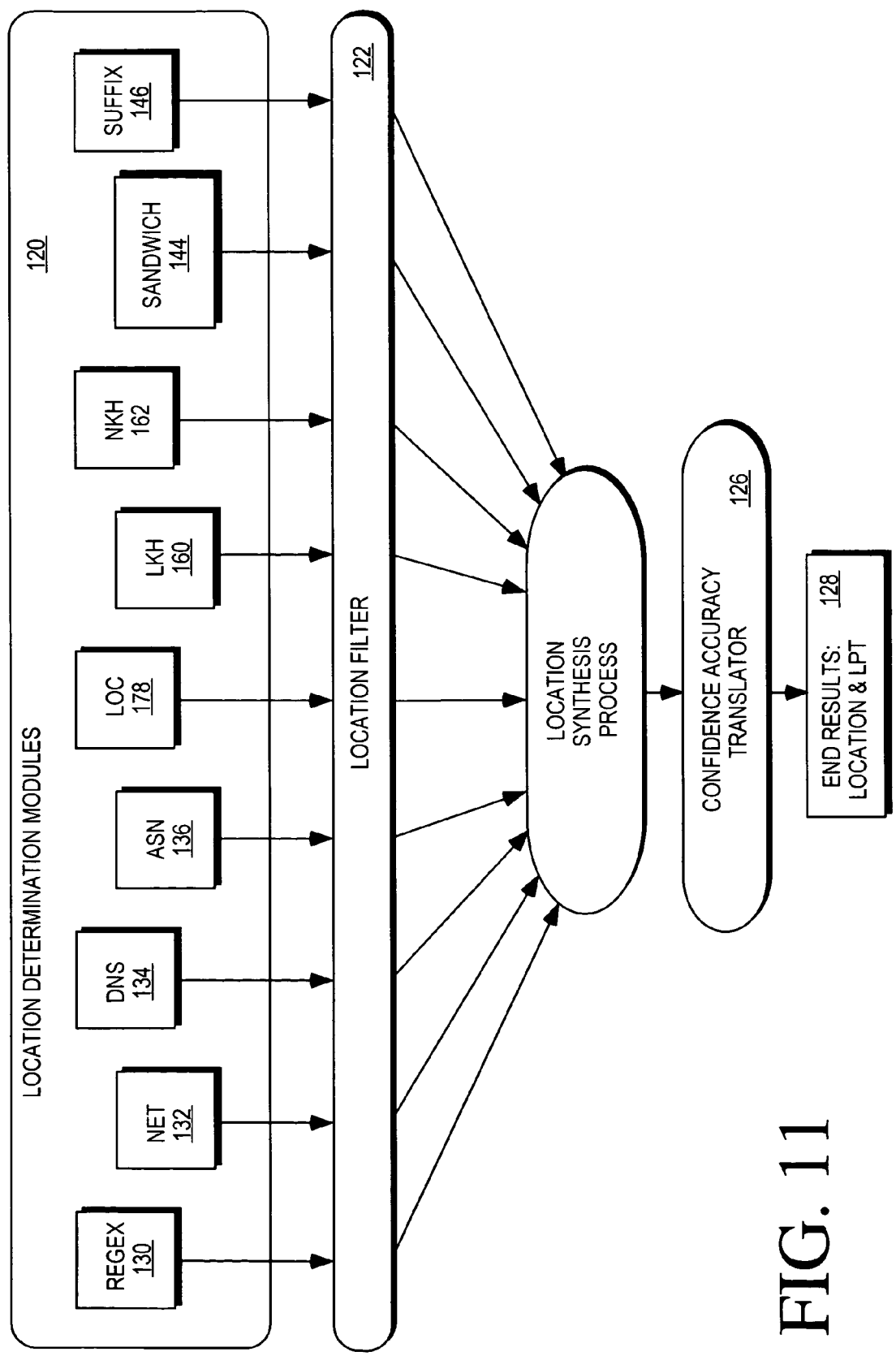
FIG. 11 is a block diagram illustrating a process flow for a unified mapping process, according to an exemplary embodiment of the present invention.

As illustrated in FIG. 2, the analysis module 28 includes a collection of blocking algorithms 63, a unified mapping process 61, and a consolidated domains algorithm 65. FIGS. 9A and 9B show a flowchart illustrating a method 70, according to an exemplary embodiment of the present invention, of tiered estimation of the geolocation associated with a network address. Specifically the tiered estimation of a geolocation employs a number of exact processes and, if the exact processes fail, a number of inexact processes. In an alternative embodiment of the present invention, no distinction is made between exact and inexact processes (as shown in FIG. 11), and all processes are regarded as being located on a common tier. The method 70 is performed by the analysis module 28, and employs each of the algorithms 61, 63 and 65.

The method 70 commences at block 72 with the obtaining of a network address (e.g., an IP address) to be mapped. This network address may be received from an internal process performing an automated mapping operation (e.g., updating the geolocation information associated with a specific IP address), or from an external source (e.g., a customer that requires geolocation information concerning an IP address). The obtained network address is then queued within a main queue.

At block 74, the consolidated domain algorithm 65 is run. Specifically, a network address is removed from the main queue, and tested to determine whether it is likely to fall within a consolidated domain. If the tests of satisfied, as determined at decision block 76, the relevant network address and the geolocation information determined by the consolidated domains algorithm 65 are written to a record within the data warehouse 30 at block 78.

The consolidated domain algorithm 65 utilizes the fact that some domains have all of their IP network addresses concentrated in a single geographic location. The domain suitability is judged by the algorithm 65 on the basis of other domain properties other than size. Such domains typically include colleges and universities (except those that have multiple campuses), small businesses that are known to be located in a single location, government labs, etc.

Examples of domains that may be utilized by the algorithm 65 include:

The ".edu" domain: Because of the nature of educational institutions, ".edu" domains are typically consolidated domains. An extensive list of ".edu" domains can be obtained from web resources (by looking up the appropriate categories under the main search engines). IP lists (from web-server access logs, etc.) can also be translated to names and checked for an ending ".edu". Then they can be sorted into unique names.

Local businesses: The major web search engines also list local businesses for each area.

Local Internet Service Providers (ISPs): Some Internet Service Providers are local to only one region.

Government laboratories: A number of government laboratories satisfy the consolidated domain criterion.

The above described method may encounter domain names that contain extraneous information (e.g., "glen.lcs.mit.edu"), when in fact the domain name required is "mit.edu". In general, the name behind the ".edu." entry is part of the domain but everything before it is extraneous (note that this will include .edu domains in other countries). This also holds for government labs ("x.gov"), and commercial ("x.com"). Names derived from the above methods are pre-processed to truncate them to the appropriate domain name according to the above rules.

Returning to FIG. 9A, if the conditions of the consolidated domain algorithm remain unsatisfied, at block 80, the relevant network address is reinserted into the main queue, and flagged as having failed to satisfy the conditions imposed by the consolidated domain algorithm 65.

At block 82, one or more of blocking algorithms 63 are executed to determine a network address block size around the relevant network address. Further details regarding exemplary blocking algorithms 63 are provided below. A blocking algorithm 63 performs a check of neighboring network addresses to find the expanse of a "block" of network addresses that share common information (e.g., a common subnet segment). The identification of a block of network addresses is useful in that information regarding a particular network address may often be inferred from known information regarding neighboring network addresses within a common block.

At block 84, if a block of network addresses associated with a subject network address is identified, this block of network addresses is then inserted into the main queue for further processing in association with the subject network address.

Moving on to FIG. 9B, at block 86, one or more "exact" geographic location processes (e.g., traceroutes, latency calculations, hostname matching and the DNS Loc LDM) are run to determine whether geolocation information can be determined for the subject network address, and optionally for other network addresses of the block of network addresses. The "exact" processes are labeled as such as they render geolocation information with a relatively high confidence factor. Further, the exact processes may render geolocation information for neighboring network addresses within a block to increase the confidence factor of geolocation information rendered for a subject network addresses.

At decision block 88, a determination is made as to whether the exact processes with successful in generating geolocation information with a predetermined confidence factor, and whether a blocking was verified. If so, at block 90, the network address and the determined geolocation information are written into a record within the data warehouse 30.

On the other hand, following a negative determination at decision block 88, the method 70 progresses to block 92, where a series of "inexact" geographic location operations (or algorithms) are executed on the subject network address, and optionally on one or more network addresses within an associated block. The "inexact" processes are labeled as such in view of the relatively lower confidence factor with which these inexact processes render geolocation information associated with a network address. In one exemplary embodiment, a number of inexact processes are executed on a number of network addresses surrounding a subject network address, and the outputs of these inexact processes are consolidated by the unified mapping process 61, which considers the output from each of the number of inexact processes (e.g., the below discussed Location Determination Modules (LDMs)). Further details are provided below.

At decision block 94, a determination is made as to whether the inexact processes generated a predetermined confidence factor for geolocation information for the subject network address. If so, the network address and associated geolocation information are again written into a record within the data warehouse 30 at block 96. On the other hand, following a negative determination at decision block 94, the network address may be forwarded for a manual resolution at block 98. The method 70 then exits at block 100.

Queuing

Queuing interfaces exist for both processes (e.g., scripts or algorithms) scripts that enter items into the main queue discussed above, as well as for processes that remove items form the main queue.

When a "block" of network addresses is successfully entered into the data warehouse 30 by an exact algorithm at block 90, the entire main queue is searched for entries that fall within that block of network addresses. These entries are then be removed because they are part of a block that is known to be accurate. If a block of network addresses is entered the data warehouse 30 with a high confidence factor, the main queues are searched for entries within that block. These entries can then be forwarded to a quality assurance queue (not shown).

Blocking

As stated above, one or more blocking algorithms 63 are executed at block 82 shown in FIG. 9A to identify a "block" of network addresses surrounding a subject network address that may share common information or characteristics with the subject network address. Three exemplary blocking algorithms 63 to perform a blocking operation around a subject network address are discussed below, namely: (1) a divide-and-conquer blocking algorithm; (2) a netmask blocking algorithm; and (3) a blocking algorithm that utilizes RTP tables, BGP tables, and ISP topology maps. As is described with reference to blocks 86 and 92, once an entire network segment has been blocked, the entire network segment can be processed by the exact and inexact processes, and return one complete record for each network that he stored within the data warehouse 30. This is advantageous in that the number of hosts that are required to be processed is reduced, and the amount of data that is required to be collected is also reduced.

The divide-and-conquer blocking algorithm receives a subject network address, and possibly the associated information (e.g. location), and checks neighboring network addresses to find the extent of the block of network addresses that share the common information. The algorithm starts with a first test network address halfway to the end of a block and test with a predicate to determine whether the first test network address has same information as the subject network address. The "distance" between the subject network address and the first network address is then halved and the result added to the current distance if the answer was positive, or subtracted from the current distance if the answer was negative. This process is repeated until the distance offset is one. The divide-and-conquer blocking algorithm then returns to the top end of the block and, after competing an iteration, returns to the bottom end of the block.

The following exemplary Perl code implements a divide-and-conquer algorithm on the IP network address space:

```perl
#!/usr/local/bin/perl

# Script to figure out the blocks for us given an IP

# Target IP is expected as the first parameter

# define a couple of simple helper procedures

sub int2ip {
    local ($i, $a, $b, $c, $d);
    $i = @_[0];
    $a = int($i / (256*256*256));
    $i = $i % (256*256*256);
    $b = int($i / (256*256));
    $i = $i % (256*256);
    $c = int($i / 256);
    $i = $i % 256;
    $d = $i;
    return ("$a.$b.$c.$d");
}
sub ip2int {
    split /\./, @_[0];
    return (@_[0]*256*256*256 +
            @_[1]*256*256 +
            @_[2]*256 +
            @_[3]);
}

# Let's start!

$ip = $ARGV[0];
$ipn = ip2int($ip);
# set the distance to the initial value and let's go
$offset = 256*256*256 - $ipn;
$offset = int ($offset / 2);
$dist = $offset;
# do successive approximation for the top end of the block
while ($offset > 0) {
    $test_ip = int2ip($ipn + $dist);
    $offset = int($offset / 2);
    if (test_pred($test_ip, $ipn)) {
        $dist = $dist + $offset;
    } else {
        $dist = $dist - $offset;
    }
}
$top = int2ip($ipn + $dist);
# set the distance to the initial value and let's go
$offset = int ($ipn / 2);
$dist = $offset;
# do successive approximation for the bottom end of the block
while ($offset > 0) {
    $test_ip = int2ip($ipn - $dist);
    $offset = int($offset / 2);
    if (test_pred($test_ip, $ipn)) {
        $dist = $dist + $offset;
    } else {
        $dist = $dist - $offset;
    }
}
$bottom = int2ip($ipn - $dist);
# $bottom and $top now contain the lower and upper bounds
# of the block respectively
```

Note should be taken of the call to test_pred( ). This takes an IP network address and returns true if this IP network address shares the same information (i.e., is part of the same block) as the subject IP network address.

The function of the test predicate is to discover if the new network addresses explored by the divide-and-conquer algorithm belong to the same block as the subject network address. There are a number of exemplary ways in which this test predicate can be implemented. For example:

Obtaining a location: The unified mapping process 61 can be run on the test network address to derive a location and this location can be matched against the location of the subject network address. This imposes a relatively large-overhead per iteration of the divide-and-conquer algorithm.

Traceroute information: If the subject network address and the test network address follow the same route (modulo the last hop) then the network addresses are part of the same block.

DNS service: This test renders a positive result if the test network address and the subject network address use the same DNS server.

It will be appreciated that a number of other test predicates may be devised to implement blocking.

The netmask blocking algorithm, according to an exemplary embodiment of the present invention, relies on the assumption that a subnet will generally not be spread over multiple locations. If parts of a block of network addresses are in differing locations, such network addresses typically require a long-distance line and a switch or router to handle the traffic between locations. In such situations, it is generally more convenient to divide the network into a number of subnets, one for each location. Subnets in effect form a lower bound on the block-size. Therefore, blocking can be performed by obtaining the netmask (and therefore the subnet bounds) for a given network address (e.g., an IP address). Netmask's may be obtained from a number of sources, for example:

Obtaining netmasks by Internal Control Message Protocol (ICMP): One of the ICMP control packets is a request for the netmask of a particular interface. Normally, the ICMP specification states that an interface should respond to such a packet only if the appropriate flag has been set. However, there are a number of implementations of ICMP that are broken so that the interface will respond promiscuously.

Obtaining netmasks by Dynamic Host Configuration Protocol (DHCP): On dialing up to an ISP, a machine usually sends a DHCP request to obtain its network configuration information. Included in this information is a netmask. Monitoring the DHCP response (or in the case of Linux, an "ifconfig" call) will reveal this netmask. An automated script that does either is included in the dialup scripts to derive blocking information as mapping by the ISP dialup method occurs. Because the subnets may be subsets of the actual block, multiple dialup sessions may have to occur before the complete block is revealed.

Turning now specifically to the Internet, the smallest subnet that is usable on the Internet has a 30-bit subnet mask. This allows two hosts (e.g., routers) to communicate between themselves. Below is an example of a Class C Network that has been subnetted with a 30-bit subnet mask:

(1) First network with a 30-bit subnet mask:

x.x.x.0 Network Address
x.x.x.1 Lowest Usable Host

-continued x.x.x.2 Highest Usable Host
x.x.x.3 Broadcast Address
(2) Second network with a 30-bit subnet mask:

x.x.x.4 Network Address
x.x.x.5 Lowest Usable Host
x.x.x.6 Highest Usable Host
x.x.x.7 Broadcast Address
(3) Third network with a 30-bit subnet mask:

x.x.x.252 Network Address
x.x.x.253 Lowest Usable Host
x.x.x.254 Highest Usable Host
x.x.x.255 Broadcast Address Knowing that the smallest subnet mask is a 30-bit subnet mask, the netmask blocking algorithm can avoid "hitting" the lowest address (i.e., the Network Address) and the highest address (i.e., the Broadcast Address) of a subnet by stepping through the address space. This technique allows the netmask blocking algorithm to avoid automatic security auditing software that may incorrectly assumed a SMURF attack is being launched.

Only two hosts per subnet/network are required by the netmask blocking algorithm to determine if it has been "subnetted" or not, provided that the IP network addresses are sufficiently far apart.

The below described algorithm provides at least two benefits, namely (1) that the data collection process becomes less intrusive and (2) a performance benefit is achieved, in that by limiting the number of hosts that are processed on each network, it is possible to "process" a large network (e.g., the Internet) utilizing a relatively small data set.

Figure 10A:
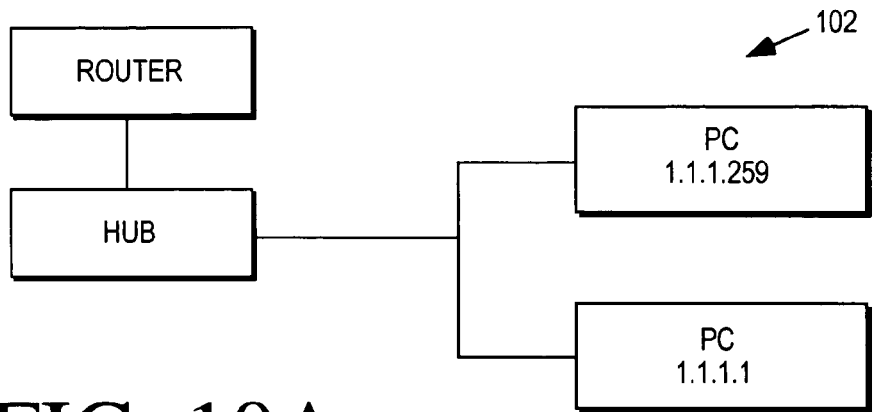
FIGS. 10A and 10B illustrate exemplary networks, a first of which has not been subnetted, and a second of which has been subnetted.

Consider the example of a Class C network that is not subnetted, such as that illustrated at 102, in FIG. 10A. This can be determined by collecting traceroute data from a low host (e.g., less than 128) and a high host (e.g., greater than 128) by examining the next-to-last hop in both traceroute's, it is observed that both trace hops go through the same next-to-last-hop router, and therefore utilizing the same subnet.

Figure 10B:
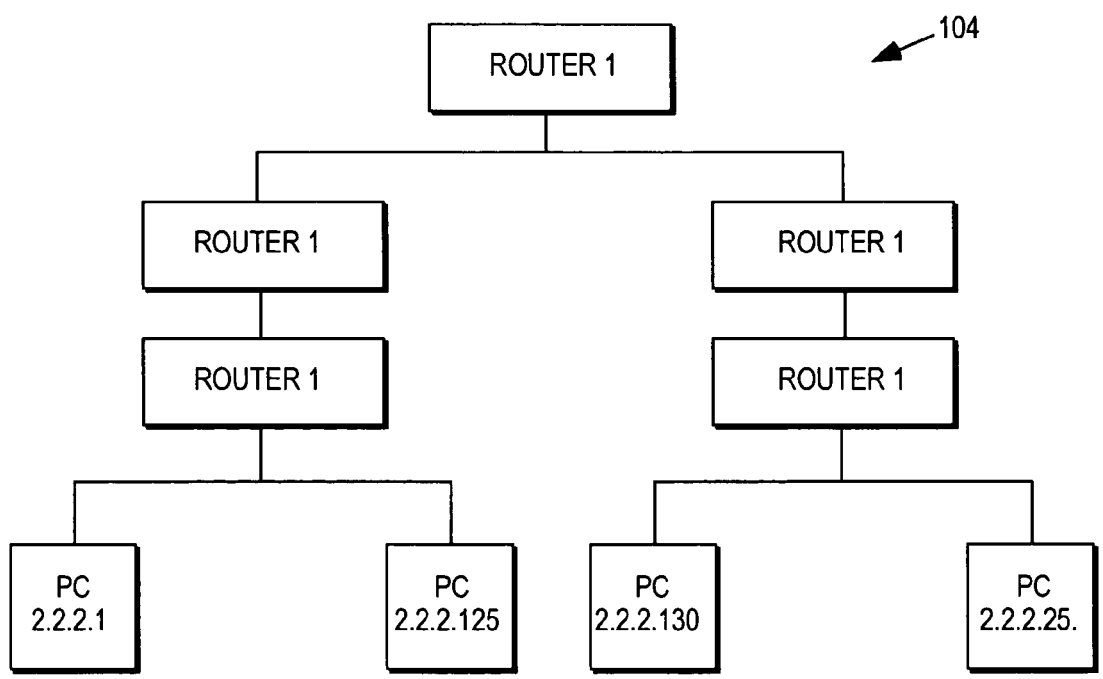

FIG. 10B is a diagrammatic representation of a Class C network 104 that has been subnetted. In this example, it is assumed that traceroute data for the network addresses 2.2.2.1 and 2.2.2.254 has been collected and is known. By looking one hop back, it can be determined that the network has been subnetted. Since the network is identified as being subnetted, additional host will be required. For example in a Class C network, 256 hosts may be divided over multiple locations. For example, IP addresses 1-64 may be in Mountain View, 65-128 may be in New York, 129-and 92 may be in Boston, and 123-256 are in Chicago. This example, even though a network block is registered as a Class C network to an entity, multiple records are required to accurately represent the data since there are multiple locations for the entity. In this case, 4 records are required. The netmask blocking algorithm accordingly starts looking for hosts at the high end of the lower network, and inversely for the low end of the high network. Assuming that responses are obtainable from the hosts in the network illustrated in FIG. 10A, it can be determined by the subnet blocking algorithm that the Class C network has been subnetted once. Another way of determining this outcome would be to view the relevant network as two 25-bit networks, rather than a single 24-bit network.

This technique of "divide and conquer", combined with more selective pinging/tracerouting allows the subnet blocking algorithm to create a reduced impression in security logs of networks.

A further consideration is a situation in which a traceroute is obtained to a router that has an interface on an internal network. In this case, the traceroute will stop at the routers external interface. This may result in the blocking of a network multiple times. In order to address this problem, a determination is made by the subnet blocking algorithm as to whether the end node of a traceroute is the same as the next-to-last hop of other traceroutes on the network. If so, the above described situation is detected.

Digital Subscriber Line (DSL) and cable modems do not appear to routers when they have multiple interfaces. This can result in the creation of false results. To address the situation, the subnet blocking algorithm looks for patterns in the last three hops. By looking at this information, the algorithm is able to determine appropriate blocking for the high-speed modem network.

Some routers also allow for networks to be subnetted to different sizes within a predefined network block. In this situation, a Class C network may be subnetted into two networks, one of which is then further divided into number of smaller networks. To account for the situation, the subnet blocking algorithm verifies every block within two traceroutes. This enables the location of at least one node per network.

A further exemplary algorithm may also perform blocking utilizing RIP tables, BGP tables and ISP topology maps. The division into blocks that are routed to a common location stems from the way routing is performed. Availability of the internal routing tables for an Autonomous System, or a topology map for an ISP, may be utilized to obtain the block information as such tables and maps explicitly named the blocks that are routed through particular routes.

Using RIP and other internal routing tables: Routing tables have a standard format. Each route consists of a network prefix and possibly a netblock size, along with the route that IP addresses belonging to that netblock should follow and some metrics. The values of interest for blocking are the netblock and the netblock size. A script extracts the netblock and netblock size for each route in the table, and then either obtains an existing location or geolocates one IP network address in the block by any of the existing methods and enter the result into the data warehouse 30.

Using BGP routing tables: BGP routing tables have the same structure as internal routing tables with minor exceptions. All routes in the BGP table have a netblock size associated with them, and the route is given in terms of AS paths. Most routes within a BGP table are of little use in determining a block because they do not take into account the routing performed within an Autonomous System. However, BGP tables contain a large number of exception routes. Very often, the blocks corresponding to these routes represent geographically compact domains, and the netblock and netblock size can be used as extracted from the BGP table. Exception routes can be recognized easily since they are subsets of other routes in the table. For example:

24.0.0.0/8 . . .
24.32.0.0/24 . . .

The second route in the above example is a subset of the first route and is by definition an exception route.

(3) Using ISP topology maps: ISP topology maps usually contain the netblocks that each router handles. These can be used as above. The format is non-standard and requires decoding. A dedicated scripts created each topology map operates to parse these topology maps.

(4) Obtaining Internal Routing Tables: These tables can be obtained by strategic alliances with ISPs. It is also possible obtain these by dialing up to an ISP account and running the same routing protocols as the ISP network. This may convince the ISP routers that a dialog machine is also a router and the ISP routers may release internal routing tables.

(5) Obtaining BGP routing tables: Various sites on the web related to global routing release their copies of the global BGP routing table.

(6) Obtaining ISP topology maps: These can be obtained by alliances with an ISP.

The Unified Mapping Process (60)

The unified mapping process 61 operates to combine the results of a number of mapping methodologies that do not yielded exact results (e.g., combines the results of the inexact algorithms). In one embodiment, the unified mapping process 61 takes into account all information available from such methodologies, and a probability (or confidence factor) associated with each, and establishes a unique location. The associated probability that serves as a confidence factor for the unique location.

In one embodiment, the unified mapping process 61 is implemented as a Bayesian network that takes into account information regarding possible city and the state locations, results conflicts (e.g., there may be contradictory city/city indications or inconsistent cities/state combinations, and calculates) a final unique location and the associated probability.

A probability for each of a number of possible locations that are inputted to the unified mapping process 61 is calculated utilizing the Bayesian network, in one exemplary embodiment of the present invention. For example, if there is one possible location with a very high probability and a number of other possible locations with smaller probabilities, the location with the highest probability may be picked, and its associated probability returned. On the other hand, if they are multiple possible locations with comparable probabilities, these may be forwarded for manual resolution, one embodiment of the present invention.

At a high level, the unified mapping process 61 receives a target network address (e.g., an IP address), and then runs the number of non-exact mapping processes as sub-tasks. These non-exact mapping processes then provide input to the Bayesian network. If one of the non-exact algorithms fails, but a majority does not, the Bayesian network will attempt to resolve the network address anyway.

FIG. 11 is a block diagram illustrating a process flow for the unified mapping process 61, according to an exemplary embodiment of the present invention. The unified mapping process 61 is an expert system suite of algorithms used to geolocate a network address (e.g., IP address). The unified mapping process 61 combines a plethora of data from Internet registries (Domain Name Server, Network IP Space, Autonomous System Numbers), Internet network connections (inferred via traceroutes), and world geographical databases (place names, locations, populations). The unified mapping process 61 further constructs a list of possible physical locations for a given network address, and from this list, through fuzzy logic and statistical methodologies, returns a location with a set of associated probabilities that provide an indication regarding the accuracy of that location. In this way, the unified mapping process 61 can tie the network address to a specific geographic location (e.g. a city, country, zip/postal code, etc.) and provide an indication regarding the probability of the specific geographic location being correct.

As shown in FIG. 11, the illustrated exemplary embodiment of the unified mapping process 61 has several components. Utilizing the data that have been gathered by external processes (e.g., the data collection agents 18), a collection 120 of the location determination modules (LDMs) generate (1) location determinants (LDs) for a target address in question, and (2) and associated confidence factor (CF) or likelihood that the location determinant is correct (e.g., indicates a "true" geographic location). The location determinants generated by the collection 120 of location determination modules are then passed through a location filter 122, which, based on certain criteria, removes nonsensical location determinants. After the filtering process performed by the location filter 122, location determinants and their associated confidence factors are passed into the location synthesis process (LSP) 124, where the multitude of different (and similar) location determinants, weighted by their confidence factors, compete against and cooperate with each other, ultimately yielding a unique and most likely location determinate including a "best estimate" geographic location (the location). Based on the degree of similarity between the "best estimate" geographic location and its competing locations, different confidence factors are assigned for the geographic resolution levels, which are transformed by a confidence-accuracy translator (CAT) 126 into a probability of accuracy for the winning location.

Confidence factors are used throughout the processing by the collection 120 of location determination modules and are discussed in detail below. The confidence factors, in one embodiment present invention, come in four varieties (post-CM, post-LDM, post-LSP, and post-CAT), and their meanings are very different. The reader can use the context to determine which confidence factor is being referenced.

There are a number of data points that the unified mapping process 61 utilizes. The specifics of how these are used are discussed below. These are also discussed above with respect to the data collection agents 18.

A location determination module (LDM) is a module that generates a location determinant (LD) or set of location determinants that are associated with the given network (e.g., IP) address. The location determination modules utilize a variety of the available input data, and based on the data's completeness, integrity, unequivocalness and degree of assumption violation, assign a confidence factor for one or more geographic locations. The location determination modules may conceptually be thought of as experts in geolocation, each with a unique special skills set. The location determination modules further make decisions using "fuzzy logic", and then present the output decisions (i.e., location determinants) and associated confidence factors (CFs) to the location filter 122 and location synthesis process 124, where the location determinants are evaluated (or "argued") democratically against the location determinants presented by other location determination modules.

All location determination modules operate it may somewhat similar manner in that they each examine input data, and attempt to generate location determinants with an associated confidence factor based on the input data. However, each location determination module is different in what input data it uses and how the respective confidence factors are derived. For instance, a specific location determination module may extract location information from a hostname, while another analyzes the context of the traceroute; a further location determination module may analyze autonomous system information, while yet another makes use of a DNS Location record. By combining these distinct data inputs, each individually weighted by the parameters that most directly affect the likelihood of the relevant data being correct, the location synthesis process 124 is equipped with a set of data to make a decision.

The location filter 122 operates through the location determinants, received from the collection 120 of location determination modules, which are in conflict with certain criteria. In particular, if a hostname ends with '.jp', for example, the location filter 122 removes all location determinants that are not in Japan. Similarly, if a hostname ends with '.ca.us', the location filter 122 omits location determinants that are not in California, USA.

The location synthesis process 124, in one exemplary embodiment, is responsible for the unification and congregation of all location determinants that are generated by the collection 120 of location determination modules. The location synthesis process 124 searches for similarities among the location determinants and builds a confirmation table (or matrix that indicates correspondence (or agreement) between various location determinants. An intermediate result of this decision making process by the location synthesis process 124 is the location probability table (LPT), an example of which is discussed above. Since determinants may agree and disagree on multiple levels of geographic resolution (i.e. San Francisco, Calif. and Boulder, Colo. differ in city, state, and region, but are similar in country and continent), the location probability table develops different values at different levels of geographic resolution. A combined confidence factor, which is a linear combination of each of the constituent confidence factor fields, is computed and used to identify a most likely location (the winning location) and an associated probability of the winning location being correct.

The values contained in a location probability table, as returned from the location synthesis process 124, are translated by the confidence-accuracy translator (CAT) 126 into a final form. A small subset of the data is run against verification data to compute the relationship between post-LSP confidence factors and accuracy. Given this relationship, the location probability table is translated to reflect the actual probability that the given network address was correctly located, thus completing the process of geolocation.

A discussion will now be presented regarding location determination modules, and fuzzy confidence maps, according to an exemplary embodiment present invention. This discussion provides an understanding of the location determination modules (LDMs) and their dominant decision-facilitating mechanism, namely confidence maps (CMs).

A location determination module generates a location determinant (LD), or set of location determinants, and an associated confidence factor (CF), or set of confidence factors. These location determinants are provided, together with an associated confidence factor, to the location filter 122 and onto the location synthesis process 124, where based on the magnitude of their confidence factors and agreement with other location determinants, are considered in the decision making of the unified mapping process 61. Eight exemplary location determination modules are discussed below. These exemplary location determination modules (LDMs) are listed below in Table 1, together with the source of their resultant location determinant, and are shown to be included within the collection 120 of location determination modules shown in FIG. 11:

TABLE 1

List of exemplary LDMs

| LDM Name | Source of LDM |
|---|---|
| RegEx LDM 130 | String Pattern Matching in a Hostname. |
| Net LDM 132 | IP Registry |
| DNS LDM 134 | Domain Name Server Registry |
| ASN LDM 136 | Autonomous System Registry |
| Loc LDM 138 | DNS Loc Record |
| LKH LDM 140 | Last Known Host in a Traceroute |
| NKH LDM 142 | Next Known Host in a Traceroute |
| Sandwich LDM 144 | Combination of LKH and NKH |
| Suffix LDM 146 | Last One or Two Words of Hostname |

Further details regarding each of the above listed location determination modules will be provided below, and an overview of two exemplary location determination modules will be discussed as an introduction.

The RegEx (Regular Expression) LDM 130, in an exemplary embodiment of the present invention, searches through a hostname and attempts to extract place names (cities, states, or countries) from within it. The host name may be obtained by performing a traceroute, or by issuing a NSLOOKUP or HOST command against a network address. Once the LDM 130 identifies one or more place names, associated confidence factor values (based for example on parameters like city population, number of letters in the string from which the name was extracted, distance to the last known host in a traceroute, etc.) are generated for each of the place names.

The Net LDM 132 returns a geographic location for the network address (e.g., an IP address) as it is registered with the appropriate authority (e.g., ARIN/RIPE/APNIC). The confidence factor assigned to the geographic location is based primarily on the size of the network block that is registered and within which the network address falls, under the assumption that a small network block (e.g., 256 or 512 hosts) can be located in common geographic location, whereas a large network block (e.g., 65,536) is less likely to all be located in a common geographic location.

There are a number of advantages to utilizing confidence factors throughout the inner workings of the unified mapping process 61. By "fuzzifying" the data (e.g., treating every possible geographic location as a viable answer with a confidence factor reflective of its dynamic accuracy), then processing the data, and then "defuzzifying" (e.g., collapsing onto one unique answer), the unified mapping process 61 is able to retain as much information as possible throughout the course of processing data.

The formal translation of input data/parameters into LDM confidence factors happens through relationships known as confidence maps (CMs). These relationships explicitly represent the correlation (or relationship) between input parameters and the likelihood (or probability) that an estimated geographic location for a network address is in fact correct.

Figure 12A:
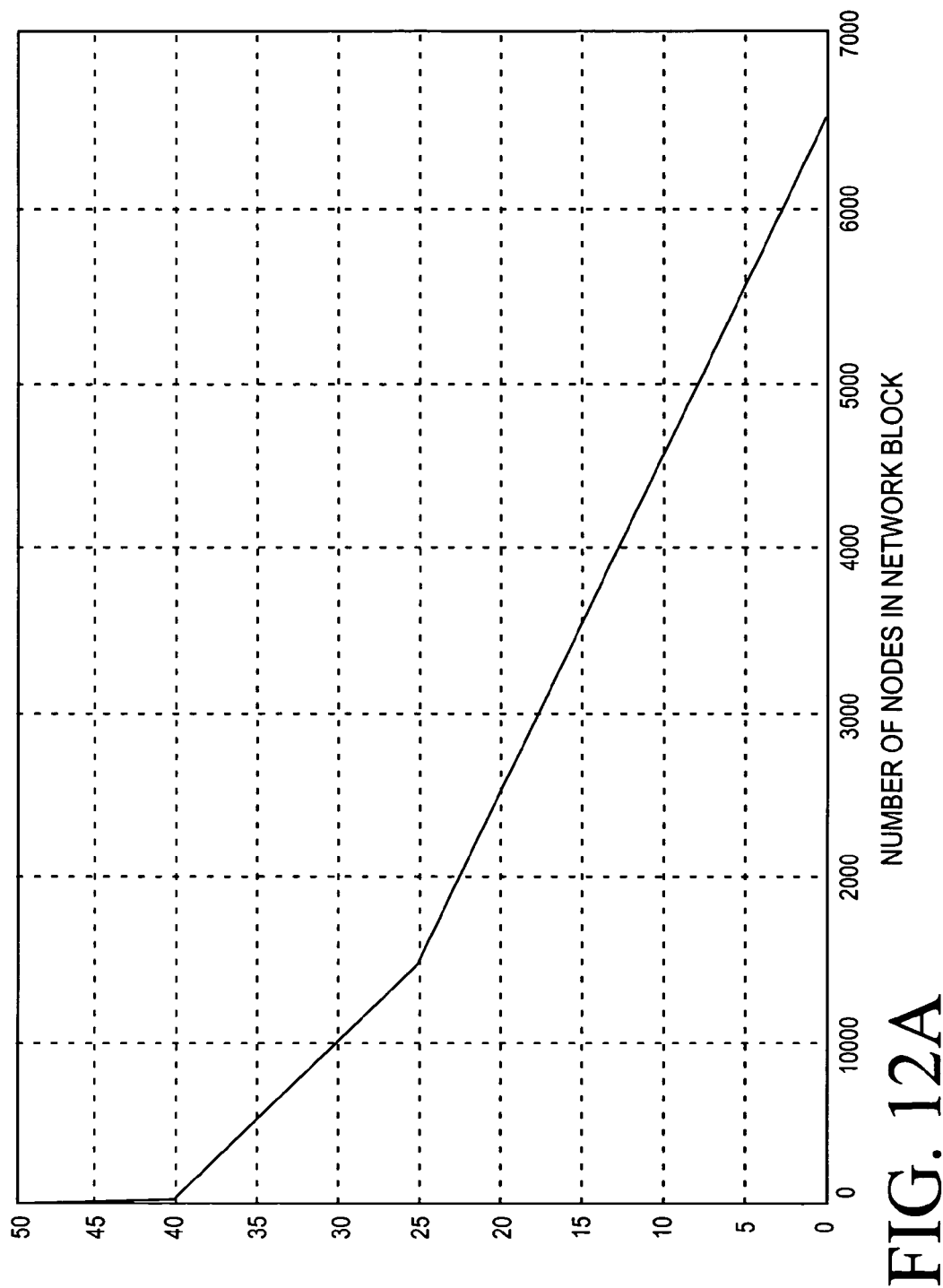
FIGS. 12A and 12B illustrate respective one-dimensional and two-dimensional confidence maps, according to exemplary embodiments of present invention.
Figure 12B:
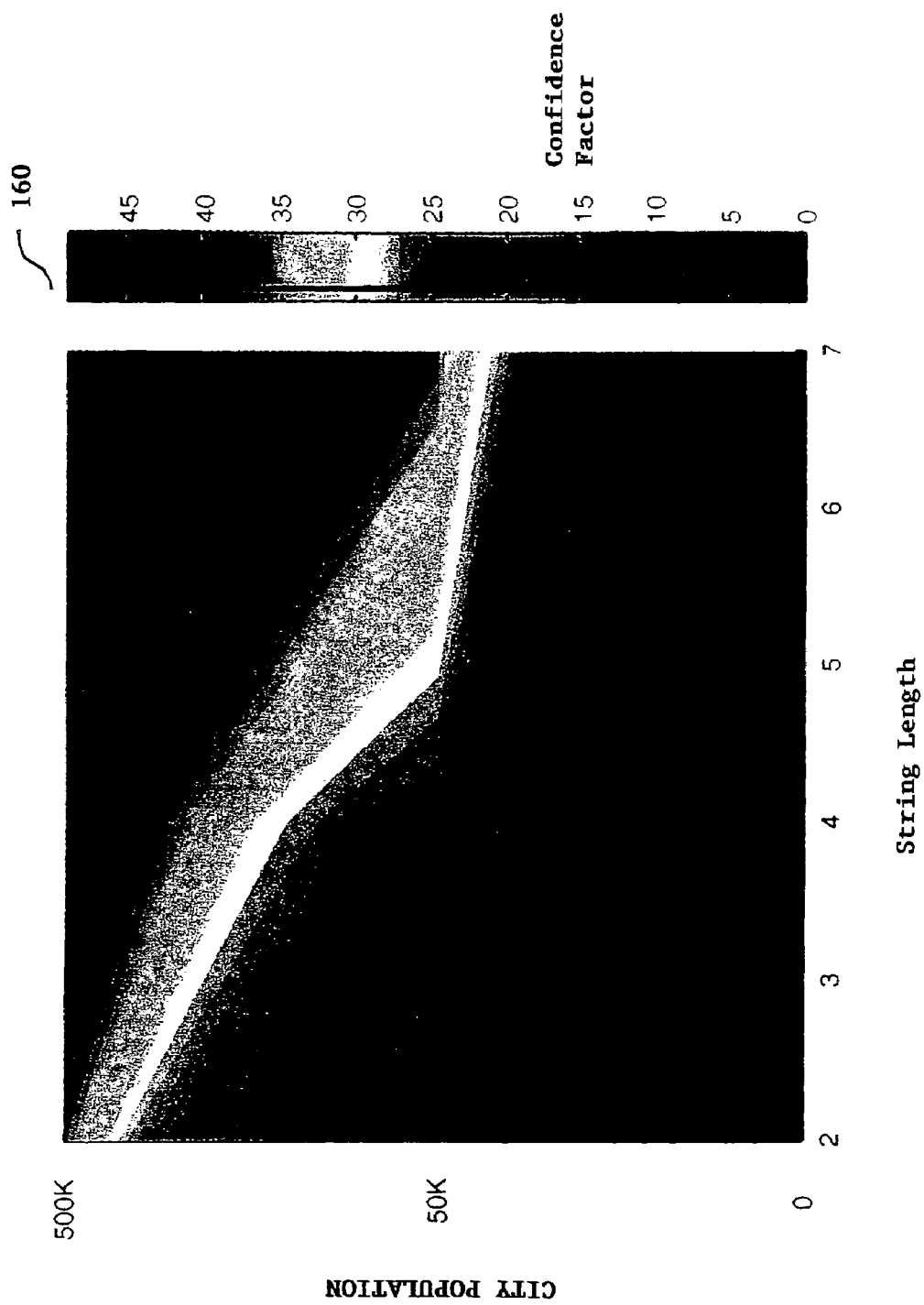

FIGS. 12A and 12B illustrate a one-dimensional confidence map 150 and a two-dimensional confidence map 160 respectively, according to exemplary embodiments of the present invention. Turning first to the one-dimensional confidence map 150, consider the exemplary scenario in which the Net LDM 132 returns a certain city. The question arises as to how the Net LDM 132 can attach a level of certainty (or probability) that the city is a correct geolocation associated with a network address. As stated above, in general, smaller network blocks are more likely to yield a correct geographic location than large ones. Based on this premise, a relationship between (1) the number of nodes within a network block and (2) a confidence level that a particular network address is located in a city associated with that network block can be determined and expressed in a confidence map, such as the confidence map 150 shown in FIG. 12A.

Interpreting FIG. 12A, it can be seen that confidence level for the geographic location is very high if the network block size is small. However, as the size of the network block increases, the confidence level decreases. In an alternative embodiment of the present invention, as opposed using the "fuzzy logic" with confidence values, "crisp logic" may be utilized. The "crisp logic" implementation differs from the "fuzzy logic" implementation in that the "crisp logic" may implements a pass/fail test. For example, rather crisp logic may specify that networks smaller than size x are correctly located and larger than x are incorrectly located. On the other hand, the exemplary "fuzzy logic" implementation represented by the relationship shown in FIG. 12A present the continuum that represents a probabilistic relationship.

While one-dimensional confidence maps 150, such as that shown in FIG. 12A, are good indicators of a likelihood of correct location, there are many cases where a nonlinear interaction between two parameters makes a two-dimensional confidence map 160, such as that shown in FIG. 12B, more appropriate.

Consider the example where a RegEx LDM 130 extracts the strings 'sf' and 'santaclara' out of a hostname. From these, consider that the RegEx LDM 130 generates a number of possible geographic locations: San Francisco, Calif.; San Fernando, Calif.; Santa Fe, N.Mex.; South Fork, Colo.; and Santa Clara, Calif. With such ambiguity, the question arises as to how the unified mapping process 61 may output an estimated geographic location. Again, by constructing an appropriate confidence map 160, such as that shown in FIG. 12B, the unified mapping process 61 is enabled to separate geographic locations of a high probability from those of a low probability. Specifically, the confidence map 160 relates (1) city population (the y-axis) and (2) string length (the x-axis) to (3) a confidence factor (color).

Interpreting the two-dimensional confidence map 160 shown in FIG. 12B, it will be noted that this confidence map 160 attributes a higher confidence factor when the city is large and/or when the string from which unified mapping process 61 extracted the location is long. For example, as 'sf' is a short string and subsequently prone to ambiguity, it does not have the same level of confidence that a long string such as 'santaclara'. However, if there is a large population associated with a specific geographic location, then the weighting of the string length is discounted. For example, the two-dimensional confidence map 160, when applied to the aforementioned examples, yields the following Table 2:

TABLE 2

Example table of results from confidence map

| Location | String Length | Population | Confidence |
|---|---|---|---|
| San Francisco, CA | 2 | 700,000 | 35 |
| San Fernando, CA | 2 | 20,000 | 10 |
| Santa Fe, NM | 2 | 70,000 | 15 |
| South Fork, CO | 2 | ? (<5,000) | 0 |
| Santa Clara, CA | 10 | 90,000 | 40 |

Accordingly, through the use of a single confidence map such as that shown in FIG. 12B, a location determination module (e.g., the Net LDM 132) can separate reasonable location determinants from unreasonable ones. However, as such separation may depend on a large number of factors, and the unified mapping process 61 may utilize a large number of confidence maps.

In one embodiment, each location determination module uses a dedicated set of confidence maps, and combines the results of each confidence map (for each location) by a weighted arithmetic mean. For example, if $cf_i$ is the $i^{th}$ of n confidence factors generated by the $i^{th}$ CM, with associated weight $w_i$, then the combined confidence factor (CCF) is computed according to the following equation:

$$CCF = \frac{\sum_{i=1}^{n} cf_i w_i}{\sum_{i=1}^{n} w_i}$$

Every candidate geographic location must pass through each relevant confidence map and has multiple confidence factors associated therewith combined. Once a location determinant has a combined confidence factor, it no longer uses the multiple individual factors. Specifically, the location determinant and the associated combined confidence factor are communicated to the location filter 122 and subsequently the location synthesis process 124.

In the above examples, a confidence map may not assign a value higher than 50 for confidence factor. Since the combined confidence factor is an average of these, it is also less than 50. If a confidence factor is generated by the location synthesis process to have a value greater than 50, a confirming comparison may take place.

It should also be noted that a specific location determination module may utilize a mix of one-dimensional and two-dimensional confidence maps, each of which has advantages and disadvantages. A one-dimensional confidence maps may lack the ability to treat multidimensional nonlinear interaction, but only requires the one parameter to run. Conversely, a two-dimensional confidence map can consider higher dimensional interaction effects, but if one of the parameters is missing, the confidence map cannot be utilized to generate a confidence factor.

It should also be noted that the location determination modules are truly modular, and that none depend on any other, and they can easily be added, modified, or removed with respect to the unified mapping process 61.

In one exemplary embodiment, as illustrated in FIG. 2, confidence maps 33 are stored within the data collection database 26. The confidence maps 33 are represented either as a matrix, or as a function where an input parameter constitutes a continuum, as opposed to discrete values. To this end, FIG. 12C is an entity-relationship diagram illustrating further details regarding the storage of the confidence maps 33 within the data collection database 26. A reference table 35, which is accessed by an LDM, includes records that include pointers to a matrix table 37 and a function table 39. The matrix table 37 stores matrices for those confidence maps having input parameters that constitute discrete values. The function table 39 stores functions for those confidence maps for which an input parameter (or parameters) constitute a continuum.

RegEx (Regular Expression) LDM Location Generation

Figure 13:
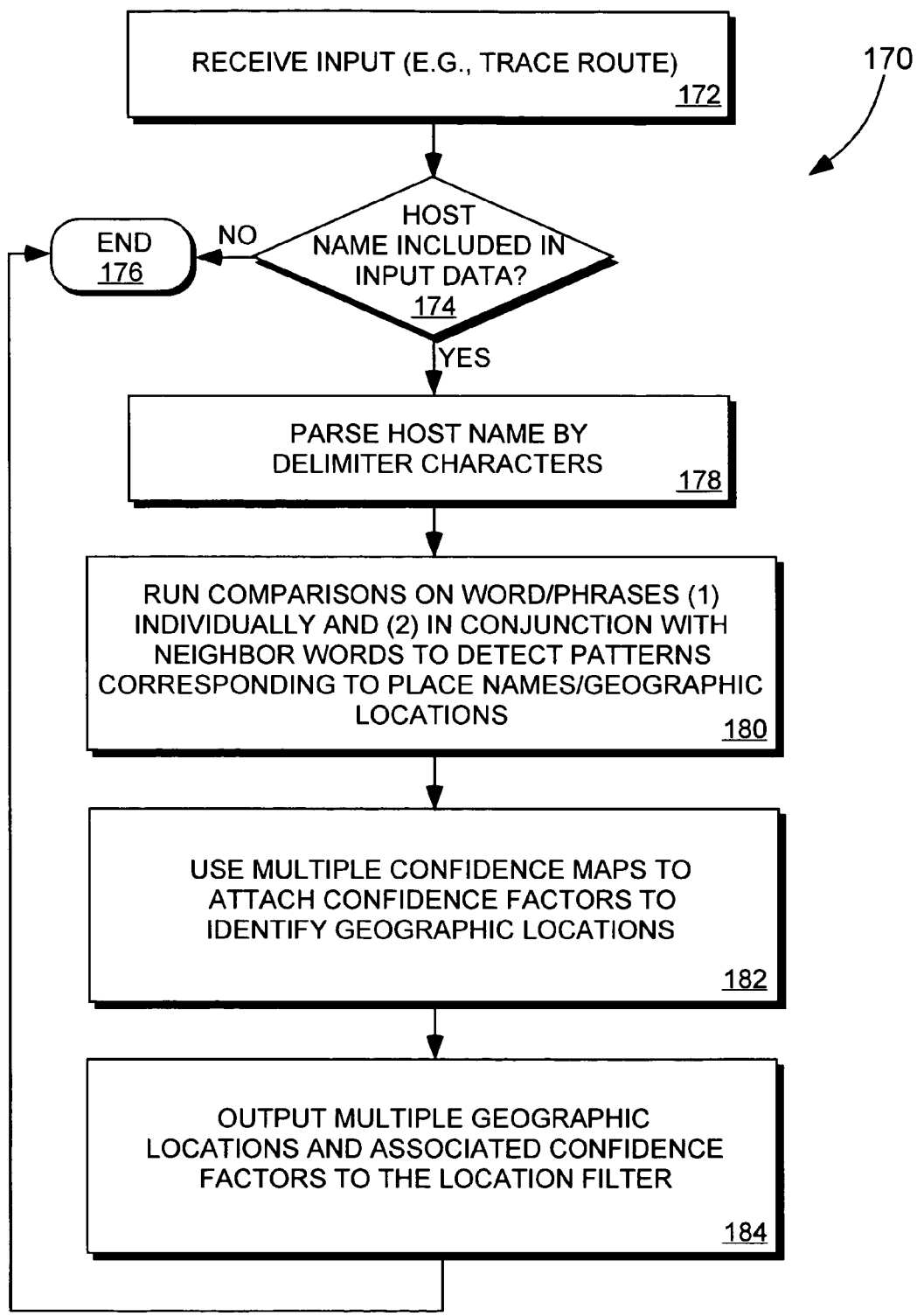
FIG. 13 is a flowchart illustrating a method, according to an exemplary embodiment of the present invention, performed by a RegEx LDM to identify one or more geographic locations associated with network address and associated at least one confidence factor with each of the identified geographic locations.

FIG. 13 is a flowchart illustrating a method 170, according to an exemplary embodiment of the present invention, performed by the RegEx LDM 130 to identify one or more geographic locations for a network address and to associated at least one confidence factor with each of the geographic locations. The RegEx LDM 130 performs a location determination based on searching for string patterns within the host name. Accordingly, the method 170 commences at block 172 with the receipt of input data (e.g., a traceroute or other data collected by the data collection agents 18). At decision block 174, a determination is made as to whether one or more hostnames are included within the input data. If there is no hostname included within the input data (e.g., a traceroute) provided to the unified mapping process 61, the RegEx LDM 130 exits at block 176.

On the other hand, if a hostname is included within input data, then the RegEx LDM 130 at block 178 parses the hostname by delimiter characters (e.g., hyphens, underscores, periods, and numeric characters) to identify words that are potentially indicative of a geographic location.

At block 180, the RegEx LDM 130 runs comparisons on these newly identified words individually, and in conjunction with neighbor words, to check for similarity to patterns that correspond to geographic locations (e.g., place names). In one embodiment, the RegEx LDM 130 accesses the demographic/geographic database 31 contained within the data warehouse 30 to obtain patterns to use in this comparison operation. In one embodiment, the LDM 130 checks individual words, and iteratively "chops" or removes letters from the beginning and end of the word in the event that extraneous characters are hiding valuable information. Strings that are more likely associated with networking and hardware than place names (such as 'ppp', 'dsl', 'isdn', 'pop', 'host', 'tel', etc.) are not included in any pattern matching routines.

Examples of valid patterns, as stored within the demographic/geographic database 31, that may be sought include various combinations of:
1. Full city name;
2. Full state name;
3. Full country name;
4. Two character abbreviation of city name (if and only if city has a two part name);
5. Two character abbreviation of state name;
6. Two character abbreviation of country name;
7. Three character abbreviation of city name (if city has a three part name);
8. First three characters of city name, including vowels;
9. First three characters of city name, excluding vowels;
10. First four characters of city name, including vowels;
11. First four characters of city name, excluding vowels;
12. Airport codes;
13. Common abbreviations for city names; and
14. Alternate spellings for city names.

The RegEx LDM 130 is capable of extracting fairly obfuscated geographic information from hostnames. One of the shortcomings, however, of the history of place naming is ambiguity. The RegEx LDM 130, at block 180, therefore accordingly generally identifies not one but many geographic locations, and generates multiple location determinants.

The following table presents examples of the location determinants that the RegEx LDM 130 may generate from the exemplary host names:

TABLE 3

Example RegEx LDM location determinant construction

| Actual Hostnames | Location Determinants | Rules/Reasons/Patterns |
|---|---|---|
| dyn1-tnt4-1.chicago.il.ameritech.net | Duyan, China<br>Dayuan China<br>Deyang China | Three character, no vowel<br>Full city name |

TABLE 3-continued

Example RegEx LDM location determinant construction

| Actual Hostnames | Location Determinants | Rules/Reasons/Patterns |
|---|---|---|
| | Taunton, Massachusetts, USA<br>Tonto Basin, Arizona, USA<br>Tanta, Egypt<br>Taunton, Minnesota, USA<br>Tuntutuliak, Alaska, USA<br>Tintah, Minnesota, USA<br>Tontitown, Arkansas, USA<br>Tontogany, Ohio, USA<br>Chicago, Illinois, USA<br>Illinois, USA<br>Island Lake, Illinois, USA<br>Indian Lake, New York, USA Israel | Full state name<br>Two character city name<br>Two character country code |
| p3-max50.syd.ihug.com.au | Sydney, Florida, USA<br>Sydney, Australia | Three character |
| c2501.suttonsbay.k12.mi.us | Sutton's Bay, Michigan, USA | Full city name (multiple words) |
| pool-207-205-179-101.phnx.grid.net | Phoenix, Maryland, USA<br>Phoenix, New York, USA<br>Phoenix, Oregon, USA<br>Phoenixville, Pennsylvania, USA<br>Phoenix, Arizona, USA<br>Phoenix, Virginia, USA | Four character, no vowel |
| resaleseattle1-1r7169.saturn.bbn.com | Seattle, Washington, USA | Full city name |
| usera723.uk.uudial.com | United Kingdom | Two character country code |

Through the usage of common abbreviations and alternate spellings, the RegEx LDM 130, for example, also knows to put 'lsanca' in Los Angeles, Calif., and 'cologne' in Köln, Germany.

Because of the large number of location determinants that the RegEx LDM 130 can potentially generate, in one embodiment rules may restrict location determinant generation of trivially small (e.g., low population or low connectivity index) cities from fewer than 4 characters.

The RegEx LDM 130 is particularly suited to identify geographic locations associated with the Internet backbone/core routers. It is not uncommon for a company to make use of the hostname as a vehicle for communicating location. By using typical abbreviations and a geographical database of many tens of thousands of place names, the RegEx LDM 130 is suited to locating these hosts.

The RegEx LDM 130 has the ability to produce a multitude of location determinants for a particular network address. Because the RegEx LDM 130 is suited to identify geographic locations along the Internet backbone it may not, in one embodiment, be heavily deployed in the geolocation of end node targets. Instead, the immediate (router) locations delivered by the LDM 130 may be stored and used by other LDMs of the collection 120, which make use of these results as Last Known Hosts (LKHs) and Next Known Hosts (NKHs).

Returning to the method 170 illustrated in FIG. 13, at block 180, multiple confidence maps are utilized to attach confidence factors to the geographic locations identified and associated with a network address at block 180. Further information regarding exemplary confidence maps that may be used during this operation is provided below.

At block 184, the RegEx LDM 130 outputs the multiple geographic location determinants, and the associated confidence factors, as a set to the location filter 122, for further processing. The method 170 then exits at block 176.

Because of a degree of ambiguity and numerous location determinants that may be returned by the RegEx LDM 130, the LDM 130 employs a relatively large number of confidence maps when compared to other LDMs of the collection 120. The confidence maps employed by the LDM 130, in one exemplary embodiment, relate parameters such as word position, word length, city population, city connectivity, distance of city to neighboring hosts in the traceroute, etc.

Figure 14A:
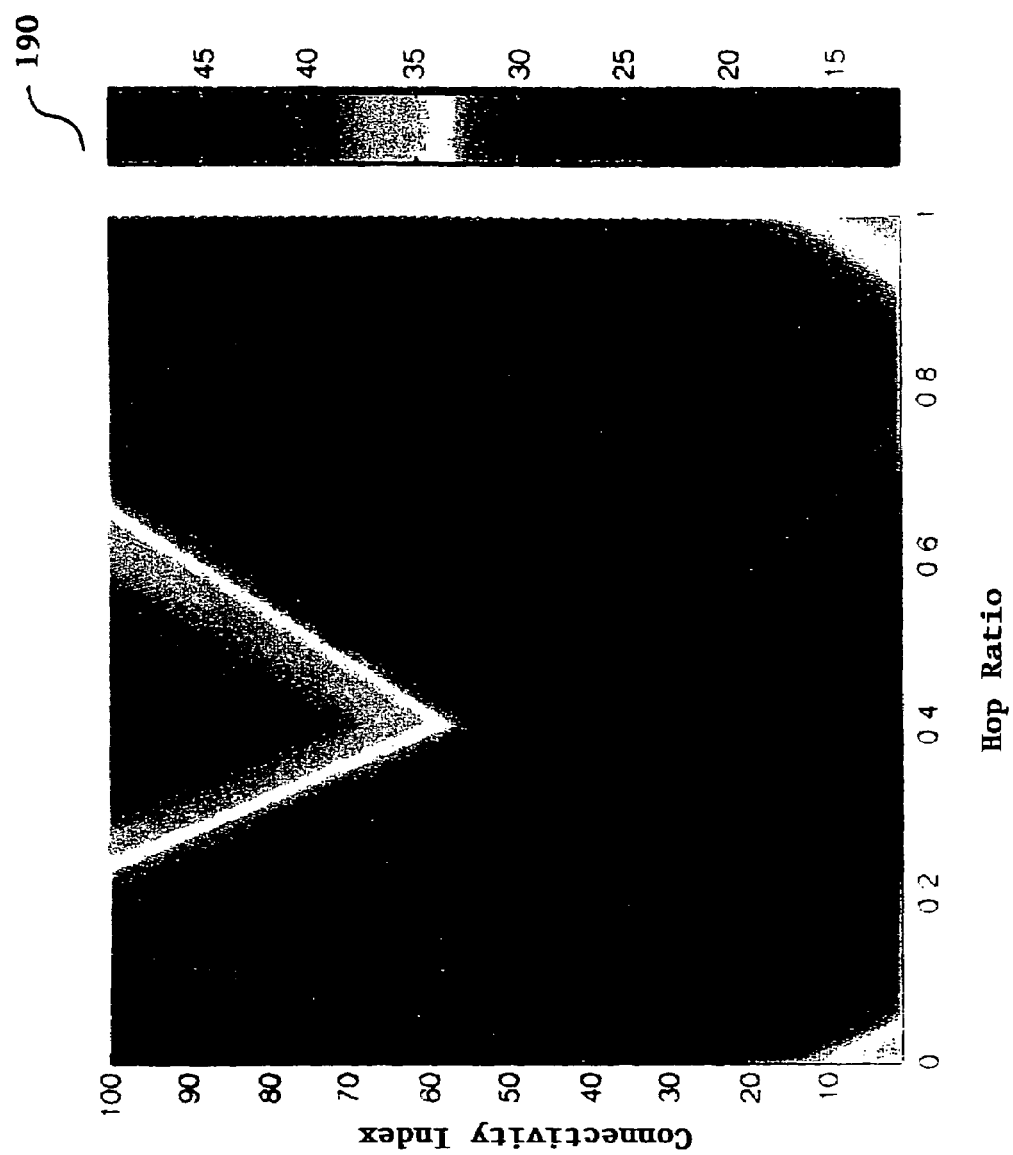
FIGS. 14A-14Q illustrate an exemplary collection of confidence maps that may be utilized by the RegEx LDM to attach confidence factors to location determinants.
Figure 14B:
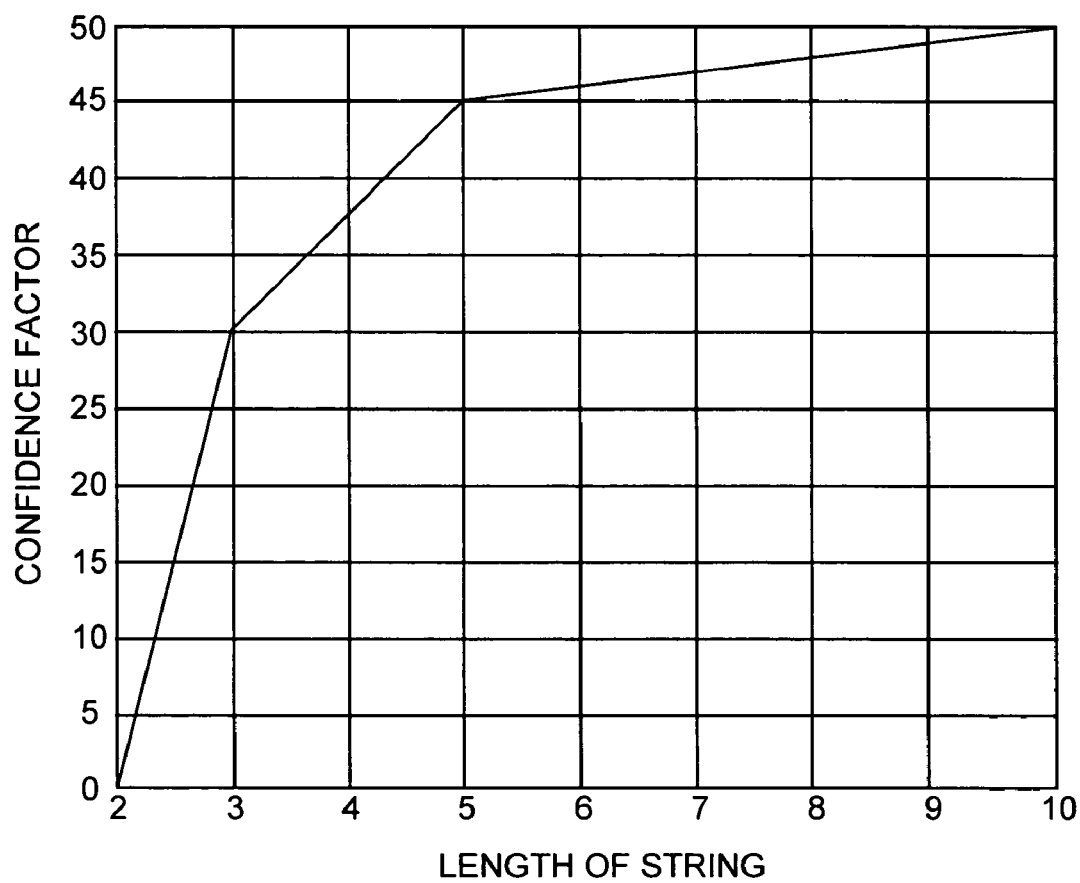
Figure 14C:
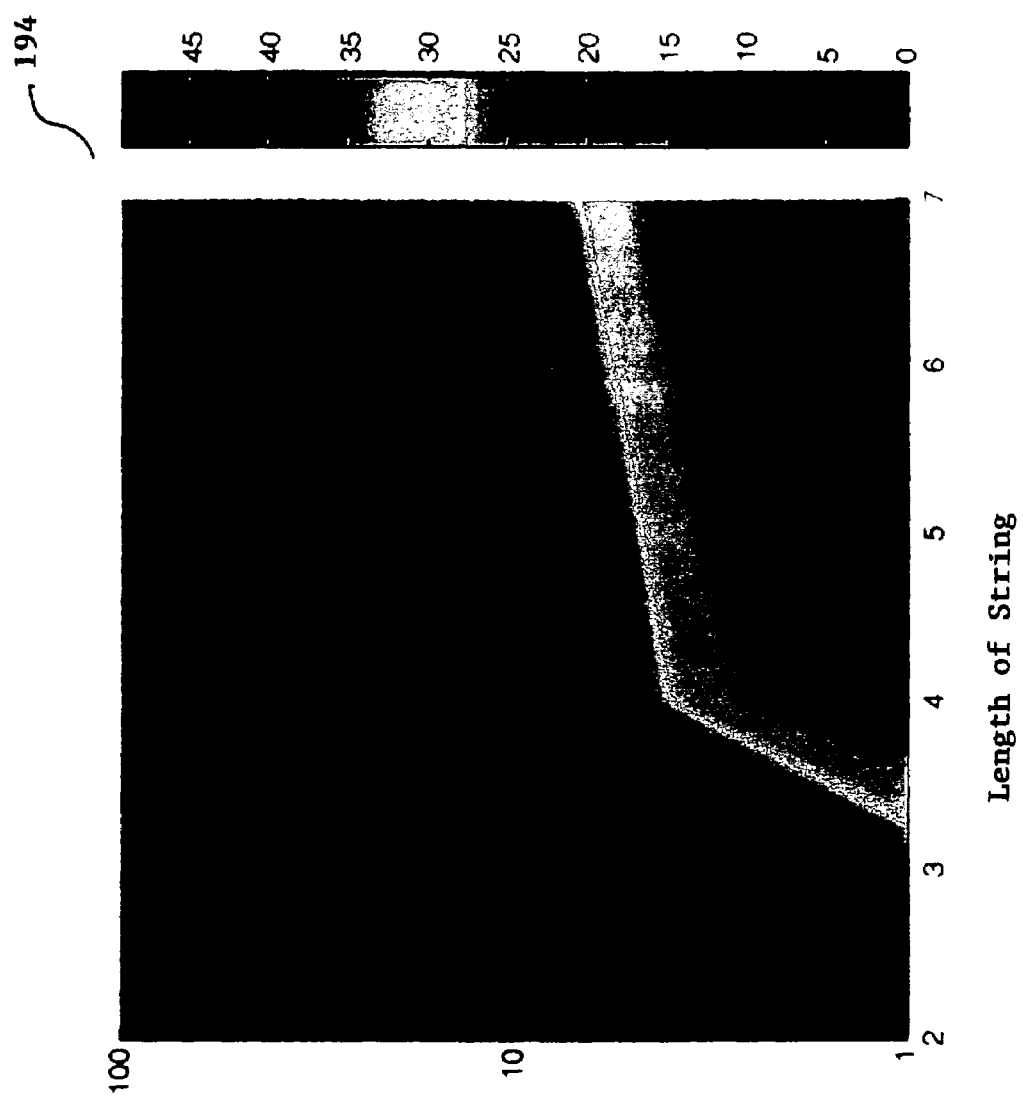
Figure 14D:
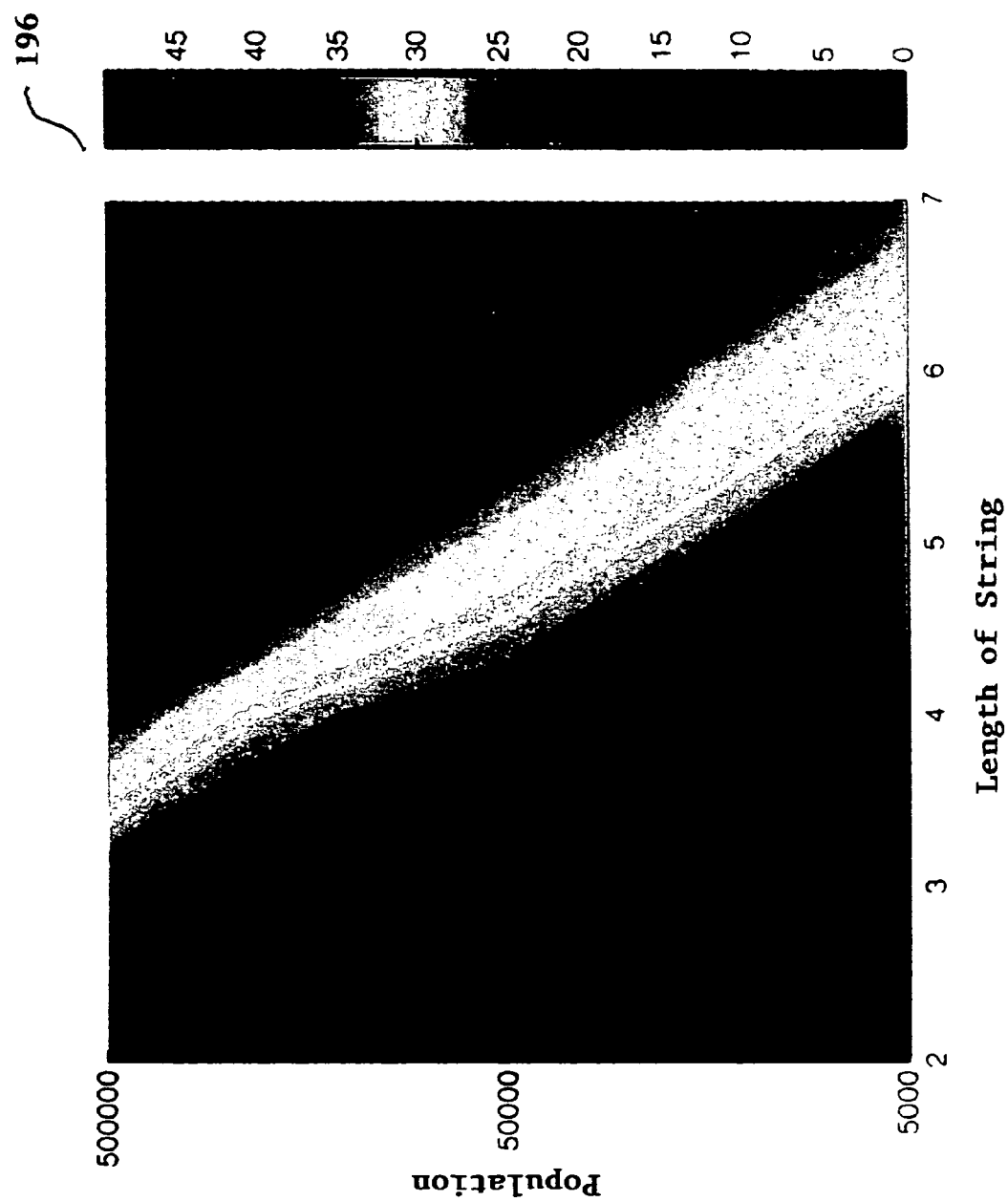
Figure 14E:
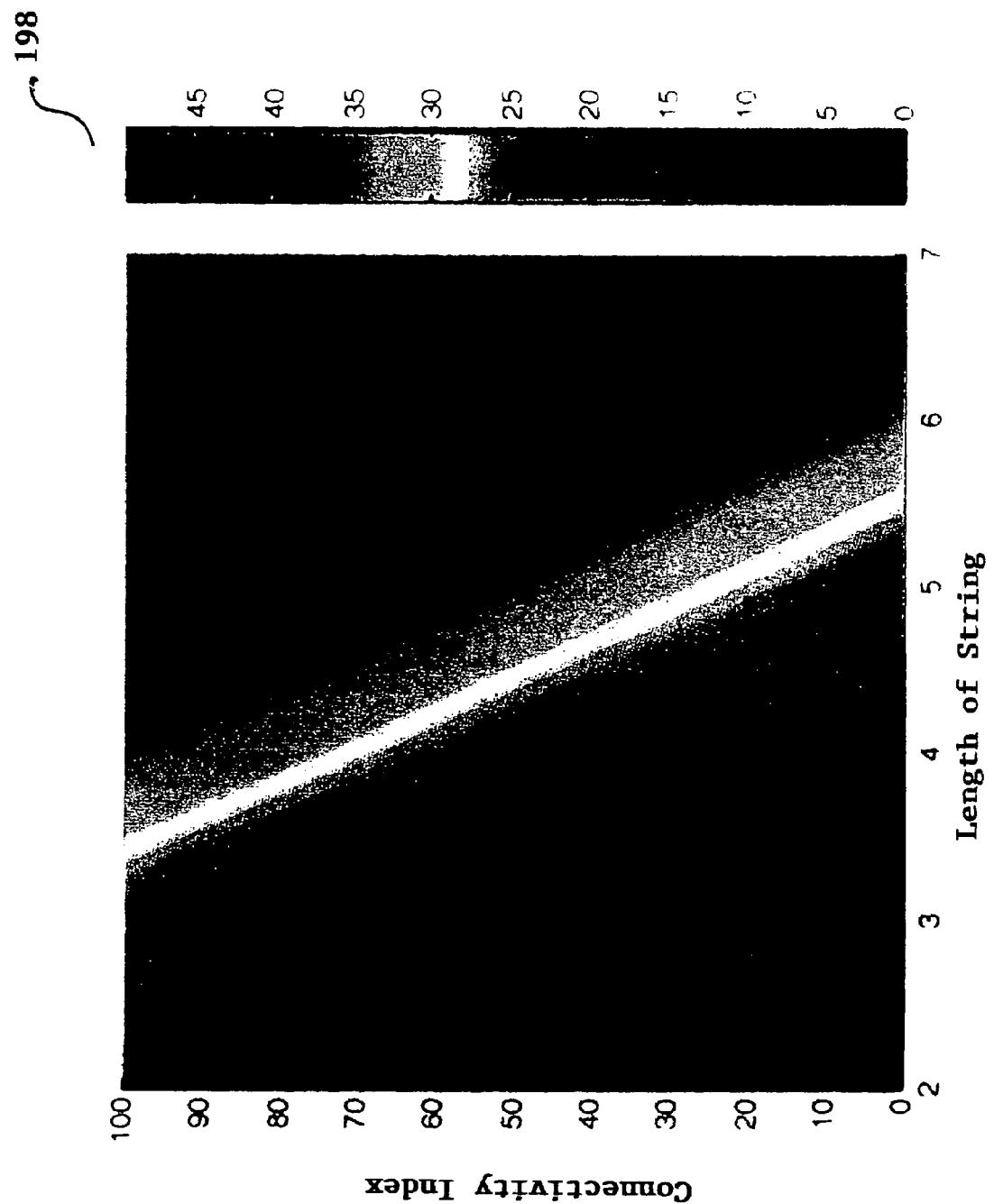
Figure 14F:
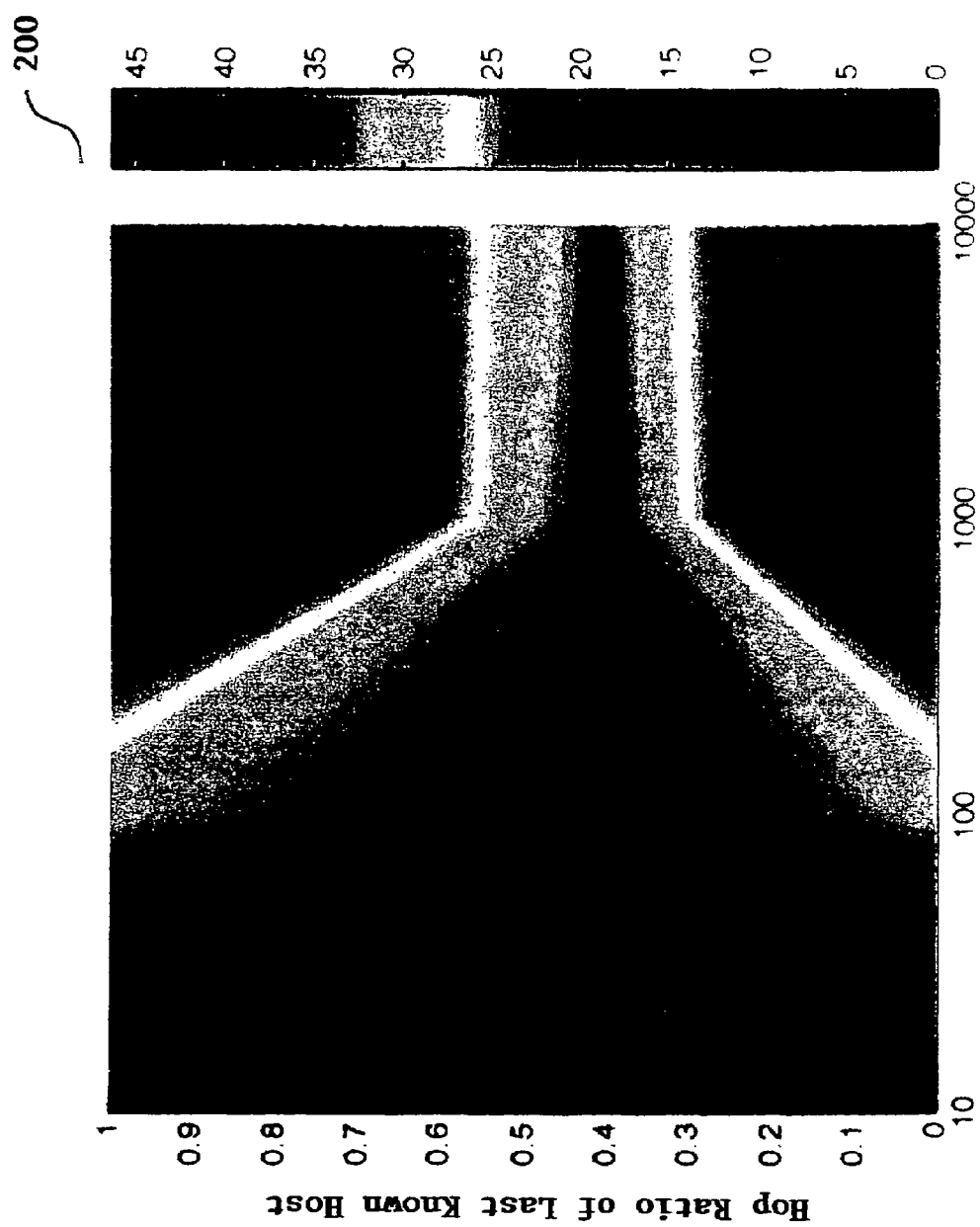
Figure 14G:
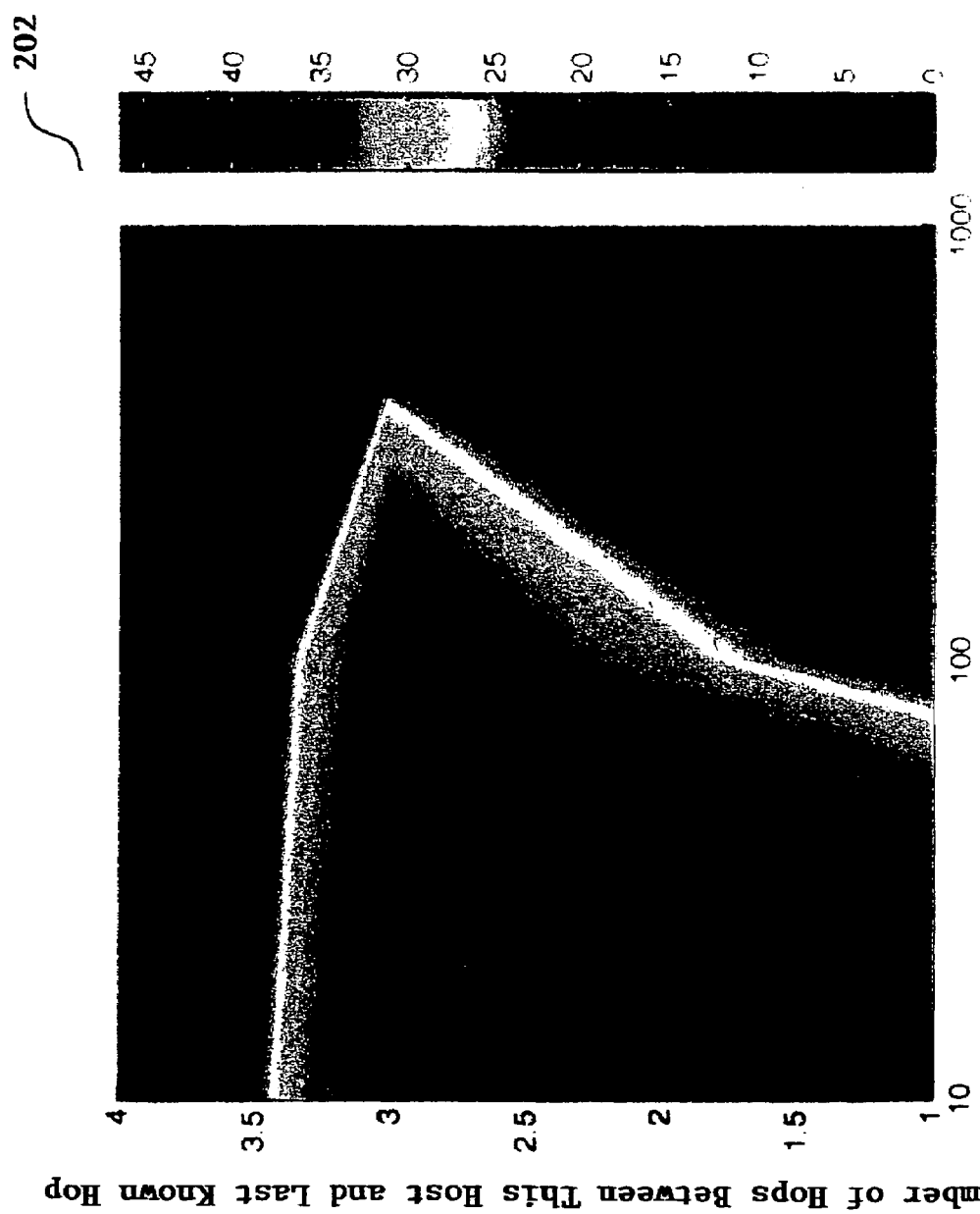
Figure 14H:
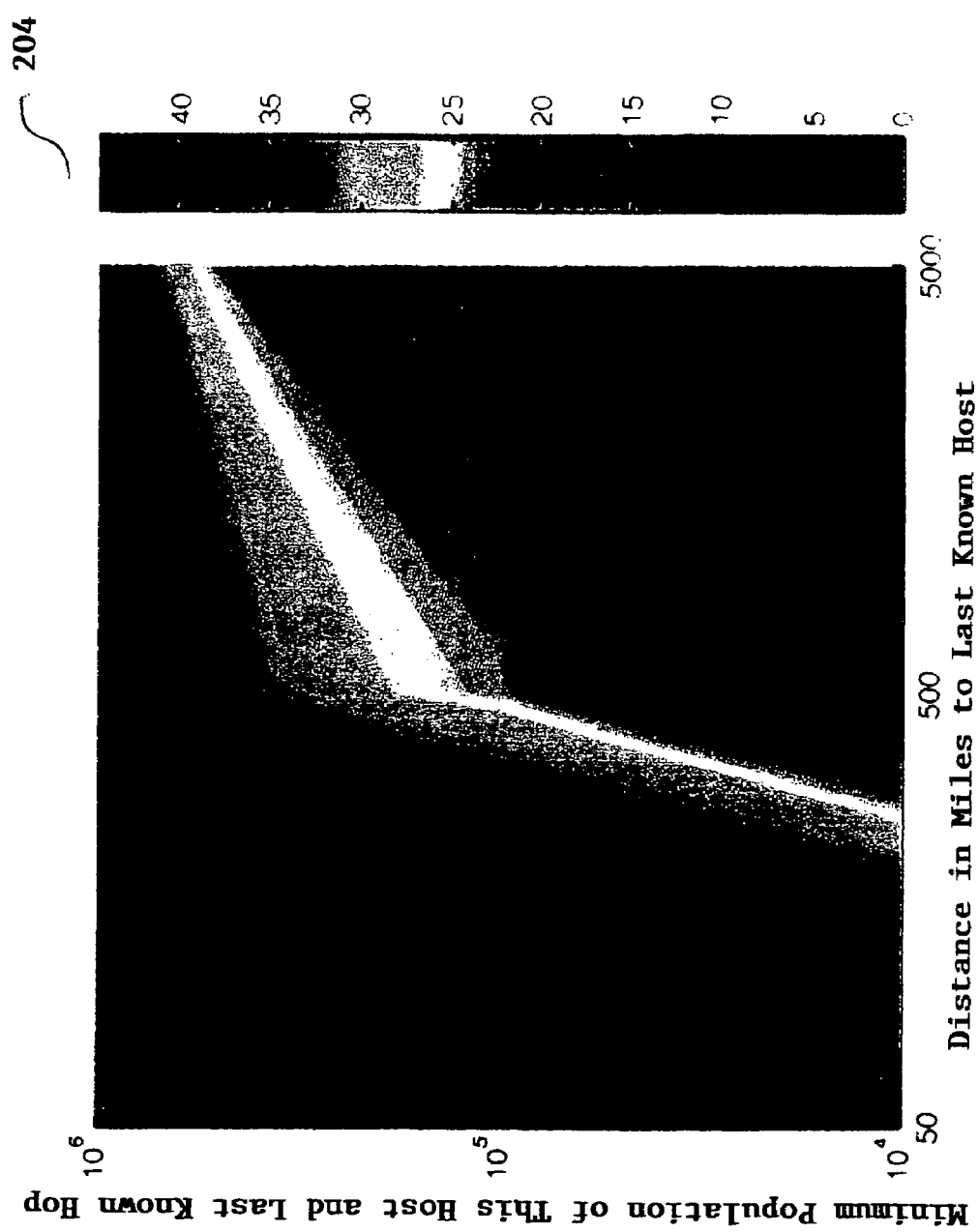
Figure 14I:
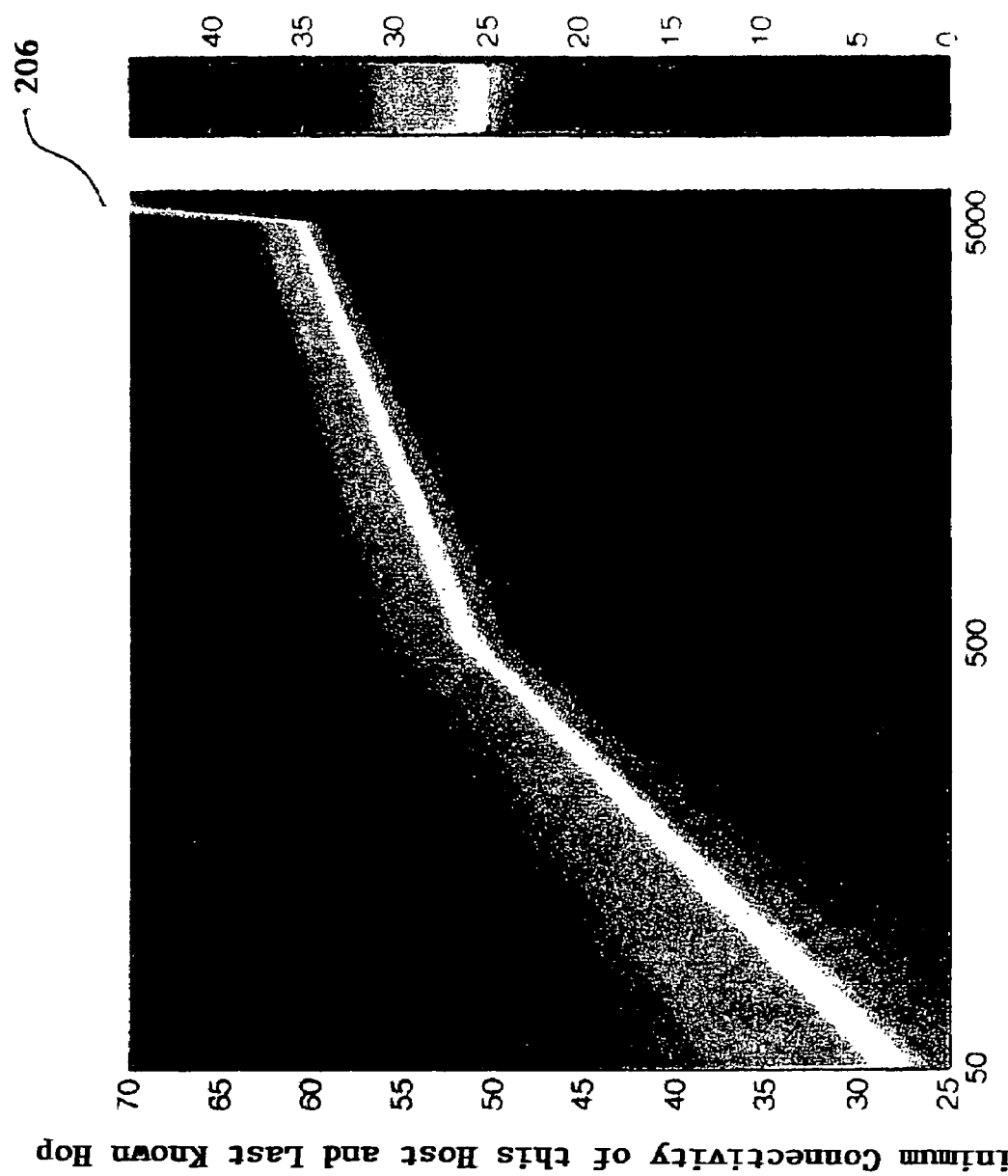
Figure 14J:
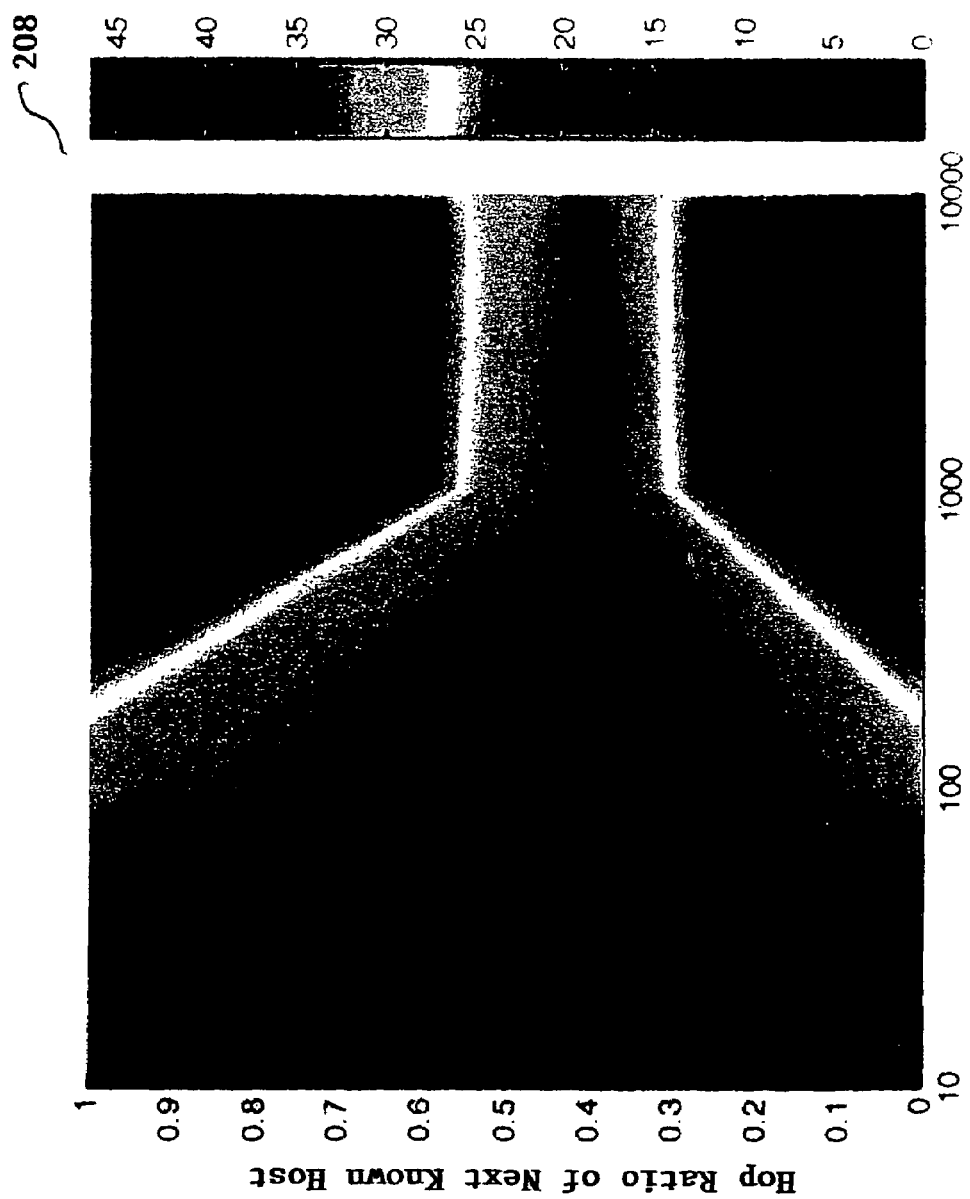
Figure 14K:
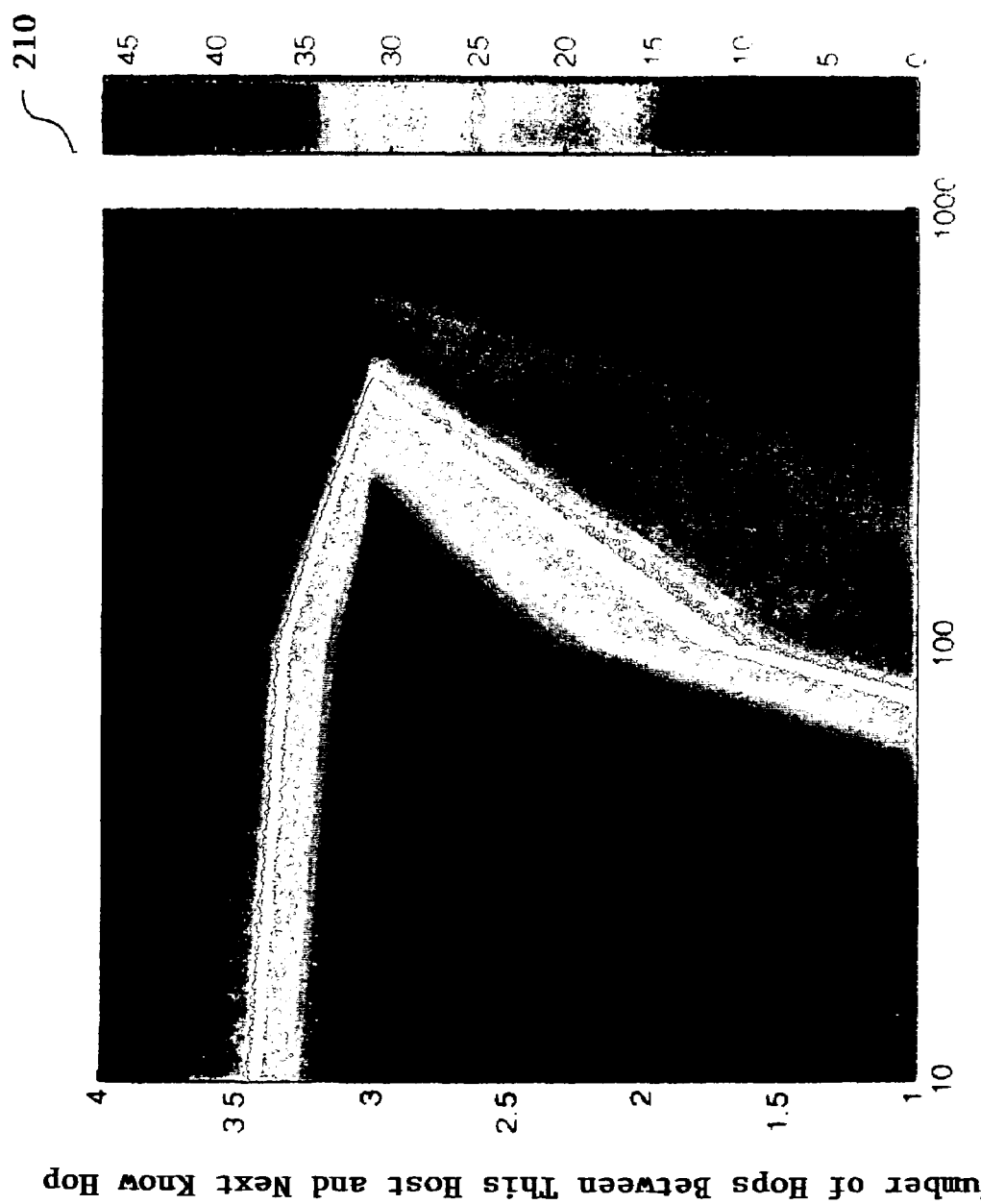
Figure 14L:
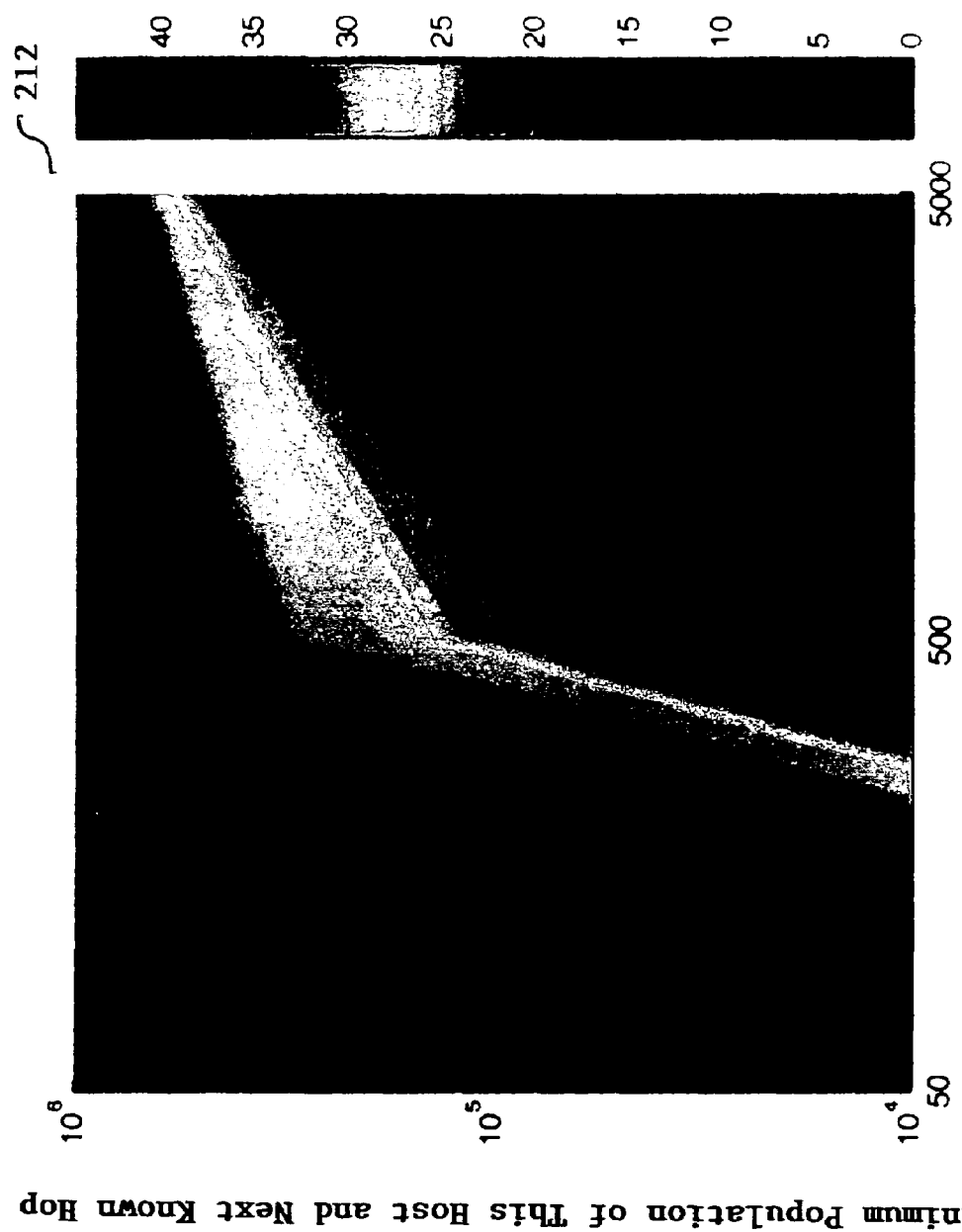
Figure 14M:
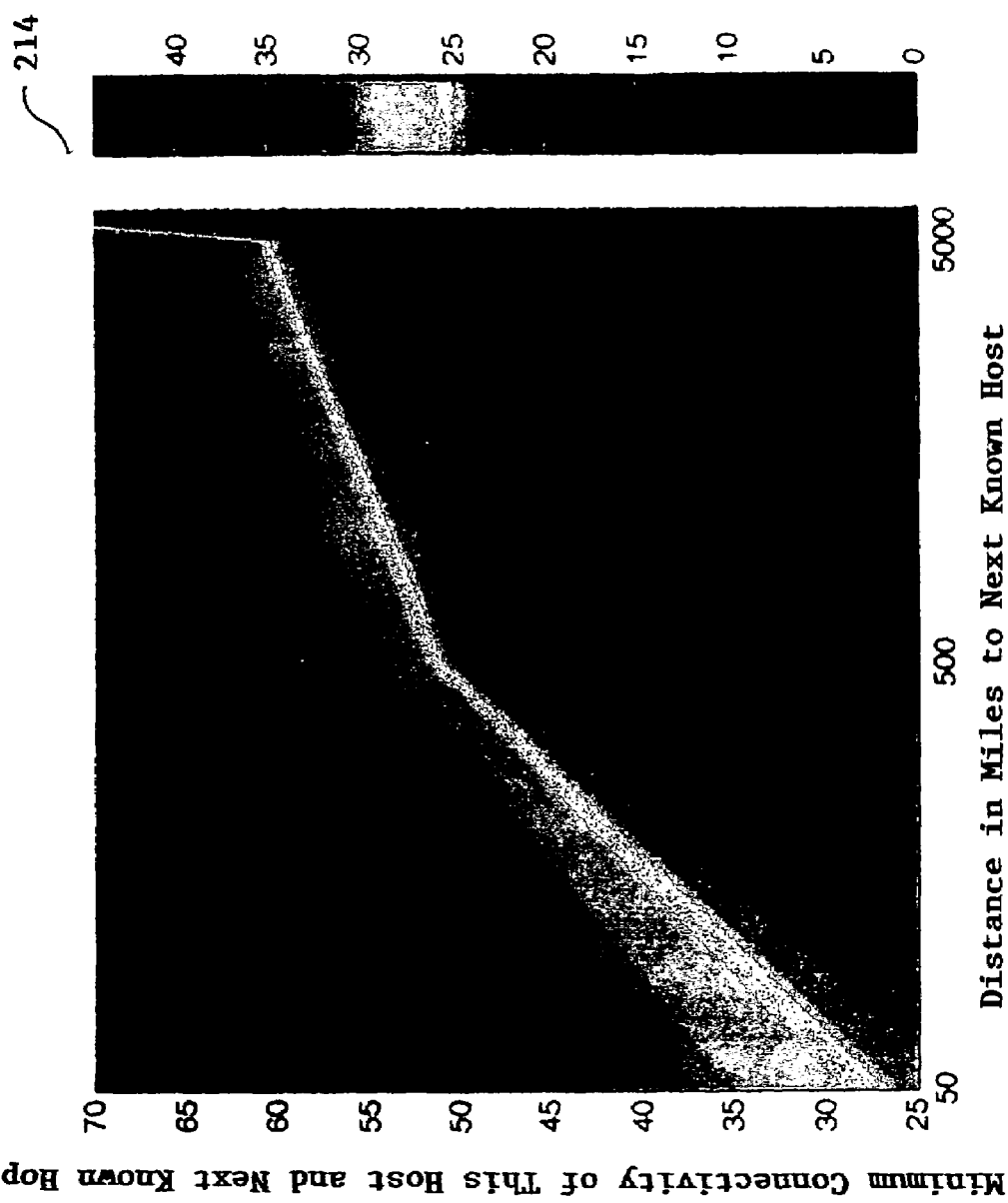
Figure 14N:
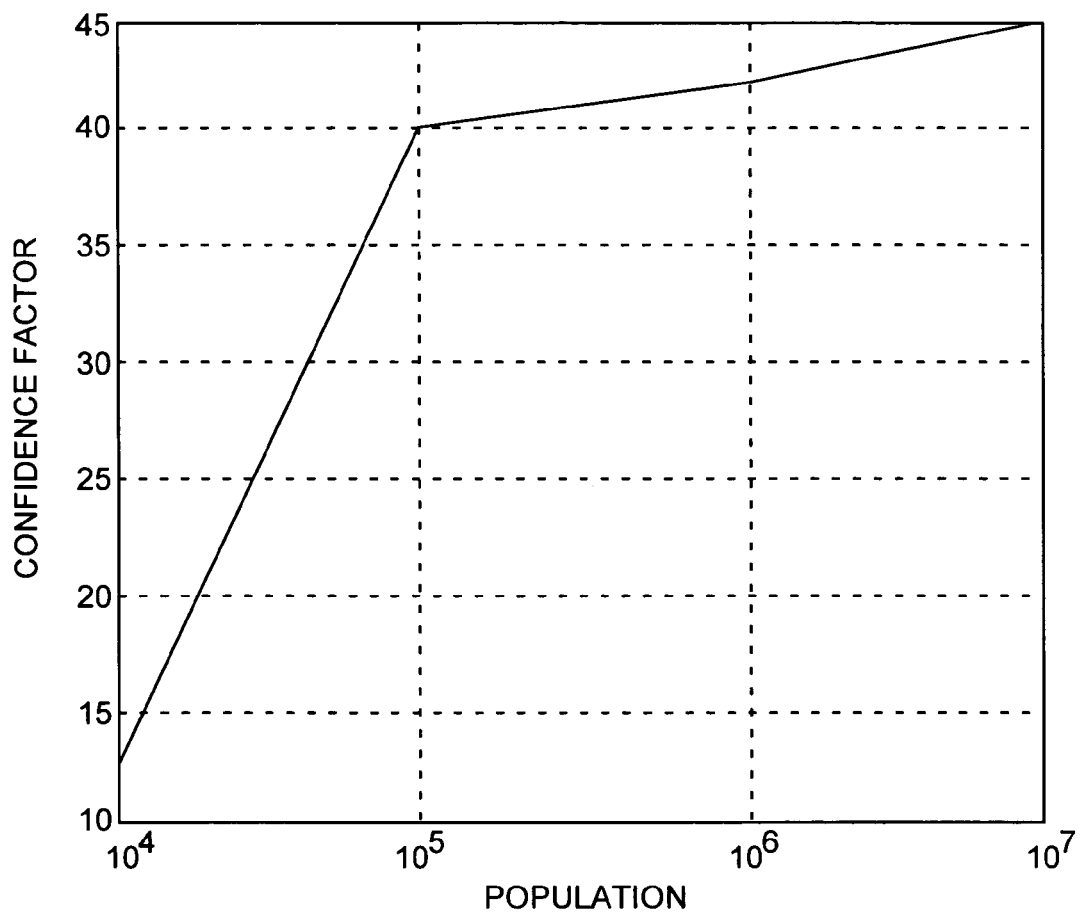
Figure 140:
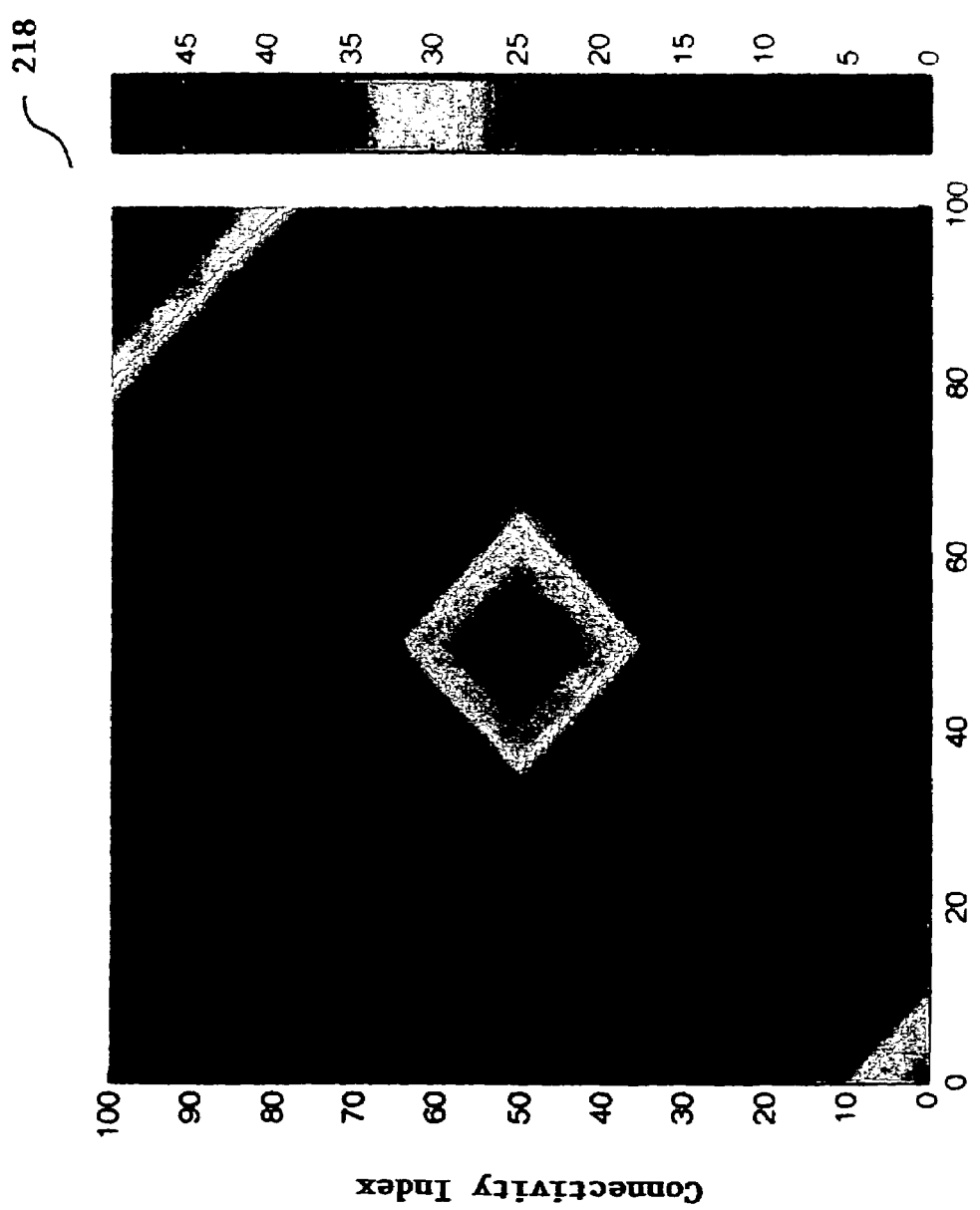
Figure 14P:
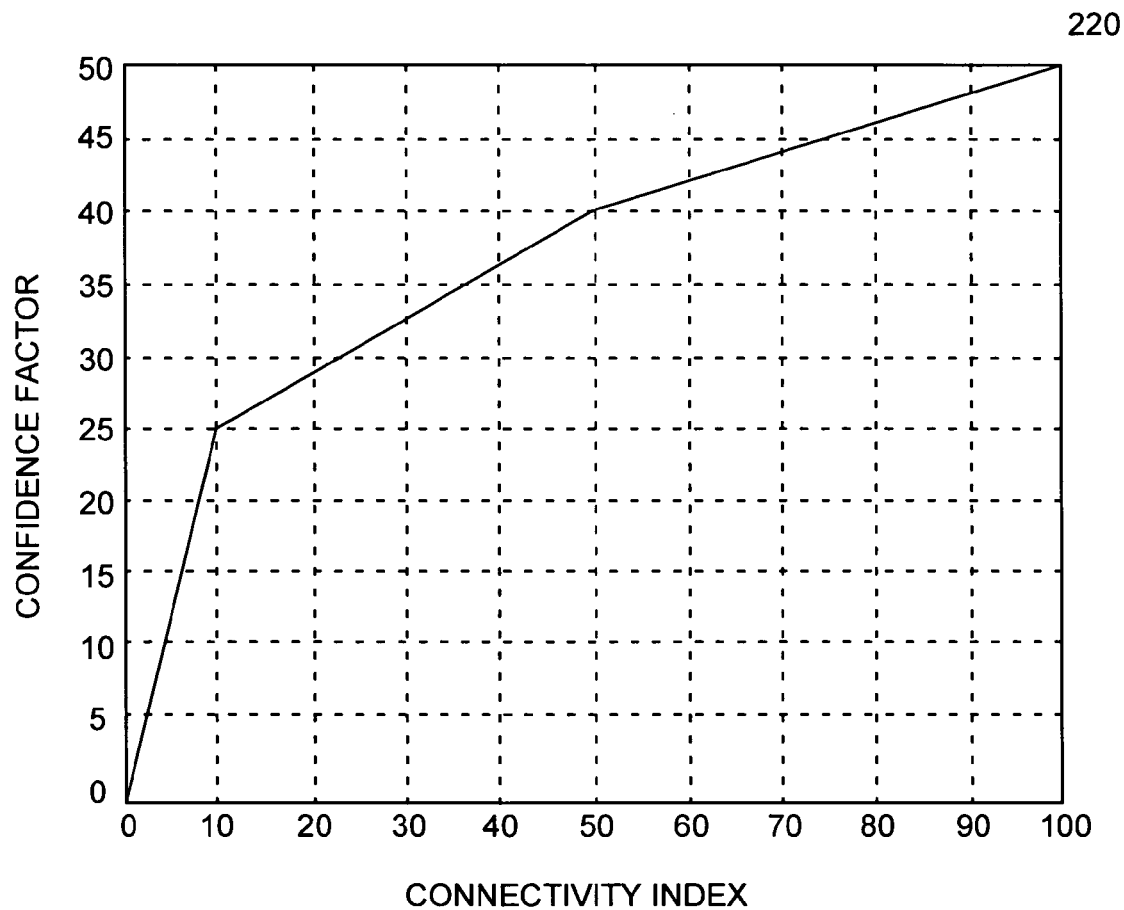
Figure 14Q:
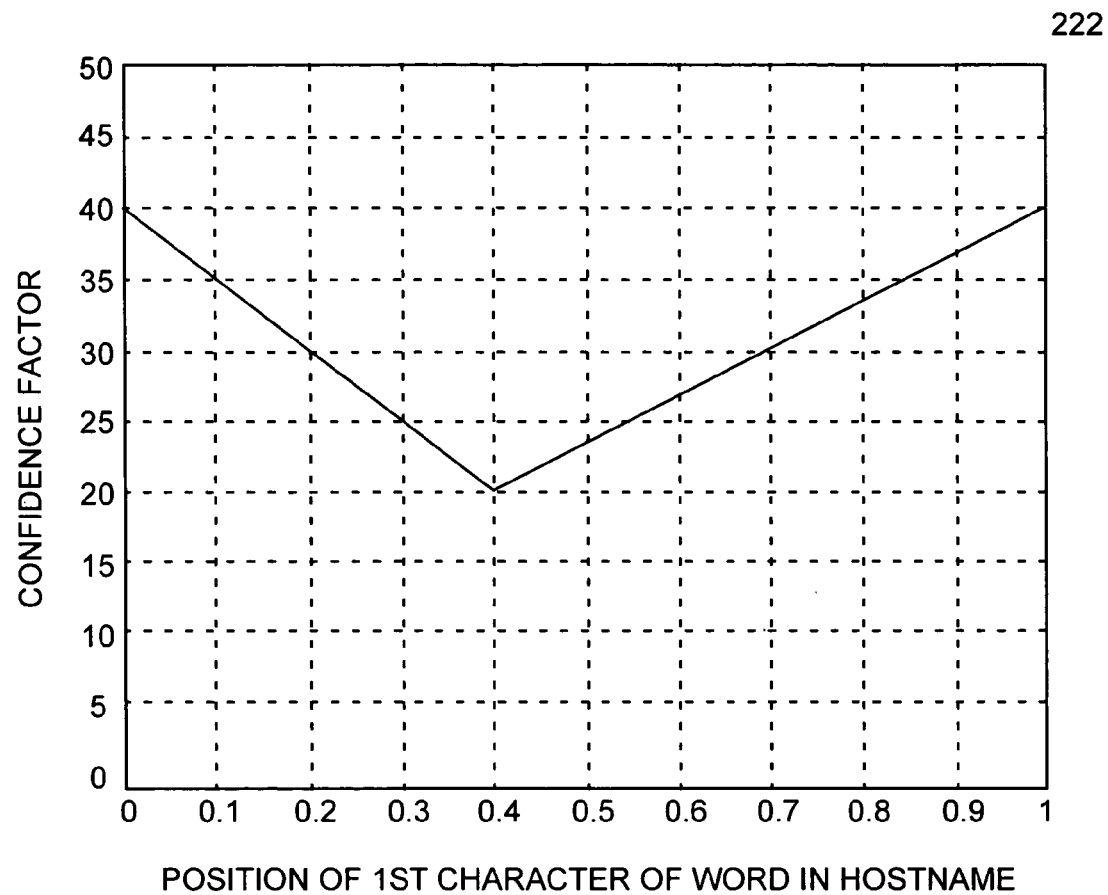

An exemplary collection of confidence maps that may be utilized by the RegEx LDM 130 to attach confidence factors to location determinants is discussed below with reference to FIGS. 14A-14Q. It will be noted that each of the confidence maps discussed below includes a "confidence map weight", which is a weighting assigned by the RegEx LDM 130 to a confidence factor generated by a respective confidence map. Different confidence maps are assigned different weightings based on, inter alia, the certainty attached to the confidence factor generated thereby. The number of terms or parameters of the confidence maps described below require clarification. The term "hop ratio" is an indication of a hop position within a traceroute relative to an end host (e.g., how far back from the end hosts a given hop is). The term "connectivity index" is a demographic representation of the magnitude or amount of network access to which a location has access within a network. The term "minimum connectivity" is a representation of a lowest common denominator of connectivity between to network entities (e.g., a Last Known Host and an end host). Distances between geographic locations are calculated once a geographic location has been determined. The latitude and longitude co-ordinates of a geographic location may, in one exemplary embodiment, be utilized to performed distance calculations.

Hop Ratio—Connectivity Confidence Map (190)
X-axis: Hop Ratio (as determined from traceroute)
Y-axis: Connectivity Index
Color: confidence factor
Confidence map weight: 40
Comments: An exemplary embodiment of the confidence map 190 is illustrated in FIG. 14A. This confidence map 190 is most assertive in the middle of a traceroute where it provides well-connected location determinants high confidence factors and less connected location determinants low confidence factors. At the beginning and the end of the traceroute, it has the opposite effect; well connected location determinants receive lower confidence factors and less connected get higher.

Word Length Confidence Map (190)
X-axis: Length of String
Y-axis: confidence factor
Confidence map weight: 100
Comments: An exemplary embodiment of the confidence map 192 is illustrated in FIG. 14B. In place name string matching, a longer string provides a high degree of certainty than a shorter string, and decreases ambiguity. This confidence map 192 attributes higher confidence factors for longer strings and confidence factors of zero for two character strings.

Word Length—Number of Entries Confidence Map (194)
X-axis: Length of String
Y-axis: Number of location determinants generated by the String
Color: confidence factor
Confidence map weight: 100
Comments: An exemplary embodiment of the confidence map 194 is illustrated in FIG. 14C. The confidence map 194 couples the word length (an indirect measure of ambiguity) with the number of location determinants returned by the RegEx LDM 130 (a direct measure of ambiguity). Strings that are too short and yield too many location determinants are attributed a lower confidence factors than unique ones. It will be noted that the confidence map 194 is attributed a relatively higher weighting in view of the high degree of certainty delivered by this confidence map 194.

Word Length—Population Confidence Map (196)
X-axis: Length of String
Y-axis: Population
Color: confidence factor
Confidence map weight: 100
Comments: An exemplary embodiment of the confidence map 196 is illustrated in FIG. 14D. As stated in the above, short words are attributed relatively low confidence factors. Nonetheless, it is desirable to attributed a relatively higher confidence factor to geographic locations that are heavily populated, in spite of such geographic locations being indicated by a short word. For example, so that 'sea' and 'sf' (indicating Seattle and San Francisco, respectively) are attributed higher confidence factors, this confidence map 196 allows well-populated cities to be abbreviated shortly.

Word Length—Connectivity Confidence Map (198)
X-axis: Length of String
Y-axis: Connectivity Index
Color: confidence factor
Confidence map weight: 100
Comments: An exemplary embodiment of the confidence map 198 is illustrated in FIG. 14E. For the same reasons discussed above with reference to the confidence map 196 illustrated in FIG. 14D, well connected cities are more likely to be correct than less connected cities. The confidence map 198 seeks to ensure that even short abbreviations are likely to be mapped correctly by attributing a higher confidence factor too short words (e.g., abbreviations) that exhibit a high degree of connectivity.

Distance to LKH—Hop Ratio of LKH Confidence Map (200)
X-axis: Distance in Miles to Last Known Host. This is determined from the demographic/geographic database 31 that stores intra-location distance values.
Y-axis: Hop Ratio of Last Known Host
Color: confidence factor
Confidence map weight: 50
Comments: An exemplary embodiment of the confidence map 200 is illustrated in FIG. 14F. Two hosts adjacent in a traceroute are expected to be physically near each other, unless they are traversed in the middle of the traceroute. This confidence map 200 is reflective of this expectation. Hosts that are distant and at the end of a traceroute are attributed lower confidence factors.

Distance to LKH—Node Distance to LKH Confidence Map (202)
X-axis: Distance in Miles to Last Known Host (LKH)
Y-axis: Number of Hops Between this Host and LKH.
Color: confidence factor
Confidence map weight: 100
Comments: An exemplary embodiment of the confidence map 202 is illustrated in FIG. 14G. Under the premise that a host should be located near the last known host in a traceroute, the confidence map 202 gives lower confidence factors when the LKH is close in the traceroute but far in physical space. The confidence map 202 is more forgiving of hosts slightly further in the traceroute.

Distance to LKH—LKH Population Confidence Map (204)

X-axis: Distance in Miles to Last Known Host
Y-axis: Minimum Population of this Host and LKH. This information is again retrieved from the demographic/geographic database 31.
Color: confidence factor
Confidence map weight: 70
Comments: An exemplary embodiment of the confidence map 204 is illustrated in FIG. 14H. It is generally found that hops in a traceroute jump great distances only when they travel from one major backbone city to another. A common characteristic of these cities is their large populations. So, in the confidence map 204, larger, closer location determinants are rewarded, while distant, small ones are punished.

Distance to LKH—LKH Connectivity Confidence Map (206)
X-axis: Distance in Miles to Last Known Host
Y-axis: Minimum Connectivity of this Host and LKH
Color: confidence factor
Confidence map weight: 85
Comments: An exemplary embodiment of the confidence map 206 is illustrated in FIG. 14I. Similar to the preceding confidence map 204 based on population, this confidence map 206 rewards cities that are generally well-connected. For example, cities like New York and London can be connected to very distant cities.

Distance to NKH—Hop Ratio of NKH Confidence Map (208)
X-axis: Distance in Miles to Last Known Host
Y-axis: Hop Ratio of Next Known Host
Color: confidence factor
Confidence map weight: 50
Comments: An exemplary embodiment of the confidence map 208 is illustrated in FIG. 14J. Two hosts adjacent in a traceroute are expected to be physically near each other, unless they are traversed in the middle of the traceroute. The confidence map 208 is reflective of this expectation. Hosts that are distant and at the end of a traceroute receive lower confidence factors.

Distance to NKH—Node Distance to NKH Confidence Map (210)
X-axis: Distance in Miles to Next Known Host
Y-axis: Number of Hops Between this Host and NKH
Color: confidence factor
Confidence map weight: 100
Comments: An exemplary embodiment of the confidence map 210 is illustrated in FIG. 14K. Under the premise that a host should be located near the last known host in a traceroute, the confidence map 210 attributes lower confidence factors when the NKH is close in the traceroute, but far in physical space. The confidence map 210 is more forgiving of hosts slightly further in the traceroute.

Distance to NKH—NKH Population Confidence Map (212)
X-axis: Distance in Miles to Next Known Host
Y-axis: Minimum Population of this Host and NKH
Color: confidence factor
Confidence map weight: 70
Comments: An exemplary embodiment of the confidence map 212 is illustrated in FIG. 14L. Hops in a traceroute tend to jump great distances only when they travel from one major backbone city to another. A common characteristic of these backbone cities is their large populations. Accordingly, the confidence map 212 generates a confidence factor such that larger, closer location determinants are rewarded, while distant, small location determinants are punished.

Distance to NKH—NKH Connectivity Confidence Map (214)
X-axis: Distance in Miles to Next Known Host
Y-axis: Minimum Connectivity of this Host and NKH
Color: confidence factor
Confidence map weight: 85
Comments: An exemplary embodiment of the confidence map 214 is illustrated in FIG. 14M. The confidence map 214 rewards cities that are generally well-connected. For example, cities like New York and London can be connected to very distant cities.

Population Confidence Map (216)
X-axis: Population
Y-axis: confidence factor
Confidence map weight: 40
Comments: An exemplary embodiment of the confidence map 216 is illustrated in FIG. 14N. Generally speaking, the population of a geographic location is an effective measure of likelihood. Intuitively, the Moscow of the Russian Federation is more likely than the Moscow of Iowa. Especially in the USA, population may be a powerful indicator of the likelihood of location determinant correctness.

Neighboring Connectivity Confidence Map (218)
X-axis: Mean of LKH and NKH Connectivity Indices
Y-axis: Connectivity Index
Color: confidence factor
Confidence map weight: 90
Comments: An exemplary embodiment of the confidence map 218 is illustrated in FIG. 14O. A base premise of the confidence map 218 is that connectivity indices along a traceroute ought to be continuous. That is: host locales go from low connectivity to medium, to high. Any host's connectivity index along a traceroute ought theoretically not to deviate from the mean of its neighbors. This map penalizes such a deviation.

Connectivity Confidence Map (220)
X-axis: Connectivity Index
Y-axis: confidence factor
Confidence map weight: 50
Comments: An exemplary embodiment of the confidence map 220 is illustrated in FIG. 14P. The connectivity index is utilized by the confidence map 220 to provide a direct measure of the probability that a host is in the particular geographic location. According to the confidence map 220, the better connected a geographic location (e.g., city) is, the more likely the host is to be at a geographic location.

Word Position Confidence Map (222)
X-axis: Position of $1^{st}$ Character of Word in Hostname
Y-axis: confidence factor
Confidence map weight: 20
Comments: An exemplary embodiment of the confidence map 222 is illustrated in FIG. 14Q. It will be noted that the confidence map 222 is assigned a relatively low confidence map weight, which is indicative of a relatively low effectiveness of the confidence map 222. It has been found that information in a hostname is more likely to be found at the extreme ends than in the middle. Also if two city names appear together in a hostname, the names toward the ends of the word tend to have more relevance.

Network (Net) LDM Location Generation

Figure 15:
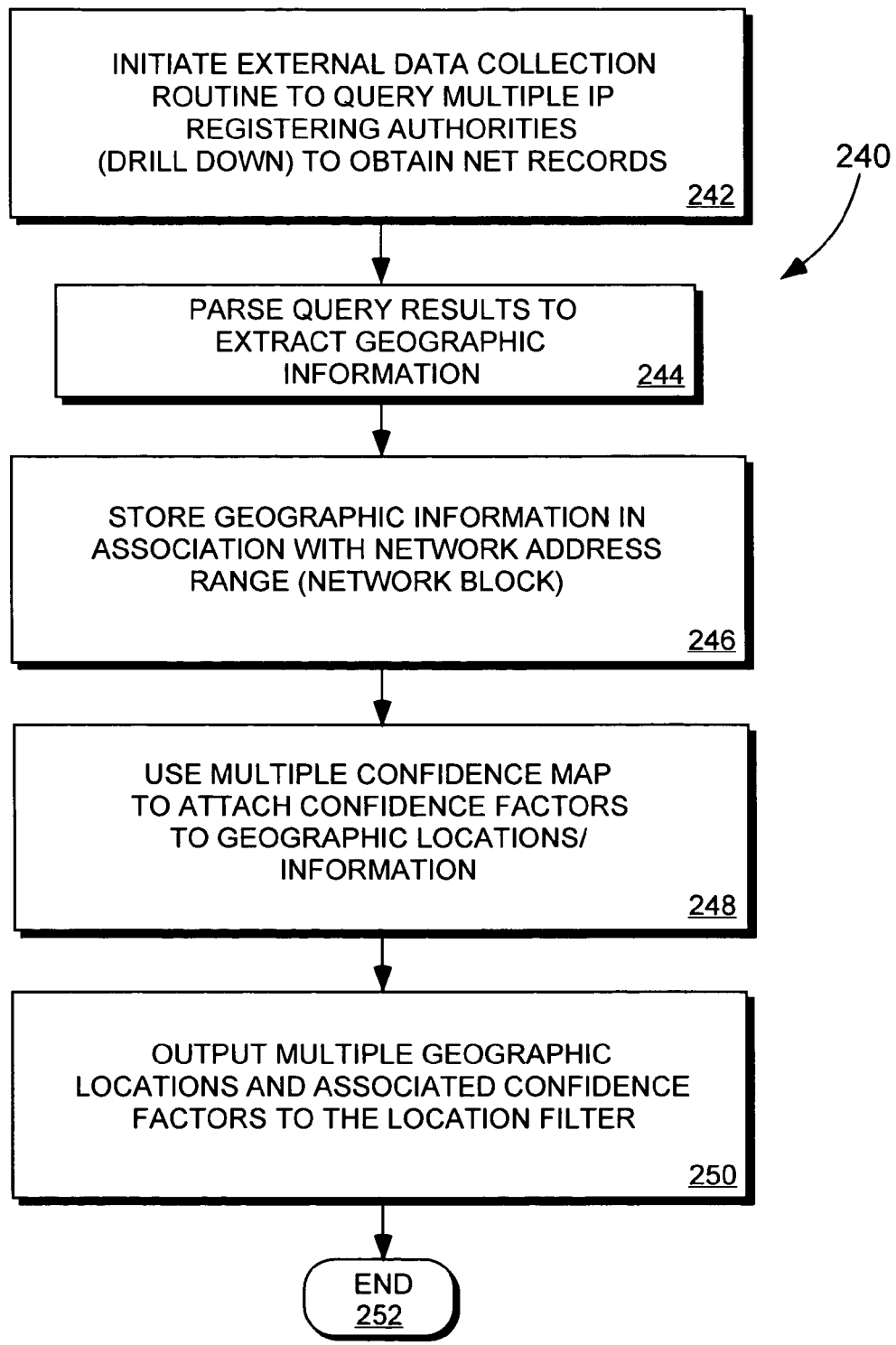
FIG. 15 is a flowchart illustrating a method, according to an exemplary embodiment of the present invention, performed by the Net LDN to identify one or more geographic locations for a network address, or a block of network addresses, and to associated at least one confidence factor with each of the geographic locations.

FIG. 15 is a flowchart illustrating a method 240, according to an exemplary embodiment of the present invention, performed by the Net LDM 132 to identify one or more geographic locations for a network address (or block of network addresses) and associate at least one confidence factor with each of the geographic locations.

At block 242, the Net LDM 132 initiates external data collection routines (e.g., data collection agents 18) to query multiple Internet Protocol (IP) registering authorities (e.g., RIPE/APNIC/ARIN) to a smallest possible network size At block 244, geographical information (e.g., city, state, country, the zip/postal code, area code, telephone prefix) is parsed from the query results and extracted and stored along with the network address range at block 246.

At block 248, the Net LDM 132 utilizes multiple confidence maps to attach confidence factors to each of the geographic locations identified at block 244, or to each of the geographic information items identified at block 244.

At block 250, the Net LDM 132 outputs the multiple geographic locations (or geographic information items) and the associated confidence factors to the location filter 122. The method 240 then terminates at block 252.

Because the Net LDM 132 may be of limited effectiveness along the core routers, the use of the Net LDM 132 may, in one exemplary embodiment, be restricted to the last three hops of a traceroute. The Net LDM 132 may optionally also not be utilized if a network block size registered is larger than 65,536 hosts, for it is unlikely that so many machines would be located in the same place by the same organization.

The Net LDM 132 is a particularly effective at generating accurate confidence factors for geographic locations when the network blocks registered with the IP registering authority are relatively small (e.g., less than 1024 hosts). If the Net LDM 132 incorrectly attached is a high confidence level to a geographic location, it is most likely related to a large network block or an obsolete record in a registry.

The confidence factors generated by the Net LDM 132 come from distance to a Last Known Host (LKH) and a Next Known Host (NKH) (e.g., calculated utilized in the latitude and longitude co-ordinates of these hosts) the size of the network block, a position in a traceroute (e.g., relative location near the end of the traceroute), population and connectivity. Regarding position within a traceroute, it will be appreciated that a relative position within the traceroute will be dependent upon the number of hops, and the relevant hop's position within that number of hops. For example, if they are 7 hops within a given traceroute, then hop 6 is considered to be near the end host. However, if there are 20 hops within the traceroute, hop 6 to be considered to be very distant from the end host.

An exemplary collection of confidence maps that may be utilized by the Net LDM 132 to attach confidence factors to location determinants are discussed below with reference to FIGS. 16A-16E. It will be noted from the following discussion of the confidence maps utilized by the Net LDM 132 that, while distance and hop ratio are used in similar ways as in the RegEx LDM 130, population and connectivity are used in contrary ways. Again, different confidence maps are assigned different weightings based on, inter alia, the certainty attached to the confidence factors generated thereby.

Figure 16A:
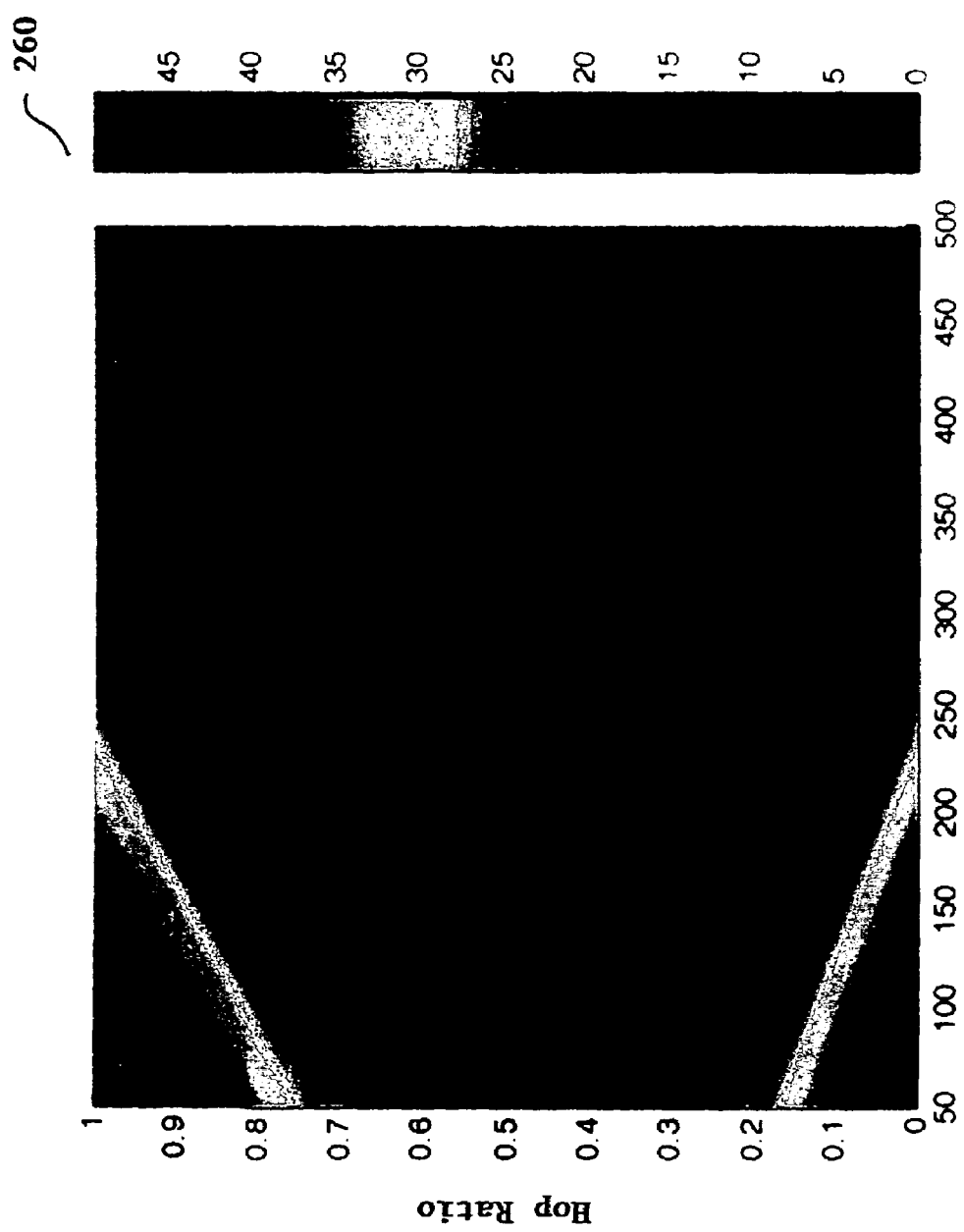
FIGS. 16A-16E illustrate an exemplary collection of confidence maps that may be utilized by the Net LDM to attach confidence factors to location determinants.

LKH Distance—Hop Ratio Confidence Map (260)
X-axis: Distance in Miles Between LKH and Net
Y-axis: Hop Ratio
Color: confidence factor
Confidence map weight: 50
Comments: An exemplary embodiment of the confidence map 260 is illustrated in FIG. 16A. The confidence map 260 generates a relatively high confidence factor only at the ends of a traceroute and only when a geographic location (e.g., a city) corresponding to the network addresses within close proximity to the LKH.

Figure 16B:
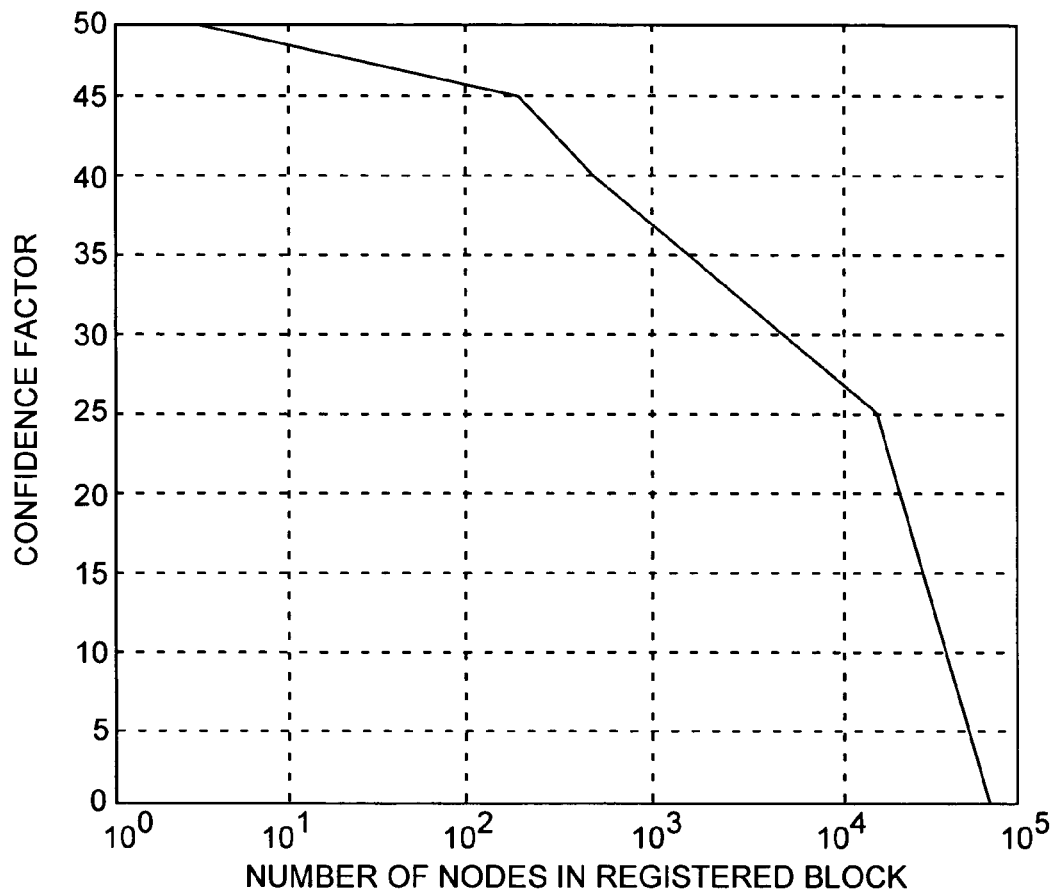

Net Size Confidence Map (262)
X-axis: Number of Nodes in Registered Block
Y-axis: confidence factor
Confidence map weight: 100
Comments: An exemplary embodiment of the confidence map 262 is illustrated in FIG. 16B. The confidence map 262 works off of two premises. First, if an entity has gone through the trouble to register a small block of network space, it is probably accurate. Conversely, large networks that are registered to one organization probably have the hosts spread out across a large area. Thus, the confidence map 262 operates such that small network sizes yield large confidence factors.

Figure 16C:
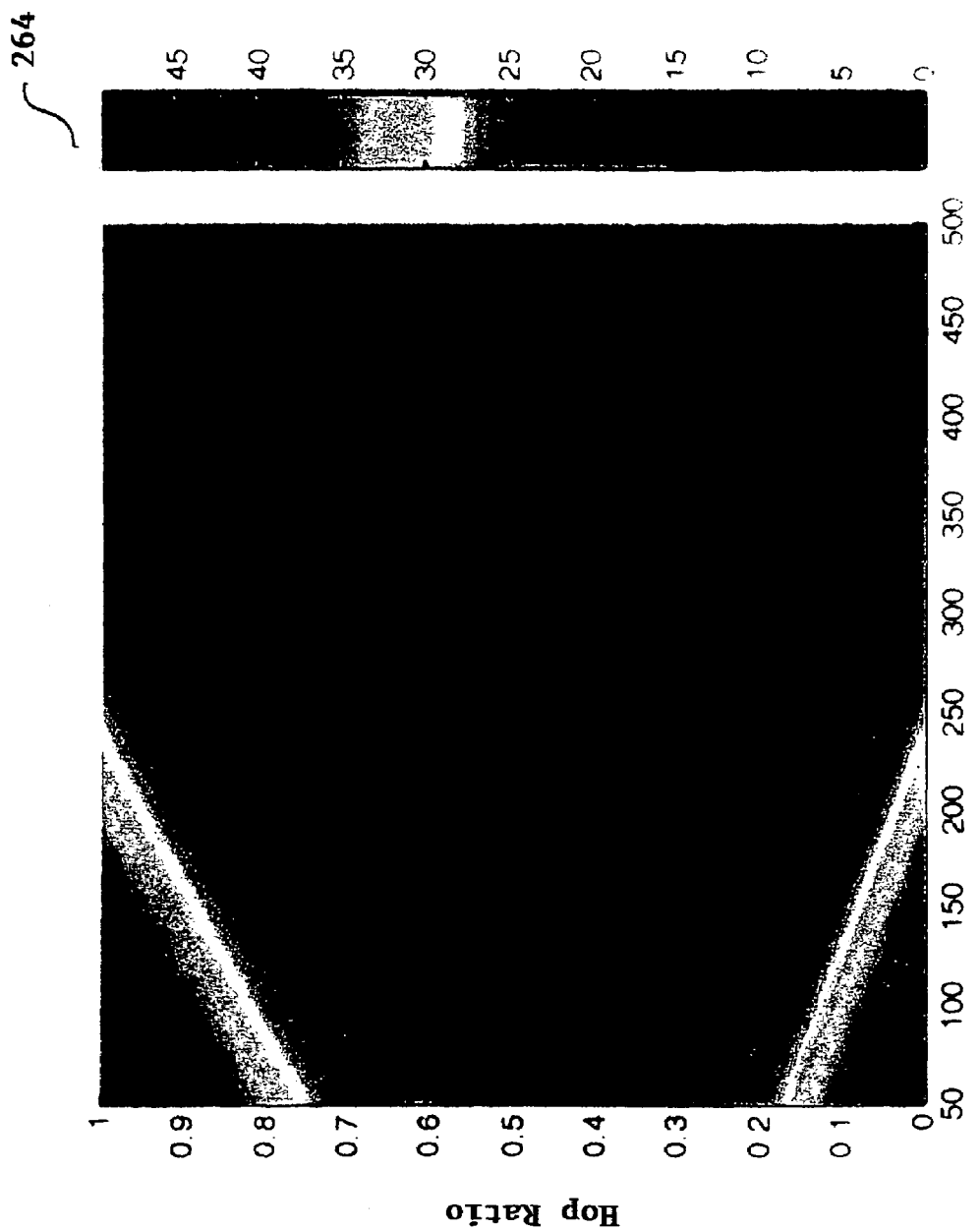

NKH Distance—Hop Ratio Confidence Map (264)
X-axis: Distance in Miles Between LKH and Net
Y-axis: Hop Ratio
Color: confidence factor
Confidence map weight: 50
Comments: An exemplary embodiment of the confidence map 264 is illustrated in FIG. 16C. The confidence map 264 generates a relatively high confidence factor for a geographic location only at the ends of a traceroute and only when a geographic location (e.g., a city) corresponding to network addresses within close proximity to the NKH.

Figure 16D:
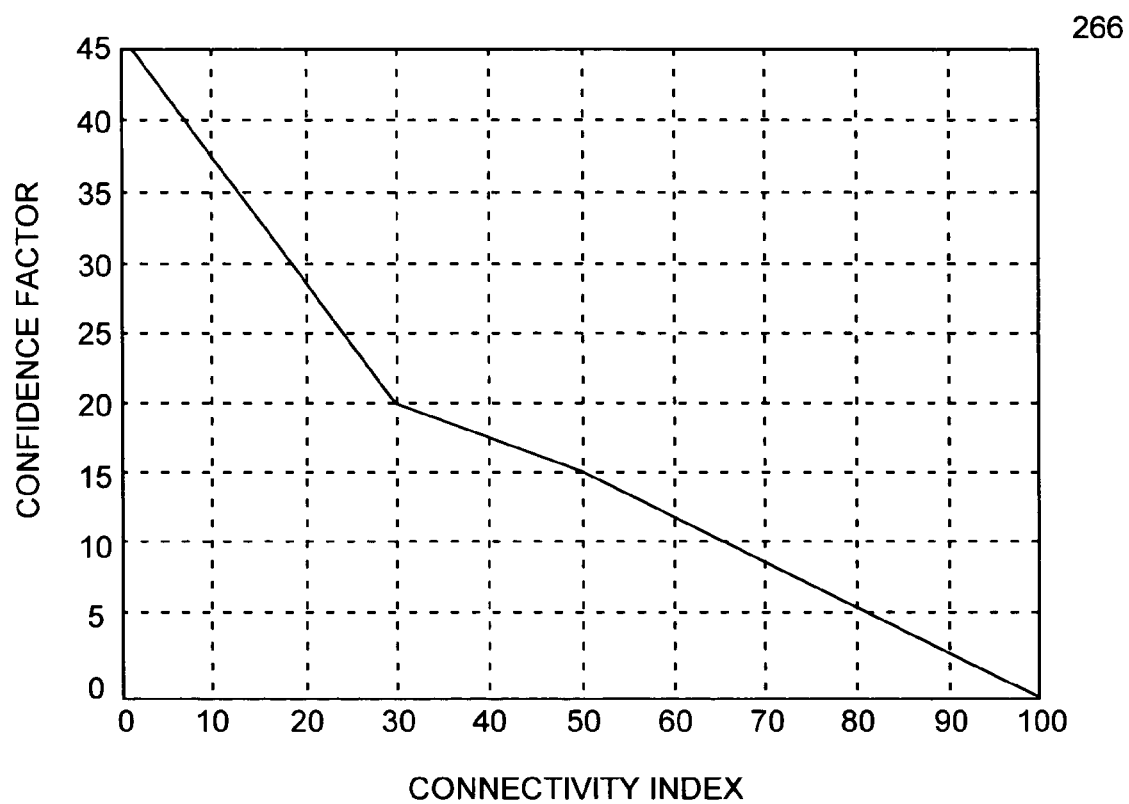

Connectivity Confidence Map (266)
X-axis: Connectivity Index
Y-axis: confidence factor
Confidence map weight: 25
Comments: An exemplary embodiment of the confidence map 266 is shown in FIG. 16D. Contrary to the relationship in the RegEx LDM 130, here less-connected geographic locations (e.g., cities) are rewarded with higher confidence factors. The premise is that if a network is registered in a small town, hosts on that network are more likely to be in that small town. Larger cities may just be corporate headquarters.

Figure 16E:
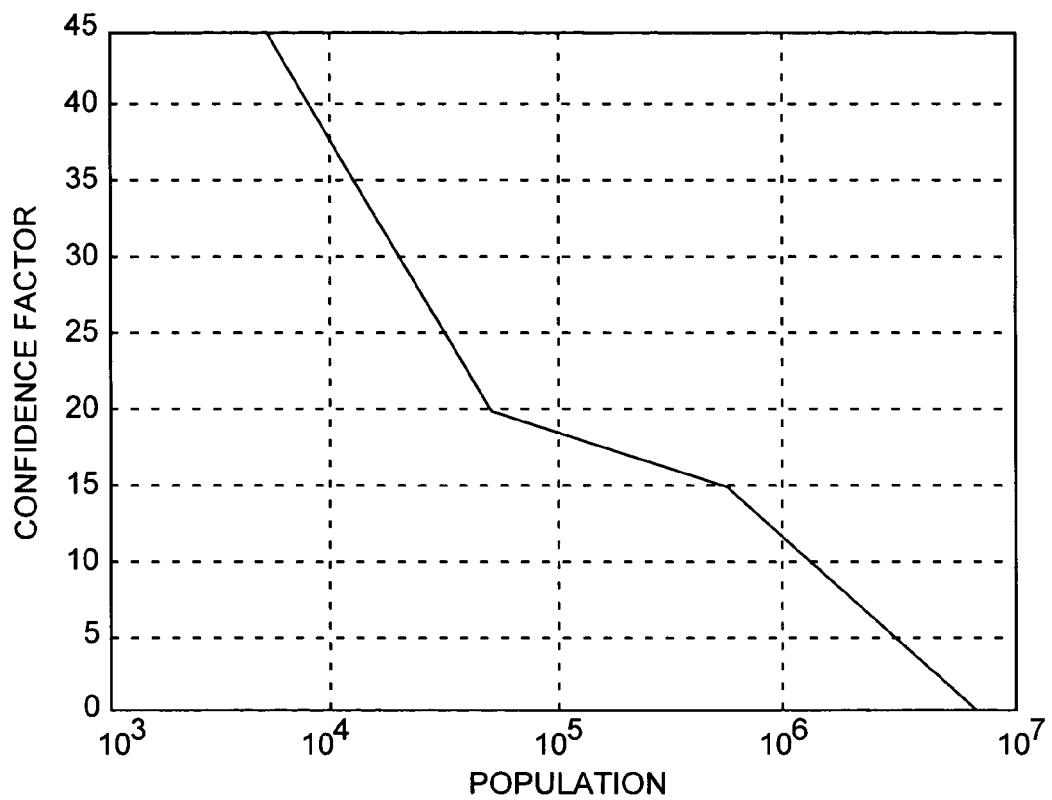

Population Confidence Map (268)
X-axis: Population
Y-axis: confidence factor
Confidence map weight: 25
Comments: An exemplary embodiment of the confidence map 268 is illustrated in FIG. 16E. Contrary to the relationship in the RegEx LDM 130, here smaller geographic locations are rewarded with higher confidence factors. The premise is that if a network is registered, for example, in a small town, hosts on that network are more likely to be in that small town. Larger cities may just be corporate headquarters.

Domain Name Server (DNS) LDM Location Generation

Figure 17:
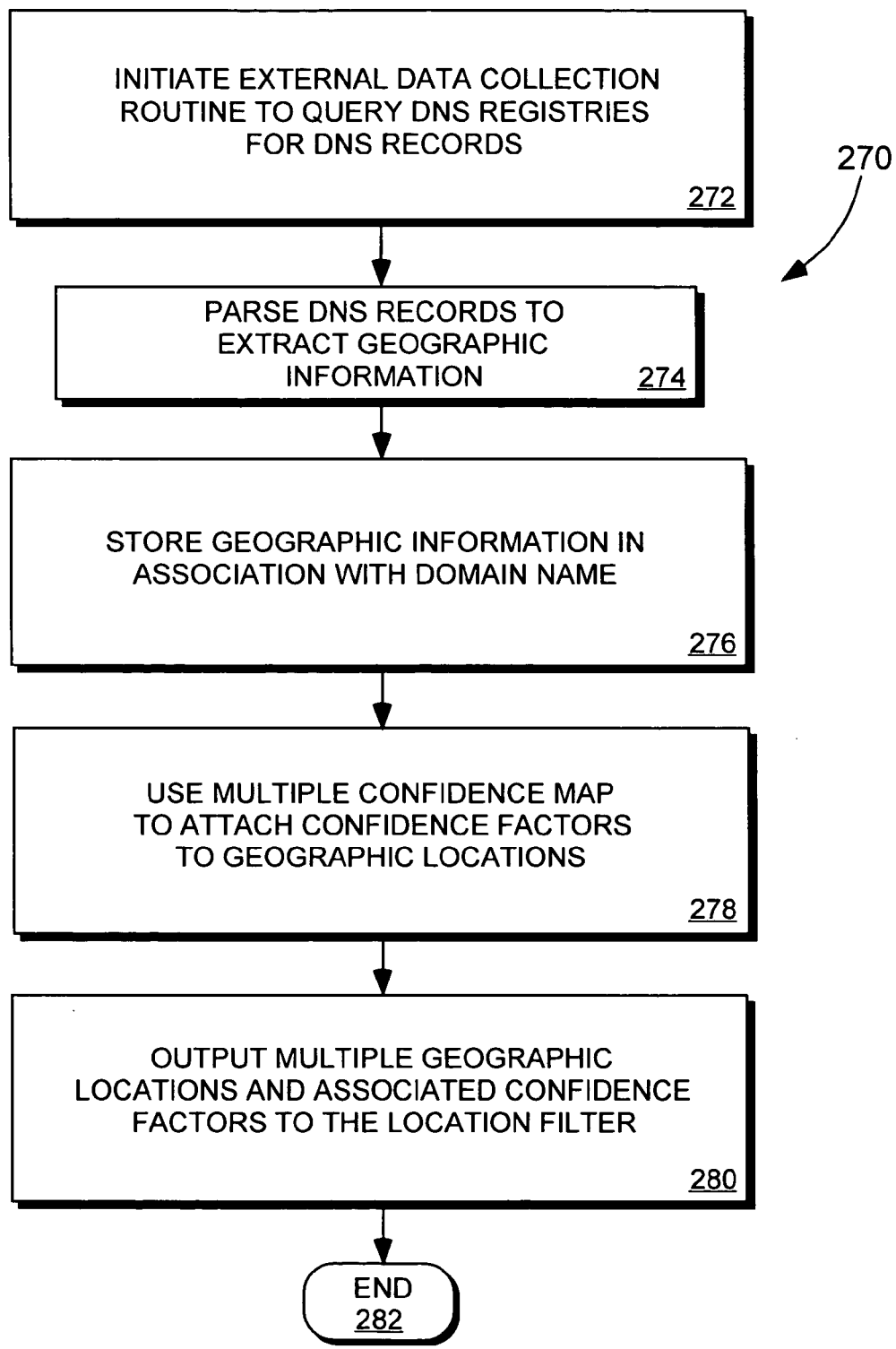
FIG. 17 is a flowchart illustrating a method, according to an exemplary embodiment of the present invention, performed by the DNS LDM identify one or more geographic locations for network address, and to associated at least one confidence factor with each of the geographic locations.

FIG. 17 is a flowchart illustrating a method 270, according to an exemplary embodiment of the present invention, performed by the DNS LDM 134 to identify one or more geographic locations for a network address (or block of network addresses) and to associate at least one confidence factor with each of the geographic locations.

At block 272, the DNS LDM 134 initiates external data collection routines (e.g., data collection agents 18) to query multiple Domain Name Server (DNS) registering authorities to collect DNS records. These records correspond to ownership of a particular domain name (e.g., www.harvard.com or www.amazon.com)

At block 274, geographical information (e.g., city, state, country, the zip/postal code, area code, telephone prefix) is parsed from the DNS records and extracted and stored along with the domain name at block 276.

At block 278, the DNS LDM 134 utilizes multiple confidence maps to attach confidence factors to each of the geographic locations identified at block 274.

At block 280, the DNS LDM 134 outputs the multiple geographic locations (or geographic information items) and the associated confidence factors to the location filter 122. The method 270 then terminates at block 282.

Similar to the Net LDM 132, the DNS LDM 134 may not be most effective along the backbone core routers. For example, it is not helpful to know that att.net is in Fairfax or that exodus.net is in Santa Clara. To avoid potential problems related to this issue, the DNS LDM 134 may be deployed only on the last three hops of a traceroute, in one exemplary embodiment of the present invention.

If a DNS record, retrieved at block 272 indicates the same geographic location as a network record, retrieved at block 242, then it may be assumed, in one exemplary embodiment, that this geographic location is a corporate office and that the actual hosts may or may not be at that location. To prevent the location synthesis process 124 from being overwhelmed by redundant data that might not be useful, the DNS LDM 134 is prevented from duplicating the Net LDM 132, because, in an exemplary embodiment, the LDM 134 is less skillful than the LDM 132.

Similar to the Net LDM 132, the DNS LDM 134 may be strongest at the end of a traceroute, but not along the backbone core routers. Accordingly, the DNS LDM 134 may work well to geolocate companies that have a domain name registered and do their own hosting locally. Small dial-up ISPs are also locatable in this way as well.

An exemplary collection of confidence maps that may be utilized by the DNS LDM 134 to attach confidence factors to location determinants, at block 278, are discussed below with reference to FIGS. 18A-18E. The DNS LDM 134 relies on similar parameters as the Net LDM 132 for determining its confidence factors. Major differences include using distance to a network location, the rather than a network block size. It will also be noted that, in the exemplary embodiment, DNS confidence factors yielded by the confidence maps discussed below are significantly lower than in other LDMs.

Figure 18A:
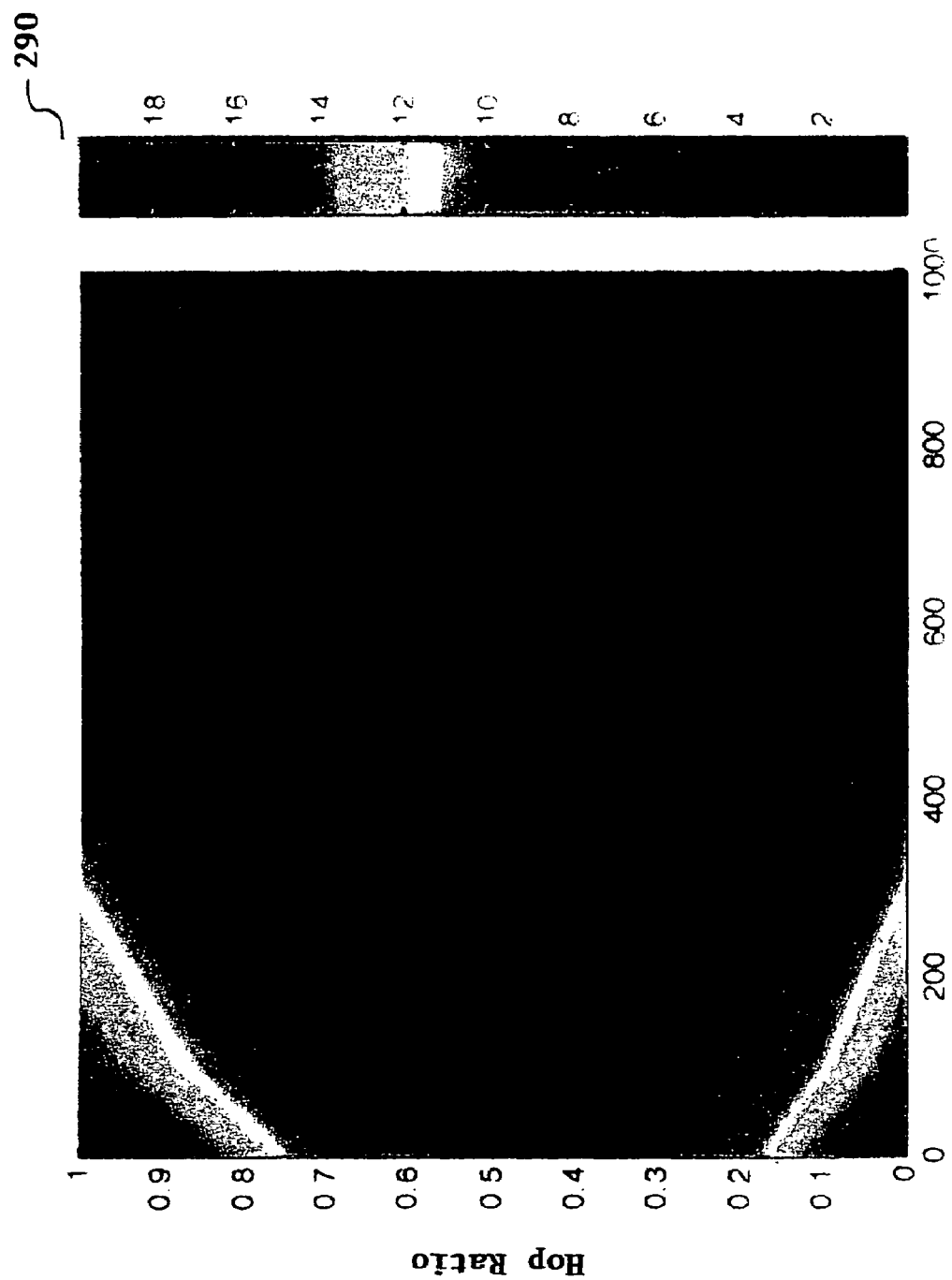
FIGS. 18A-18E illustrate an exemplary collection of confidence maps that may be utilized by the DNS LDM to attach confidence factors to location determinants.

LKH Distance—Hop Ratio Confidence Map (290)
X-axis: Distance in Miles Between LKH and DNS
Y-axis: Hop Ratio color: confidence factor
Confidence map weight: 50
Comments: An exemplary embodiment of the confidence map 290 is illustrated in FIG. 18A. This confidence map 290 generates a relatively high confidence factor only at the ends of a traceroute and only when the geographic location (e.g., a city) corresponding to the DNS record is within close proximity to the LKH.

Figure 18B:
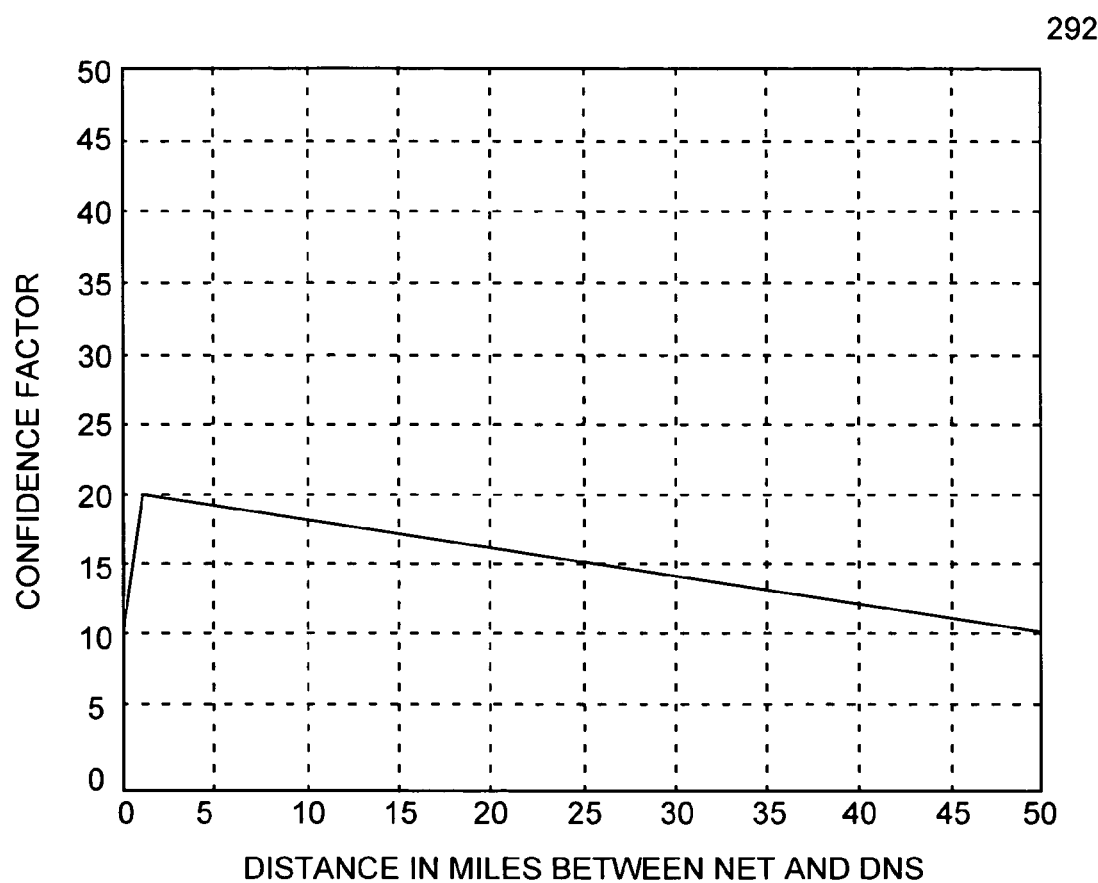

Distance to Net Confidence Map (292)
X-axis: Distance in Miles Between Net and DNS
Y-axis confidence factor
Confidence map weight: 80
Comments: An exemplary embodiment of the confidence map 292 is illustrated in FIG. 18B. This confidence map 292 works under the assumption that if the Net and DNS records are identical, then they probably point to a corporate headquarters. If the distance between the two is zero, then the confidence factor is zero. If, however, the distance is not zero but is very small, then there is a greater chance that either one could be correct, or a larger confidence factor is given.

Figure 18C:
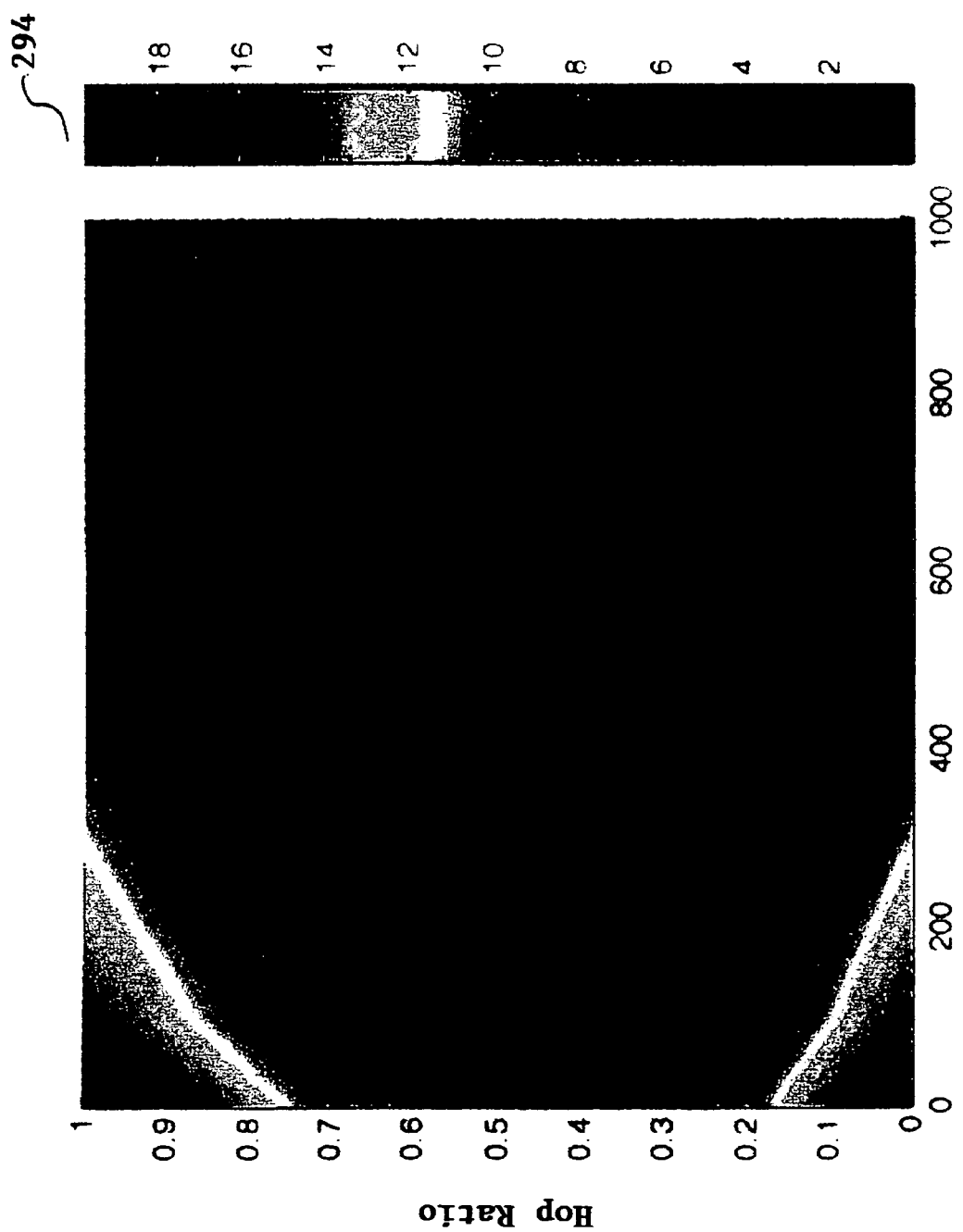

NKH Distance—Hop Ratio Confidence Map (294)
X-axis: Distance in Miles Between NKH and DNS
Y-axis: Hop Ratio color: confidence factor
Confidence map weight: 50
Comments: An exemplary embodiment of this confidence map 294 is illustrated in FIG. 18C. This confidence map 294 gives high confidence only at the ends of a traceroute and only when the geographic location (e.g., the city) corresponding to the DNS record is within close proximity to the NKH.

Figure 18D:
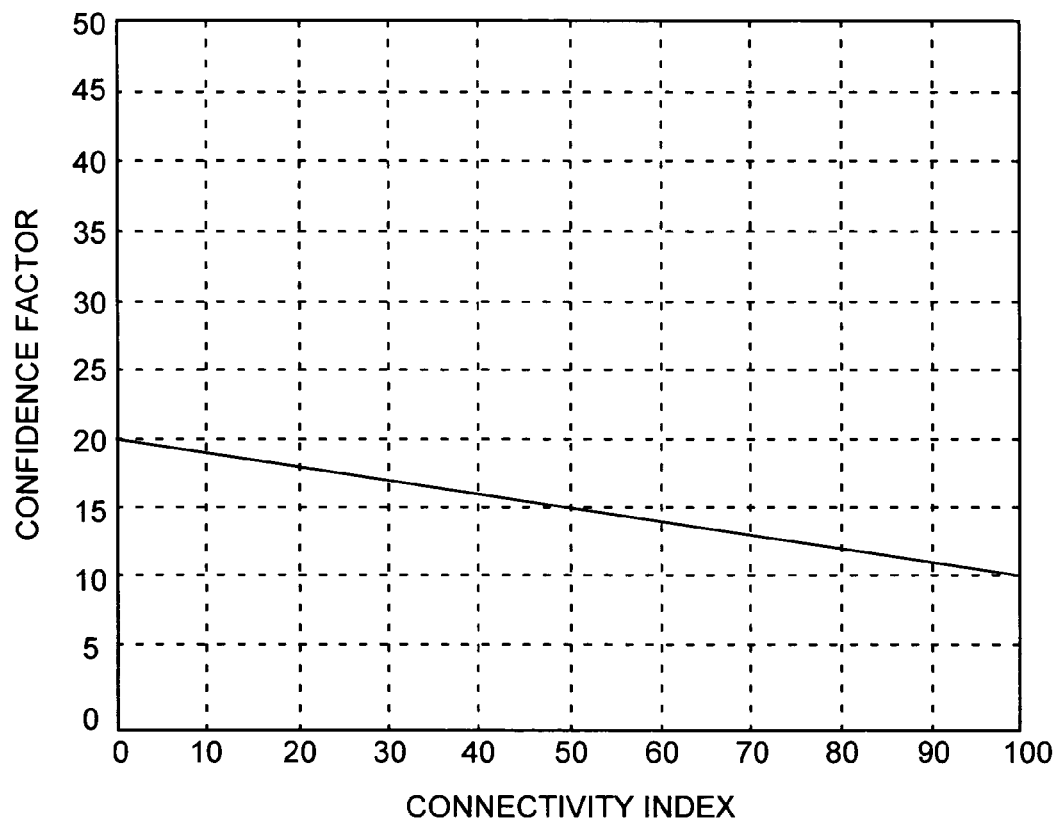

Connectivity Confidence Map (296)
X-axis: Connectivity Index
Y-axis: confidence factor
Confidence map weight: 25
Comments: An exemplary embodiment of this confidence map 296 is illustrated in FIG. 18D. Contrary to the relationship in the RegEx LDM 130, the DNS LDM 134 operates such that less-connected geographic locations (e.g., cities) are rewarded with higher confidence factors. The premise is that, for example, if a domain name is registered in a small town, hosts associated with it are more likely to be in that small town. Larger cities may just be corporate headquarters or collocations.

Figure 18E:
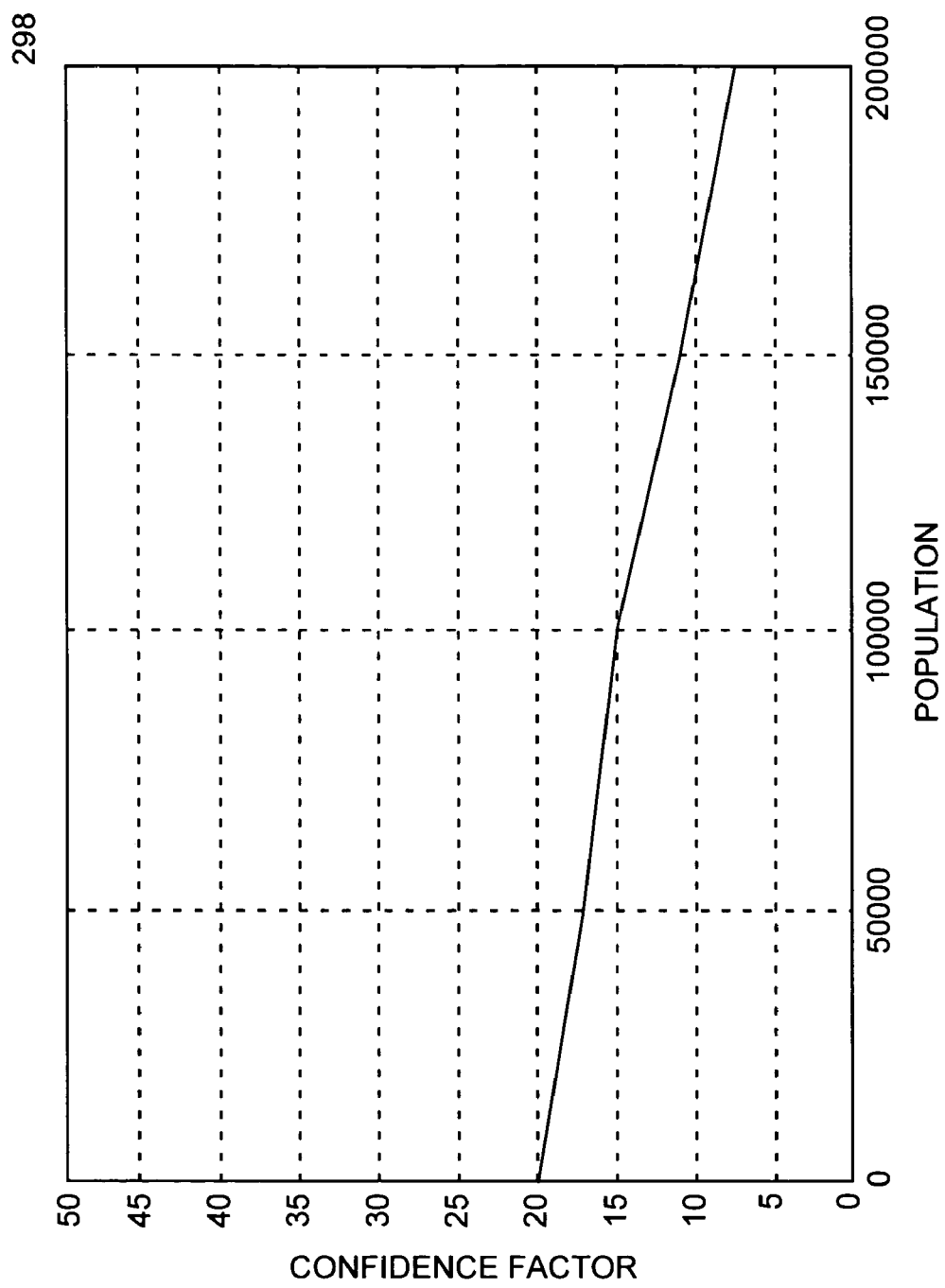

Population Confidence Map (298)
X-axis: Population
Y-axis: confidence factor
Confidence map weight: 25
Comments: An exemplary embodiment of the confidence map 298 is illustrated in FIG. 18E. Contrary to the relationship in the RegEx LDM 130, here smaller geographic locations (e.g., small towns) are rewarded with higher confidence factors. The premise is that, for example, if a domain name is registered in a small town, hosts associated with it are more likely to be in that small town. Larger cities may just be corporate headquarters.

ASN LDM Location Generation

The method by which the Autonomous System Network (ASN) LDM 136 operates to identify one more geographic locations for network addresses, and to assign at least one confidence factor to each of the geographic locations, is similar to the methods 240 and 270 of other two internet registry LDMs (i.e., the Net LDM 132 and the DNS LDM 134). Specifically, as opposed to the deploying external data collection routines to gather Net and DNS records, the ASN LDM 136 deploys the external data collection routines to gather the Autonomous System data, and parse it for meaningful geographic data. If ASN data is available, then the ASN LDM 136 can run.

The ASN LDM 136 is, in one embodiment, not used if the network block size registered by a blocking algorithm is larger than 65,536 hosts, as it is unlikely that so many machines would be located at a common location under the same Autonomous System (AS).

As with the DNS LDM 134, the ASN LDM 136 does not run if its ASN record matches that of the Net LDM. Again, this is to avoid erroneous duplication.

The ASN LDM 136 is reliable because the ASN data is utilized in real network communication, and is accordingly generally current, correct, and of a reasonable high resolution.

An exemplary collection of confidence maps that may be utilized by the ASN LDM 136 to attach confidence factors to location determinants are discussed below with reference to FIGS. 19A-19E. The confidence factors generated by the ASN LDM 136 come from distance to LKH and NKH, the size of the network, the position in the traceroute, population and connectivity. It will be noted that the following confidence maps, while utilizing distance and hop ratio in similar ways as in the RegEx LDM 130, population and connectivity are used in contrary ways.

Figure 19A:
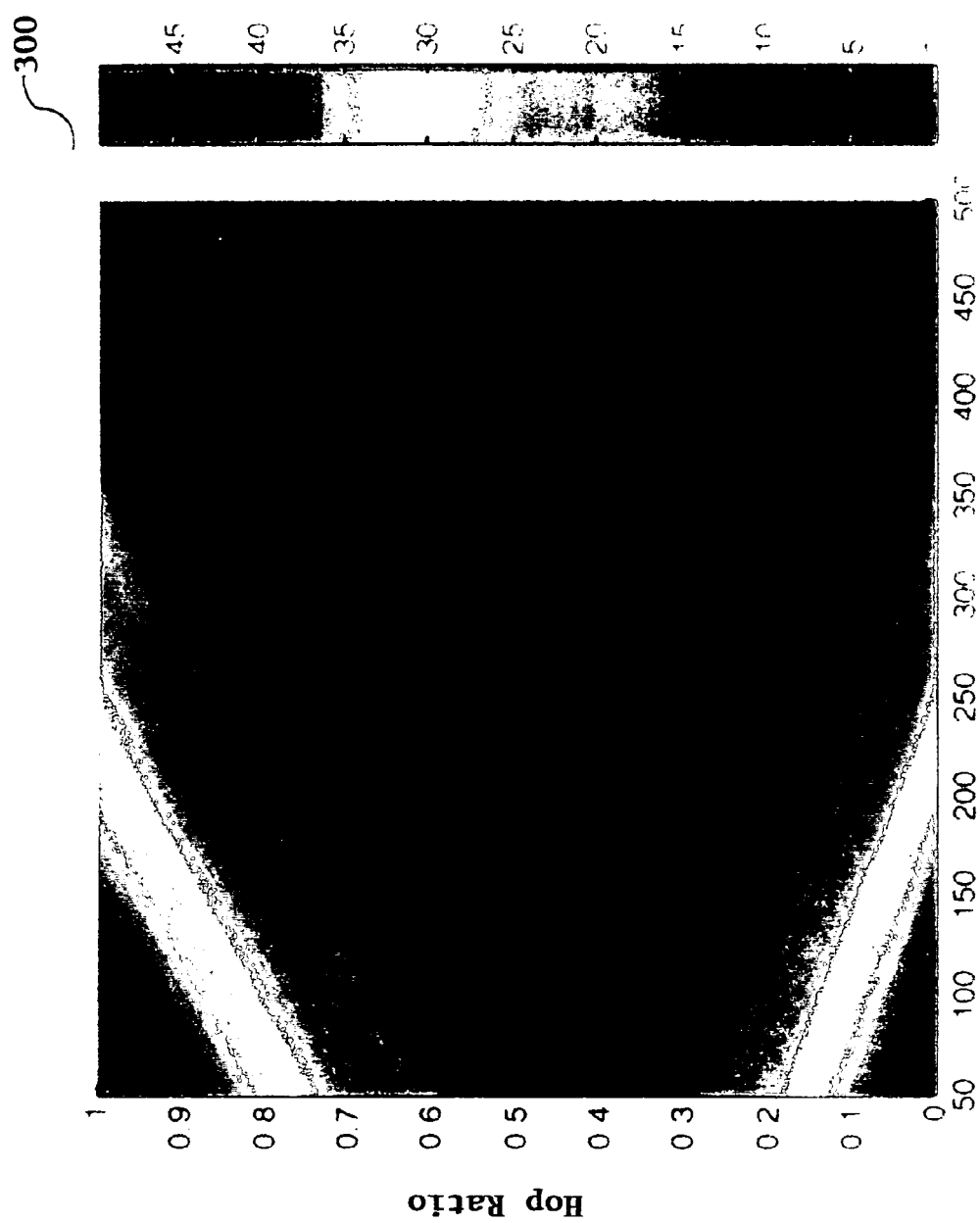
FIGS. 19A-19E illustrate an exemplary collection of confidence maps that may be utilized by the ASN LDM to attach confidence factors to location determinants.

LKH Distance—Hop Ratio Confidence Map (300)
X-axis: Distance in Miles Between LKH and ASN
Y-axis: Hop Ratio color: confidence factor
Confidence map weight: 50
Comments: An exemplary embodiment of the confidence map 300 is illustrated in FIG. 19A. This confidence map 300 gives high confidence only at the ends of a traceroute and only when the geographic location (e.g., a city) corresponding to the ASN record is within close proximity to the LKH.

Figure 19B:
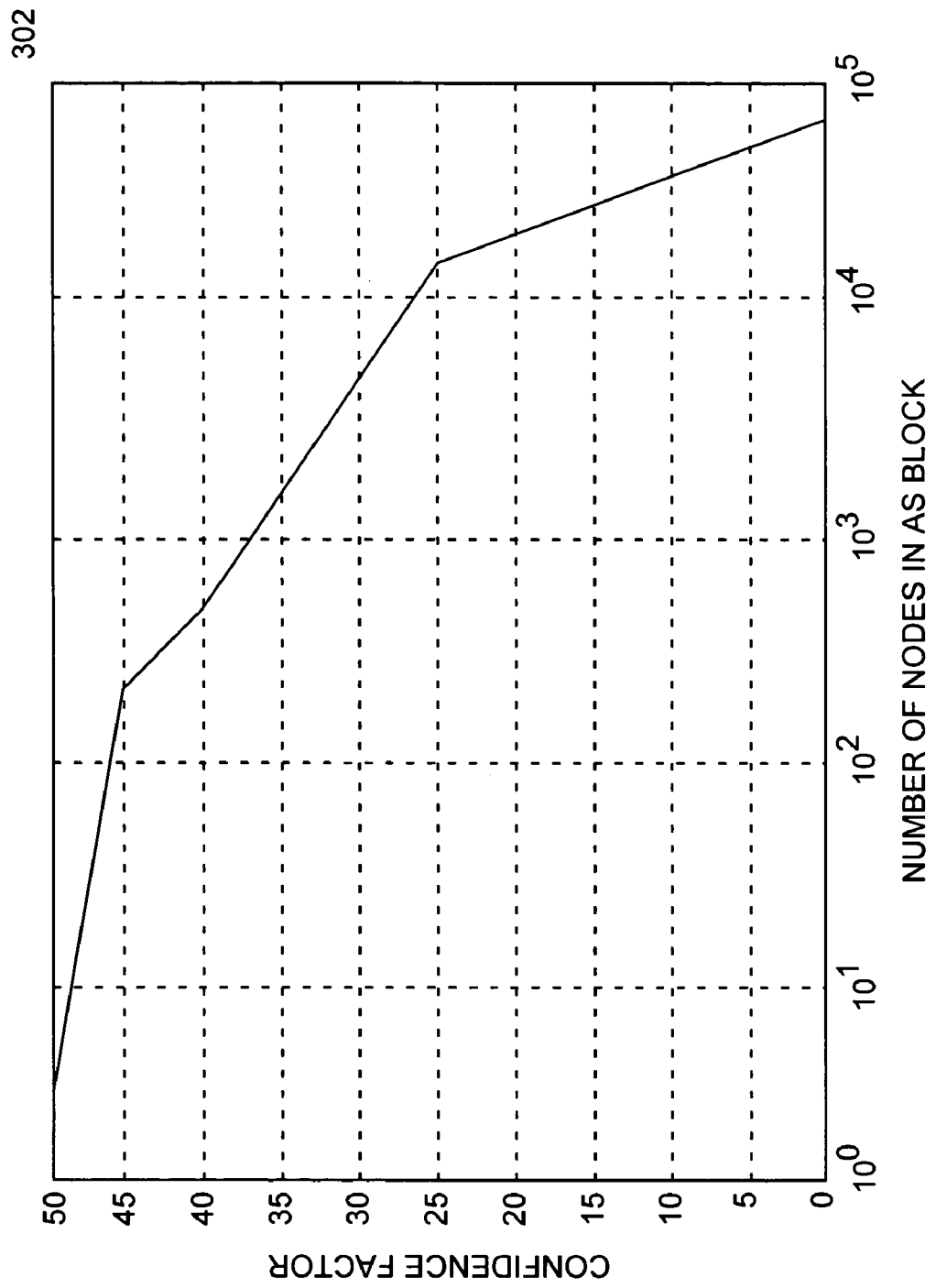

Net Size Confidence Map (302)
X-axis: Number of Nodes in AS Block
Y-axis: confidence factor
Confidence map weight: 100
Comments: An exemplary embodiment of the confidence map 302 is illustrated in FIG. 19B. This confidence map 302 operates off of two premises. First, if an entity has gone through the trouble to register a small block of network space, it is probably accurate. Conversely, large networks that are registered to one organization probably have the hosts spread out across a large area. Thus, small net sizes yield large confidence factors.

Figure 19C:
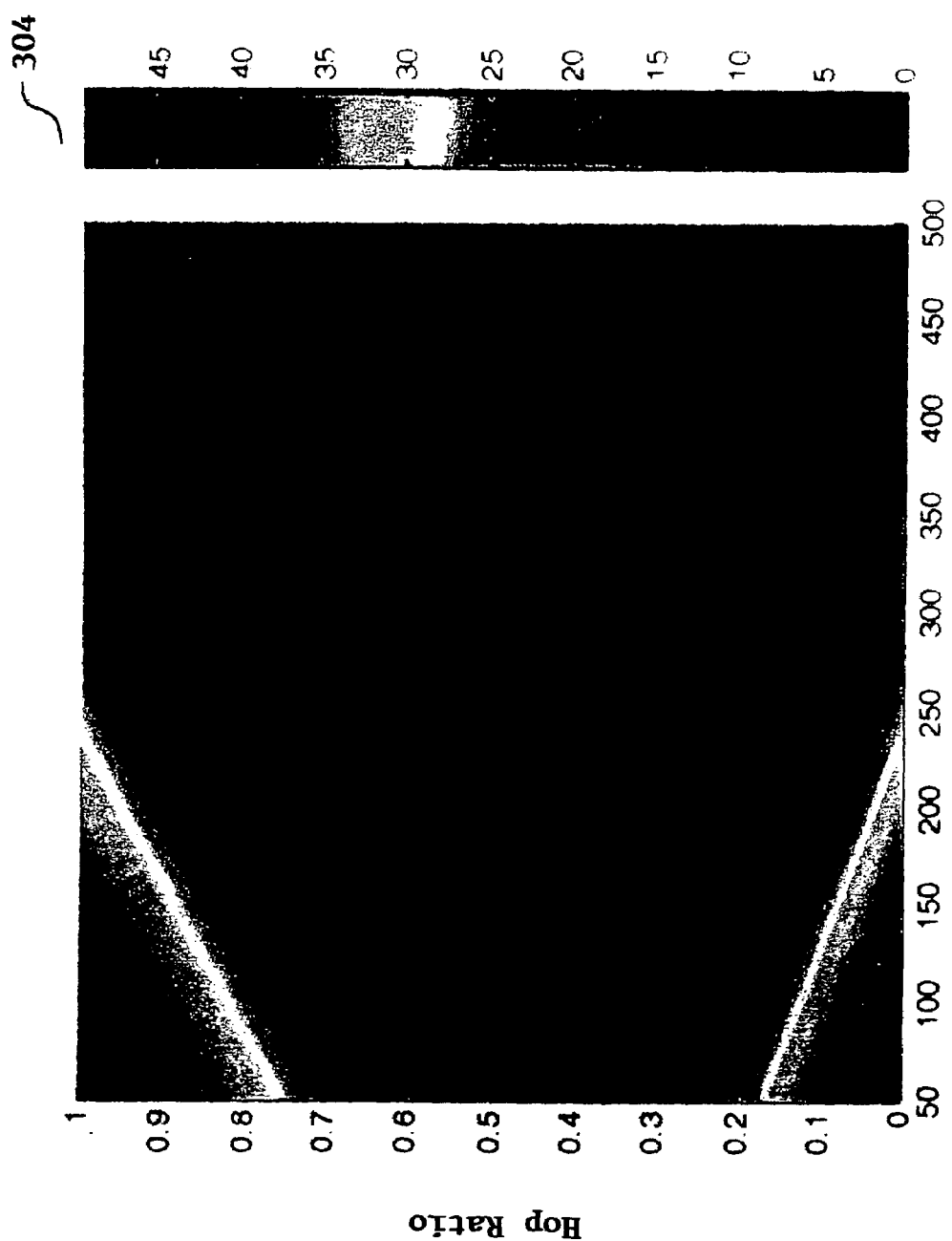

NKH Distance—Hop Ratio Confidence Map (304)
X-axis: Distance in Miles Between LKH and ASN
Y-axis: Hop Ratio
Color: confidence factor
Confidence map weight: 50
Comments: An exemplary embodiment of the confidence map 304 is illustrated in FIG. 19C. This confidence map 304 generates relatively high confidence factors only at the ends of a traceroute and only when the geographic location (e.g., city) corresponding to the ASN record is within close proximity to the NKH.

Figure 19D:
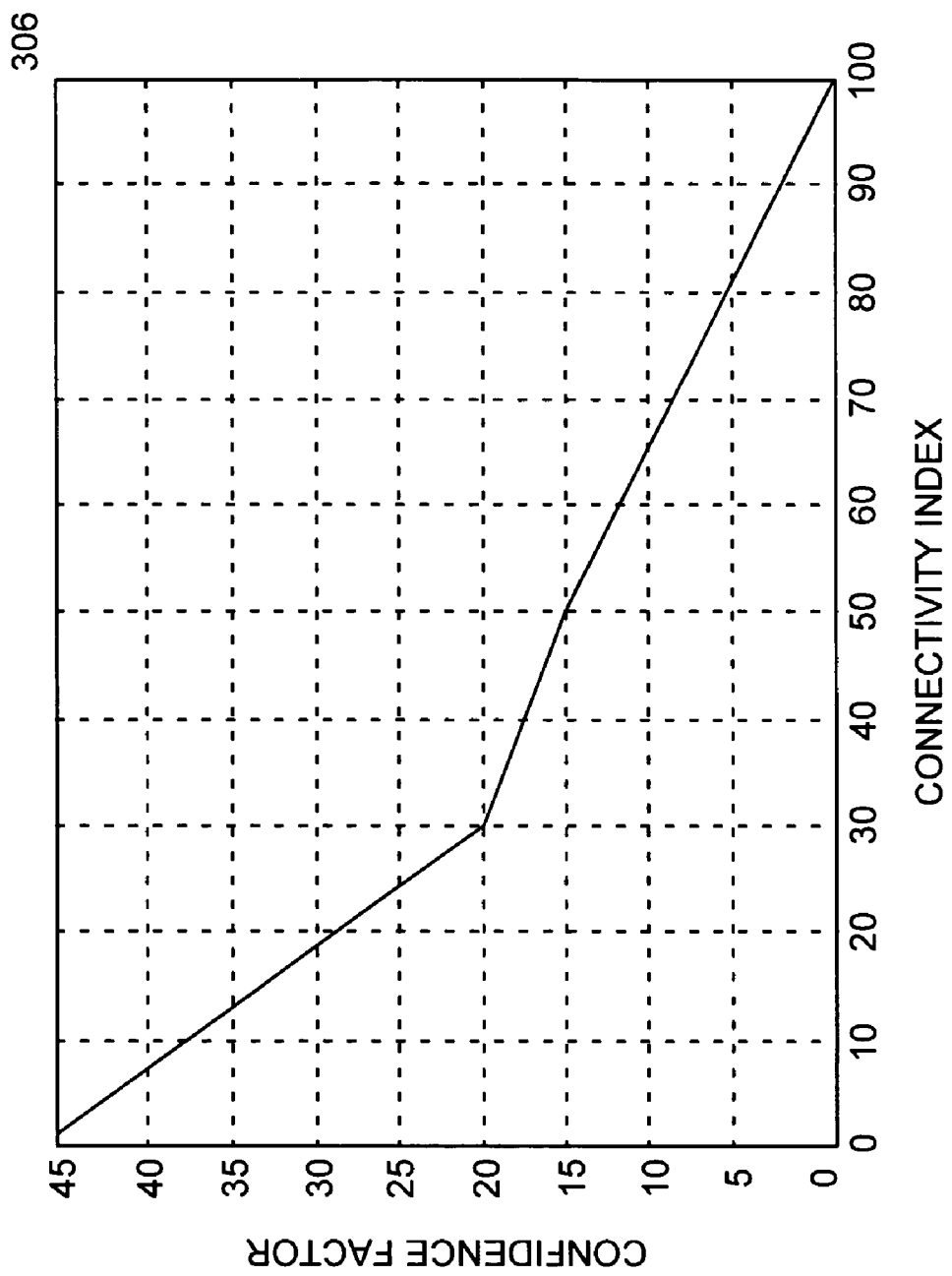

Connectivity Confidence Map (306)
X-axis: Connectivity Index
Y-axis: confidence factor
Confidence map weight: 25
Comments: An exemplary embodiment of the confidence map 306 is illustrated in FIG. 19D. Contrary to the relationship in the RegEx LDM 130, here less-connected geographic locations (e.g., cities) are rewarded with higher confidence factors. The premise is that if a network is registered in a relatively smaller geographic location (e.g., small town), hosts on that network are most likely in that smaller geographic location. Larger cities may be corporate headquarters.

Figure 19E:
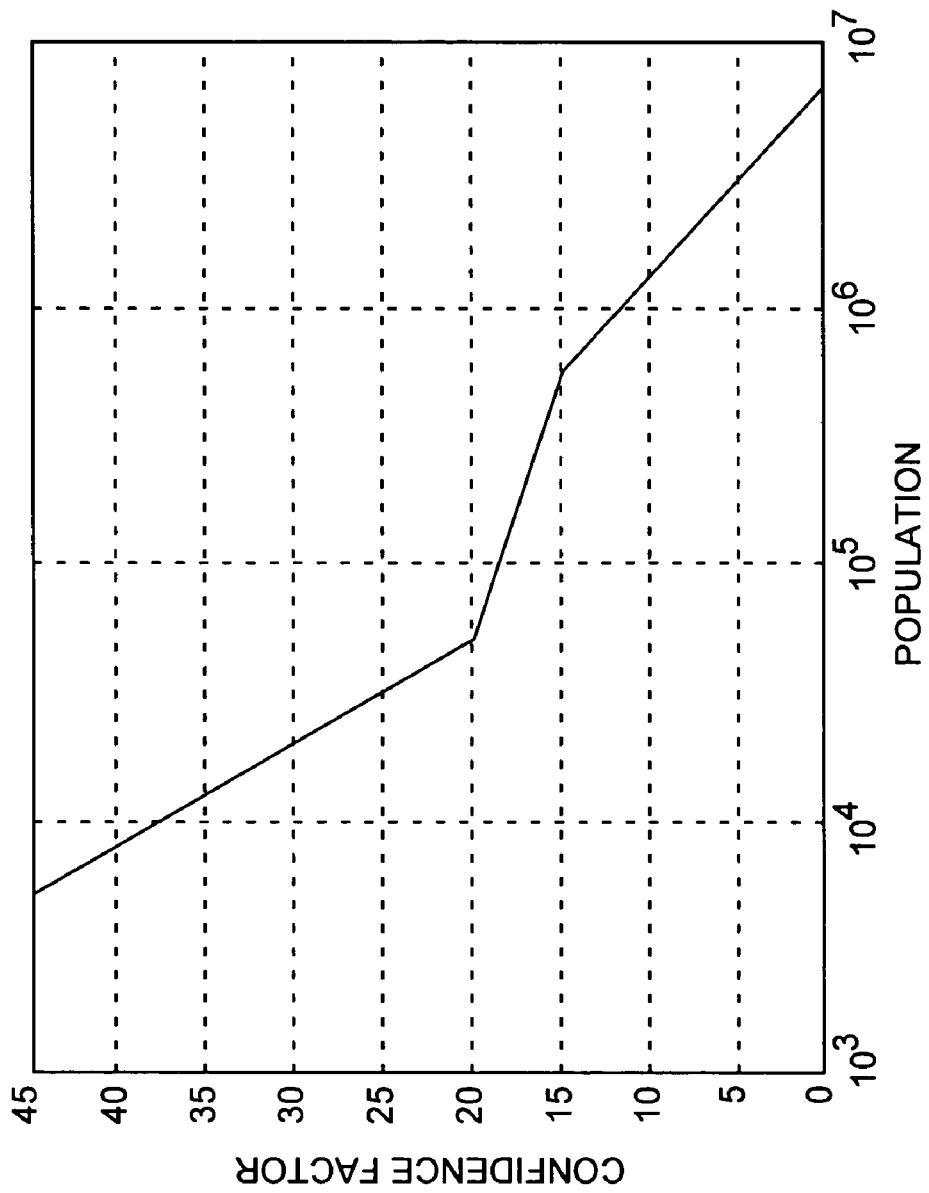

Population Confidence Maps (308)
X-axis: Population
Y-axis: confidence factor
Confidence map weight: 25
Comments: An exemplary embodiment of the confidence map 308 is illustrated in FIG. 19E. Contrary to the relationship in the RegEx LDM 130, here smaller geographic locations (e.g., smaller cities) are rewarded with higher confidence factors. The premise is that if a network is registered in, for example, a small town, hosts on that network are most likely to be located in that small town. Larger cities may be corporate headquarters.

Location (Loc) LDM Location Generation

The method by which the Loc LDM 138 operates to identify one more geographic locations for network address, and to associate least one confidence level with each of the geographic locations, is again similar to the methods 240 and 270 of the Net and DNS LDMs 132 and 134 in that external collection processes gather Location (Loc) records from appropriate registries, which are parsed to extract location determinants. The Loc LDM 138 differs from the above described LDMs in that a collection of confidence maps is not utilized to attach confidence factors to each of these location determinants, as will be described in further detailed below.

The Loc LDM 138, in one exemplary embodiment, differs from the previously described LDMs in that it exhibits a high degree of accuracy and precision. Specifically, a DNS Loc record, as collected by external processes, may provide an indication of a hosts' latitude and longitude data, which may be utilized to tie a location determinant to a city (or even smaller).

DNS Loc records are rarely available. Fewer than 1% of all hosts actually have a Loc record available.

The Loc LDM 138 is one of only two LDMs that do not make use of confidence maps. The rationale behind this is that there are no circumstances that would change the belief in the highly accurate DNS Loc record, used by the Loc LDM 138. So as opposed to utilizing a number of confidence maps, if the Loc record is available, the Loc LDM 138 communicates a location determinant derived from the Loc record to the location filter 22, accompanied by a precise confidence factor, for example, 85.

LKH LDM Location Generation

The LKH LDM 140 makes use of traceroute contextual data, and asserts that the host in question is in precisely the same location as the one previously identified in the traceroute. Specifically, it is generally found that at the end of a traceroute, the physical distance from the one hop to the next is on the order of miles, not hundreds of miles. It is also not uncommon for a traceroute to spend several hops in the same area (i.e. network center).

Take, for instance, a partial traceroute to www.quova.com:

| | | | | |
|---|---|---|---|---|
| 1 | <10 ms | <10 ms | <10 ms | 10.0.0.1 |
| 2 | 30 ms | 20 ms | 21 ms | loop1.dnvr-6400-gw1.dnvr.uswest.net [63.225.108.254] |
| 3 | 270 ms | 20 ms | 30 ms | 103.port1.dnvr-agw2.dnvr.uswest.net [207.225.101.126] |
| 4 | 20 ms | 20 ms | 20 ms | gig3-0.dnvr-gw2.dnvr.uswest.net [206.196.128.219] |
| 5 | 20 ms | 20 ms | 20 ms | h4-0.denver-cr2.bbnplanet.net [4.0.212.245] |
| 6 | 50 ms | 20 ms | 20 ms | p4-0-0.denver-br2.bbnplanet.net [4.0.52.21] |
| 7 | 30 ms | 30 ms | 20 ms | p0-0-0.denver-br1.bbnplanet.net [4.0.52.17] |
| 8 | 50 ms | 60 ms | 50 ms | p2-3.lsanca1-ba2.bbnplanet.net [4.24.6.1] |
| 9 | 50 ms | 60 ms | 50 ms | p7-0.lsanca1-br2.bbnplanet.net [4.24.4.38] |
| 10 | 50 ms | 51 ms | 60 ms | p2-0.lsanca1-br1.bbnplanet.net [4.24.4.13] |
| 11 | 70 ms | 70 ms | 60 ms | p7-3.paloalto-nbr2.bbnplanet.net [4.24.5.210] |
| 12 | 70 ms | 60 ms | 70 ms | p1-0.paloalto-cr2.bbnplanet.net [4.0.6.78] |

| | | | | |
|---|---|---|---|---|
| | | | -continued | |
| 13 | 2624 ms | 2654 ms | * | pos2-1.core1.SanJose1.Level3.net [209.0.227.1] |
| 14 | 230 ms | 220 ms | 221 ms | so-4-0-0.mp2.SanJose1.level3.net [209.247.11.9] |
| 15 | 120 ms | 130 ms | 121 ms | loopback0.hsipaccess1.Washington1.Level3.net [209.244.2.146] |
| 16 | 280 ms | 131 ms | 130 ms | 209.244.200.50 |

It will be noted that three consecutive hops (1-3) are all in Denver under uswset.net, and the three following that are also in Denver under bbnplanet.net. In three following hops are all in Los Angeles. While the above exemplary traceroute could be interpreted, in one embodiment, solely within the RegEx LDM 130, the LKH LDM 140 may operate to reinforce the results that the RegEx LDM 130 generates. This interaction is discussed in further detailed below.

While the LKH LDM 140 may provide useful results, it has with it a dangerous side effect that requires careful attention; unless kept in check, the LKH LDM 140 has the power to "smear" a single location over the entire traceroute. The confidence maps utilized by the LDM 140, as described below, are particularly strict to address this issue.

Figure 20A:
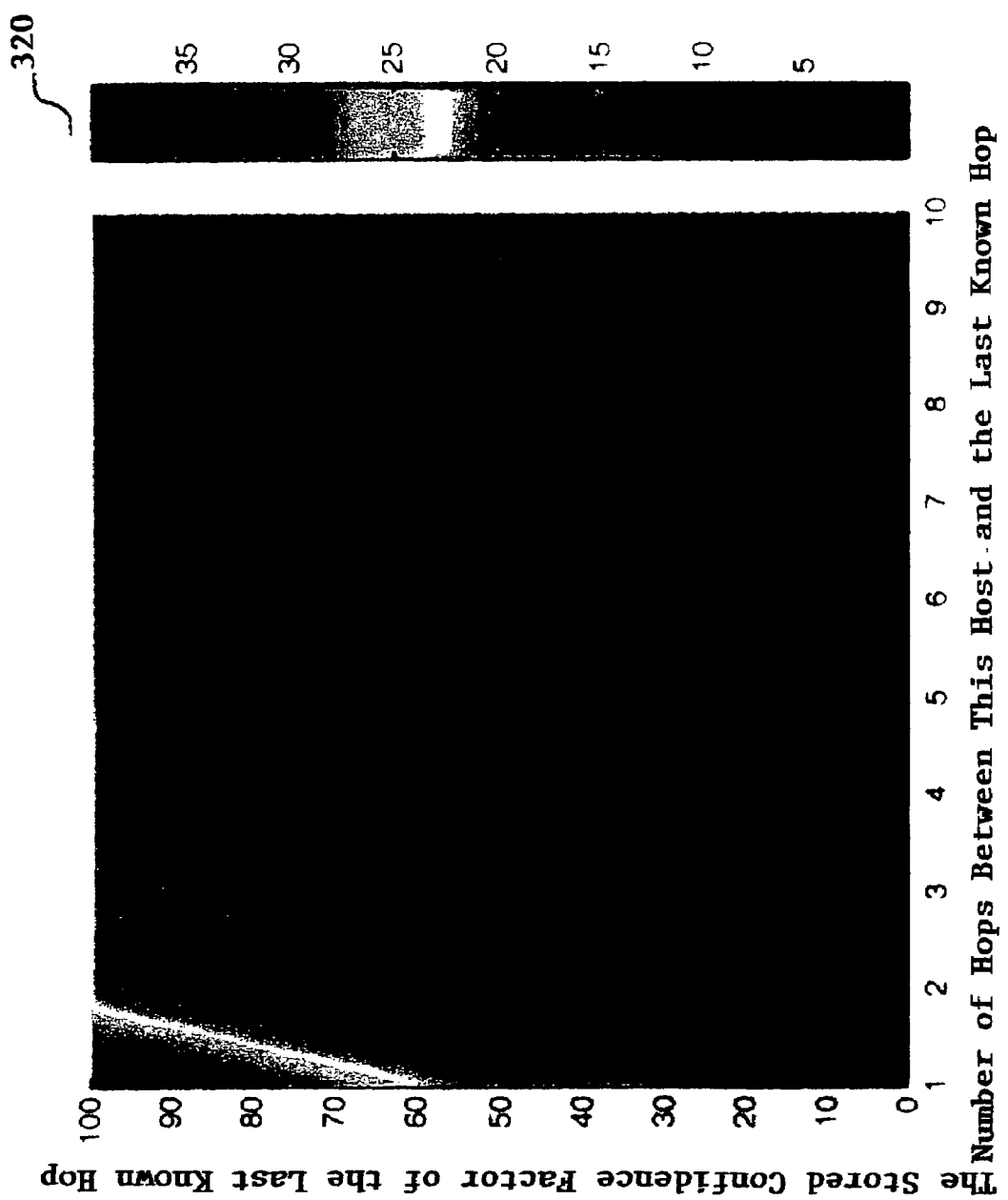
FIGS. 20A-20C illustrate an exemplary collection of confidence maps that may be utilized by the LKH LDM to attach confidence factors to location determinants.
Figure 20B:
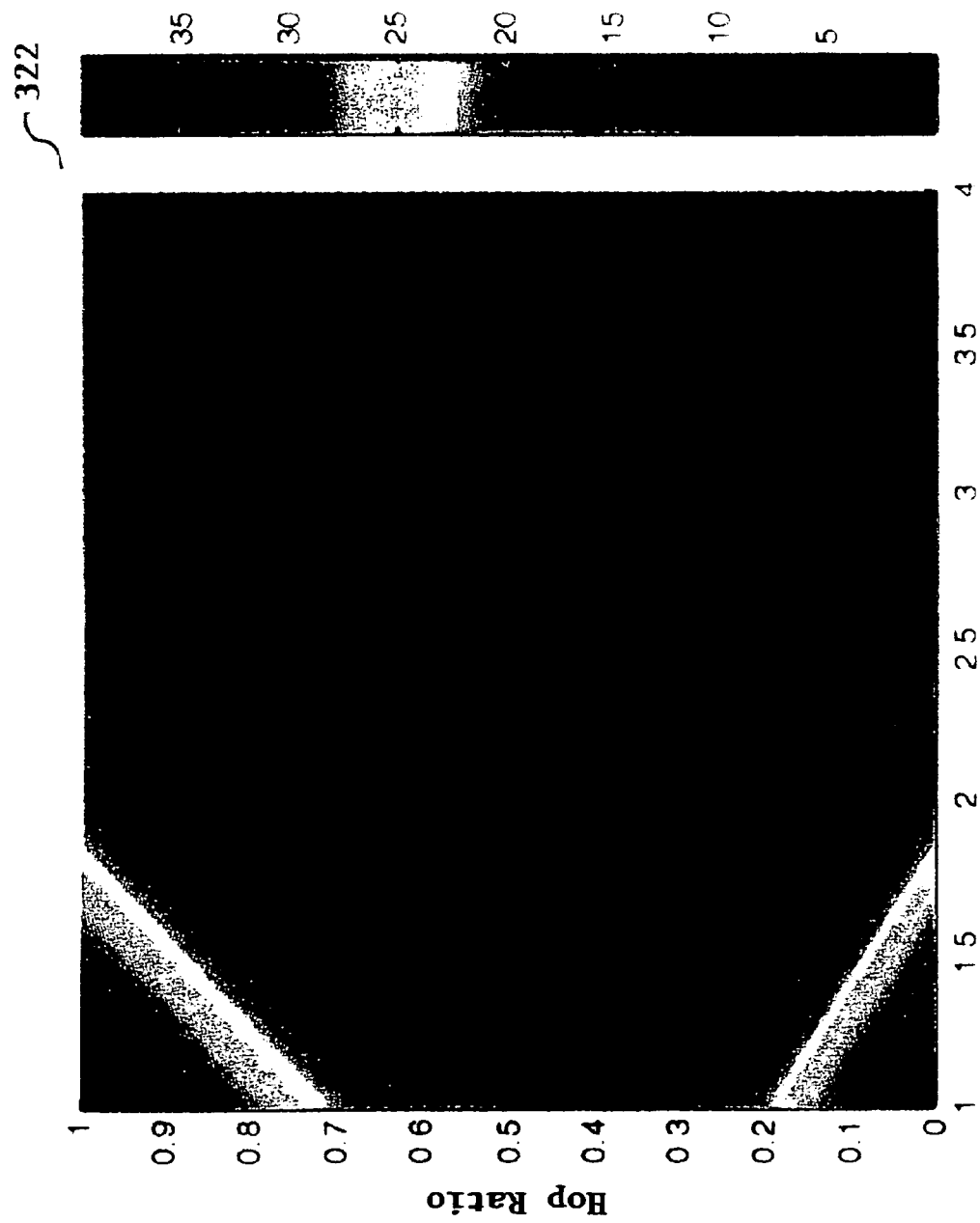
Figure 20C:
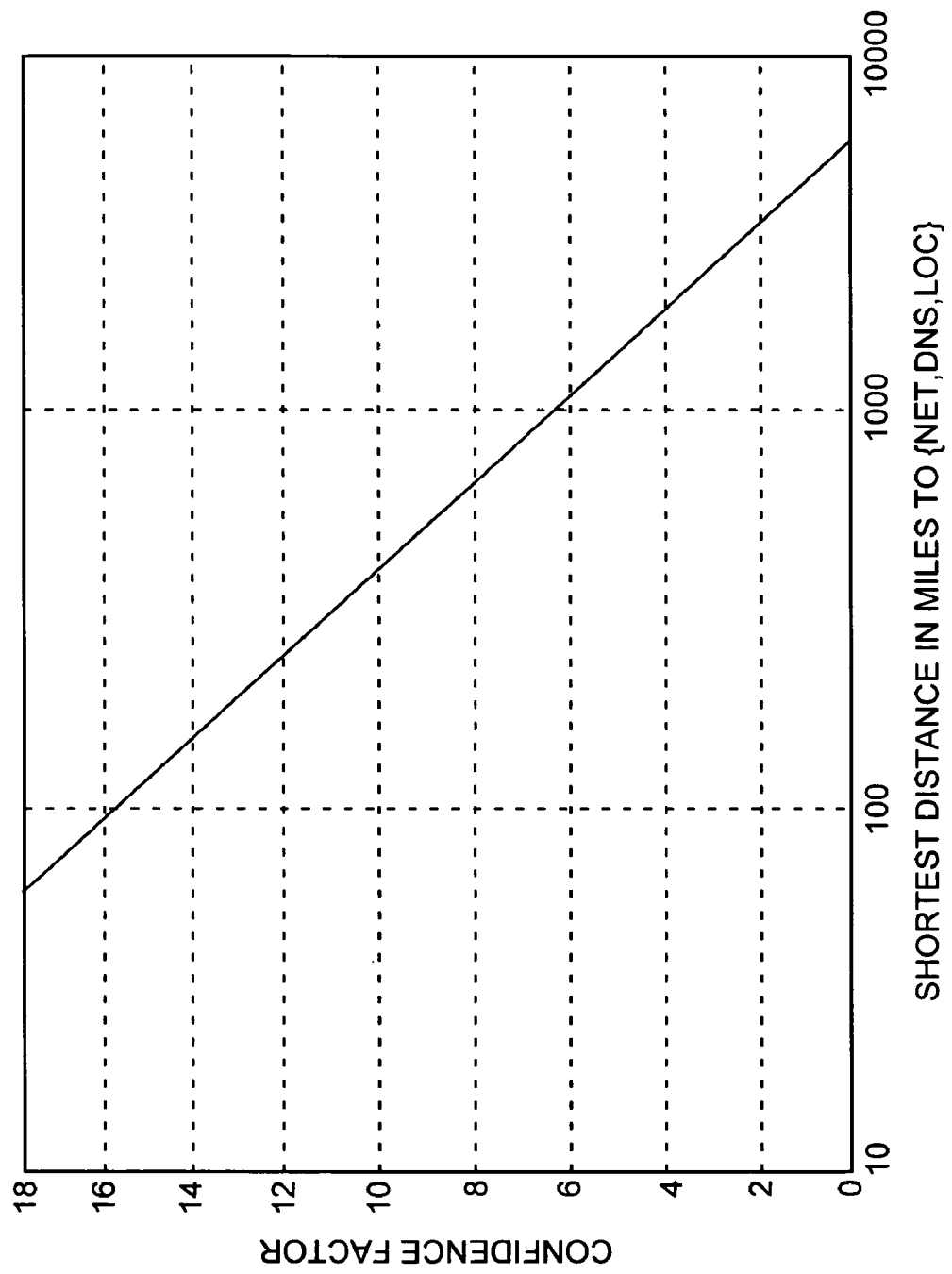

An exemplary collection of confidence maps that may be utilized by the LDM 140 to attach confidence factors to location determinants are discussed below with reference to the FIGS. 20A-20C.

The below discussed collection of confidence maps attempt to address the following issues relating to confidence factors associated with a location determinant outputted by the LDM 140:

(1) How many nodes back was the last known host? If it was only one, it is probably a reasonable location determinant and deserves a high confidence factor.

(2) Did the last known host have a high confidence factor? If it did not, then neither should this one.

(3) Where in the traceroute is the last known host? If it is toward the middle, then the two machines are less likely to be in the same place than if it is at the end.

(4) Is the last known host physically located near to any of the Net, Loc, or DNS records for the host in question? If so, there is a higher likelihood that the two are in the same place.

The below discussed collection of confidence maps parameterizes the above concerns, generating confidence factors for the LKH LDM 140.

Node Distance—Confidence Confidence Map (320)
X-axis: Number of Hops Between this Host and the LKH
Y-axis: Stored confidence factor of the LKH
Color: confidence factor
Confidence map weight: 50
Comments: An exemplary embodiment of the confidence map 320 is illustrated in FIG. 20A. As such above, it is desirable that the confidence maps utilized by the LDM 140 are "strict" to avoid erroneous location determinant smearing. This confidence map 320 only attributes relatively high confidence factors if the LKH is a small number of hops (e.g., less than 2 hops) away and the confidence factor of the LKH is very high.

Node Distance—Hop Ratio Confidence Map (322)
X-axis: Number of Hops Between current Host and the LKH
Y-axis: Hop Ratio
Color: confidence factor
Confidence map weight: 50
Comments: An exemplary embodiment of the confidence map 322 is illustrated in FIG. 20B. This confidence map 322 generates relatively high factors if and only if the hosts are close together (in the traceroute) and at the end of the traceroute. Other scenarios receive low or zero confidence factors.

Shortest Registry Distance Confidence Map (324)
x-axis: Shortest Distance in Miles to {Net,DNS,Loc}
y-axis: confidence factor
confidence map weight: 50
Comments: An exemplary embodiment of the confidence map 324 is illustrated in FIG. 20C. The confidence map 324 gives slightly higher confidence factors if and only if the LKH is proximal to any of the Net, DNS, or Loc Records.

NKH LDM Location Generation

The mechanics of Last Known Host (LKH) LDM 140 are substantially similar to the Next Known Host (NKH) LDM 142. While the NKH will usually not be directly instrumental in geolocating an end node, it can play an auxiliary role, and provide useful supplemental information. For example, if Router A is the last hop before a traceroute goes to an end node in, say, Denver, Colo., then it is not unlikely that Router A is also in Denver, Colo. By assigning Router A to Denver, Colo., the next time a traceroute runs through Router A, it can use the LKH to press on further.

The NKH LDM 142, in a slightly less robust way than the LKH LDM 140 and in a substantially way than the RegEx LDM 130, is a mechanism for providing supplemental information in the router space of the Internet, which subsequently provides aid in the end node geolocation.

Figure 21A:
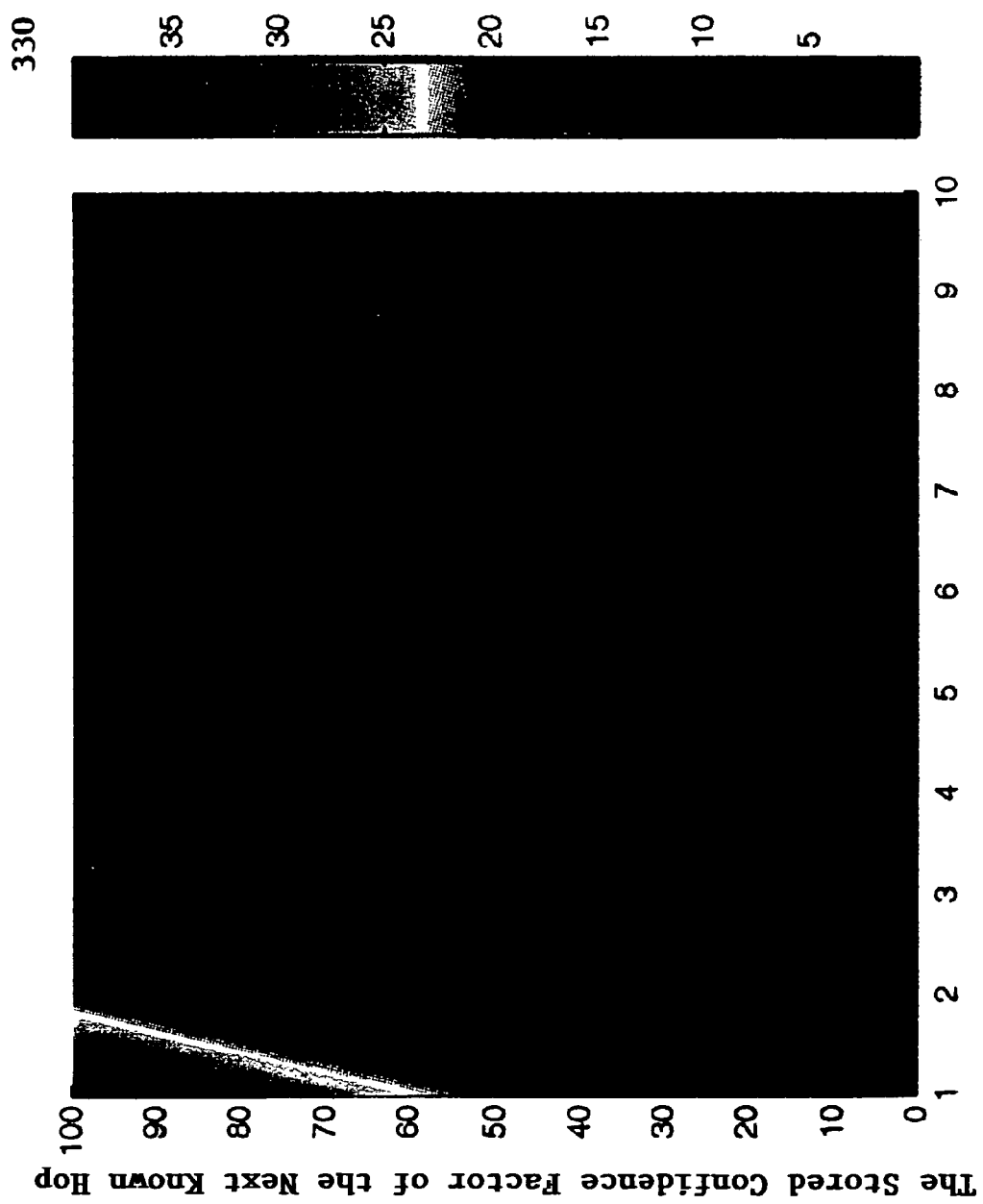
FIGS. 21A-21C illustrate an exemplary collection of confidence maps that may be utilized by the NKH LDM to attach confidence factors to location determinants.
Figure 21B:
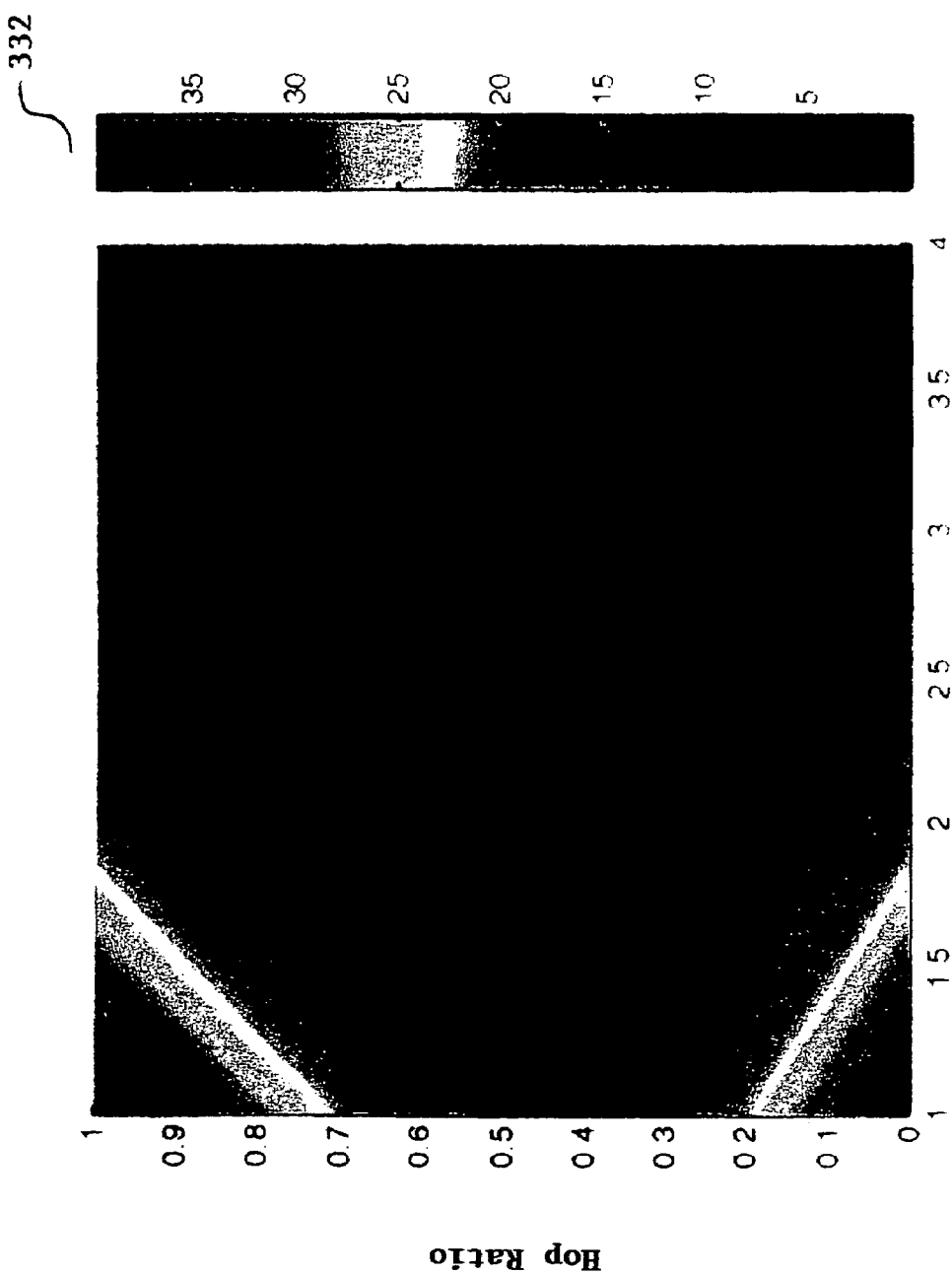
Figure 21C:
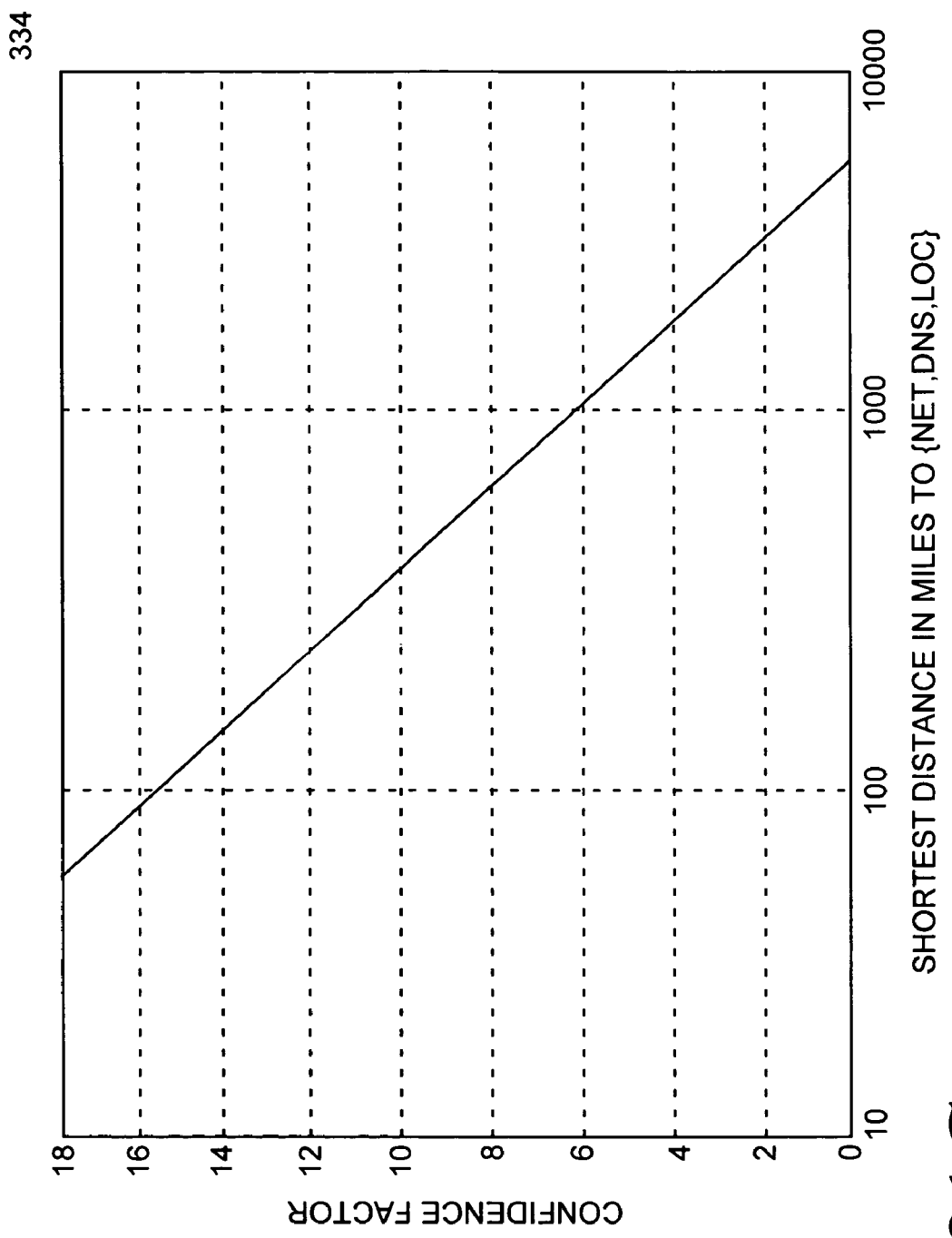

An exemplary collection of confidence maps that may be utilized by the NKH LDM 142 to attach confidence factors to location determinants are discussed below with reference to FIGS. 21A-21C.

Node Distance—Confidence Confidence Map (330)
X-axis: Number of Hops Between this Host and the NKH
Y-axis: Stored confidence factor of the NKH
Color: confidence factor
Confidence map weight: 50
Comments: An exemplary embodiment of the confidence map 330 is illustrated in FIG. 21A. Again it is desirable that the confidence maps utilized by the NKH LDM 142 are "strict" to avoid erroneous location determinant smearing. This confidence map 330 only gives high confidence factors if the NKH is a small number of hops (e.g., less than 2 hops) away from a current geographic location (e.g., host) and the confidence factor of the NKH is very high.

Node Distance—Hop Ratio Confidence Map (332)
X-axis: Number of Hops Between current Host and the NKH
Y-axis: Hop Ratio
Color: confidence factor
Confidence map weight: 50
Comments: An exemplary embodiment of the confidence map 332 is illustrated in FIG. 21B. This confidence map 332 gives relatively high confidence factors if and only if the hosts are close together (in the traceroute) and at the end of the traceroute. Other scenarios receive low or zero confidence factors.

Shortest Registry Distance Confidence Map (334)
x-axis: Shortest Distance in Miles to {Net,DNS,Loc}
y-axis: confidence factor
confidence map weight: 50
Comments: An exemplary embodiment of the confidence map 334 is illustrated in FIG. 21C. The confidence map 334 gives slightly higher confidence factors if and only if the NKH is proximal to any of the Net, DNS, or Loc Records.

Sandwich LDM Location Generation

Figure 22:
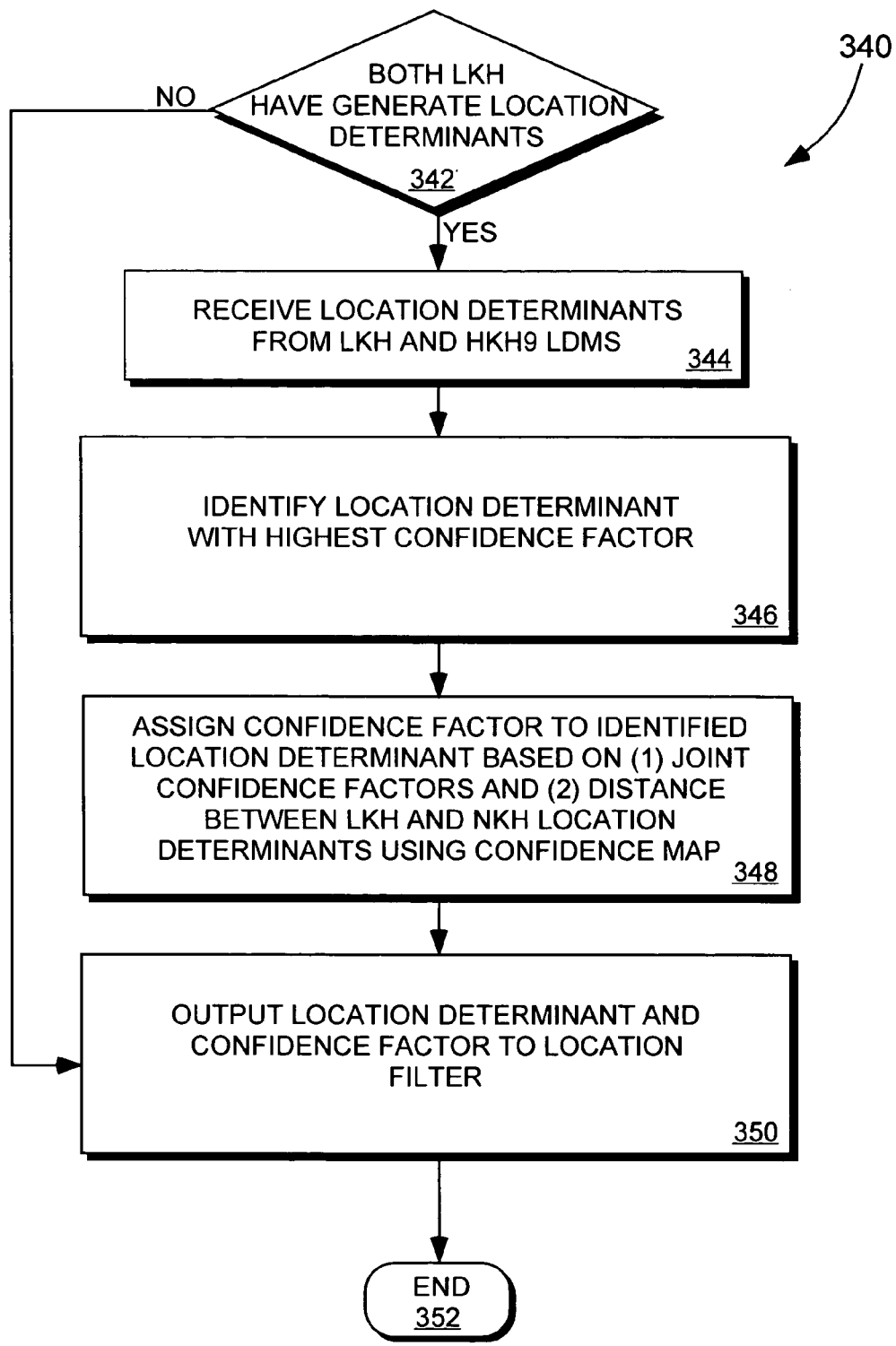
FIG. 22 is a flowchart illustrating a method, according to an exemplary embodiment of the present invention, performed by a sandwich LDM to identify one or more geographic locations for a network address, and to associate at least one confidence factor with each of the geographic locations.

FIG. 22 is a flowchart illustrating a method 340, according to an exemplary embodiment of the present invention, performed by the sandwich LDM 144 to identify one more geographic locations for a network address, and associated at least one confidence factor with each of the geographic locations.

The method 340 commences at decision block 342, where the sandwich LDM 144 determines whether both the LKH and the NKH LDMs 140 and 142 generated respective location determinants and associated confidence factors. If not, and only one or neither of these LDMs 140 and 142 generated a location determinant, the method 340 then ends at block 352.

On the other hand, following a positive determination at decision block 342, at block 344 the sandwich LDM 144 retrieves the respective location determinants from the LKH and the NKH LDMs 140 and 142.

At block 346, the sandwich LDM 144 identifies the location determinant received at block 344 that has the highest confidence factor associated therewith.

At block 348, the sandwich LDM 144 assigns a confidence factor to the location determinant identified at block 346 based on: (1) a combination of the confidence factors assigned to each of the location determinants by the LDMs 140 and 142 (e.g., by calculating the mean of the location determinants); and (2) the distance between the location determinants generated by the LDMs 140 and 142.

At block 350, the identified location determinant, and the new confidence factor calculated at block 348 are outputted from the sandwich LDM 144 to the location filter 122. The method 340 then ends at block 352.

It will be noted that the sandwich LDM 144 is different from the other LDMs, because it is the only LDM that does not operate to produce a location determinant that is potentially distinct from the location determinants produced by the other LDMs. The sandwich LDM 144 works as an extra enforcer to further empower the LKH and NKH LDMs 140 and 142. For example, if an exemplary host has a LKH location determinant and a NKH location determinant, the sandwich LDM 144 will choose the more confident of the two location determinants and assign a confidence factor based on their joint confidence factors and their distance to one another.

The sandwich LDM 144 addresses a potential inability of LKH and NKH LDMs 140 and 142 to work together successfully in filling in so-called "sure thing" gaps. For example, if hop #10 of a traceroute is in New York City and hop #13 is in New York City, then it can be assumed with a high degree of certainty that hops #11 and #12 should also be in New York City. This scenario is then generalized to treat not just identical NKH and LKH location determinants, but also ones that are very close to one another.

Figure 23:
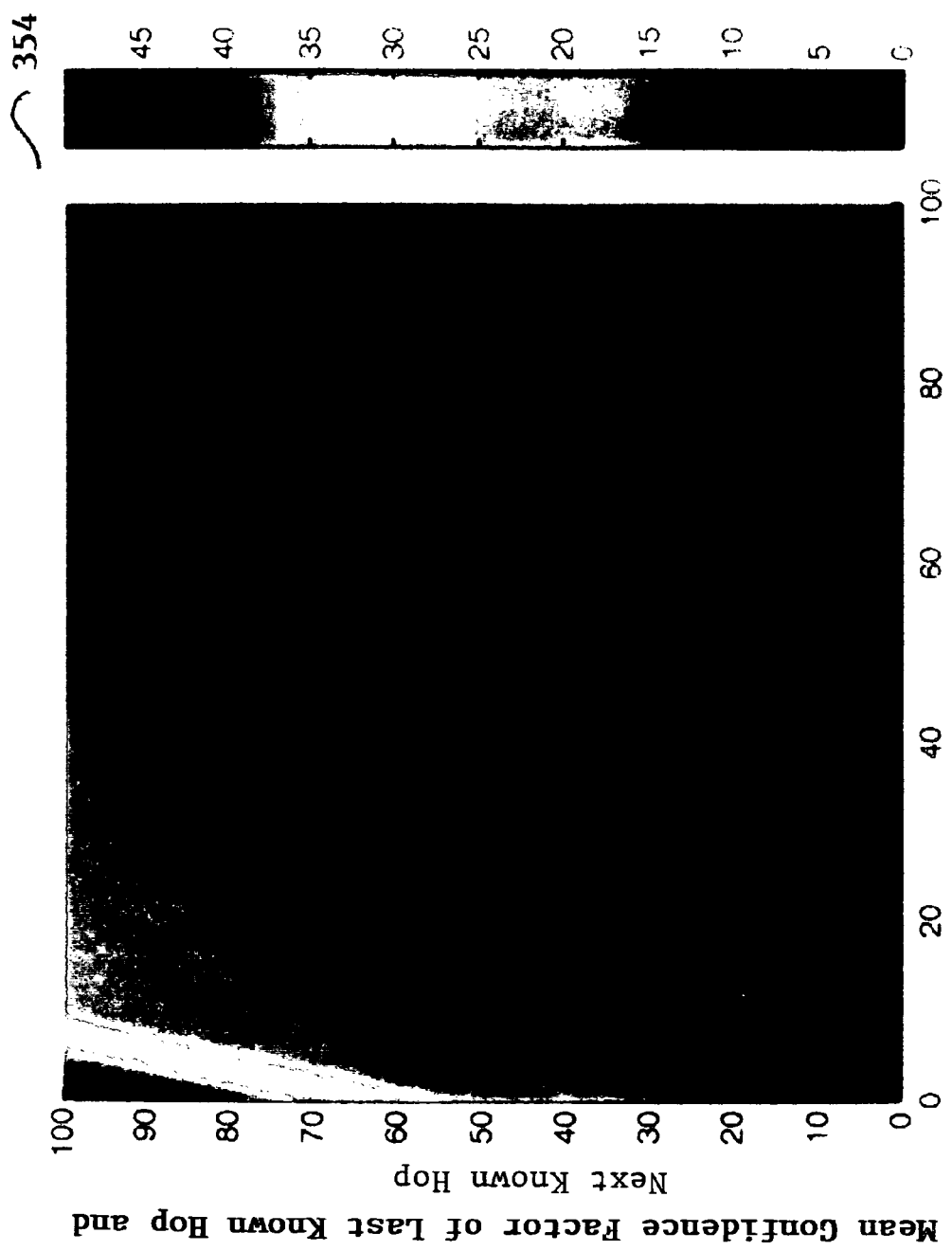
FIG. 23 illustrate an exemplary confidence that may be utilized by the sandwich LDM to attach confidence factors to location determinants.

The sandwich LDM 144, in an exemplary embodiment, utilizes a single confidence map 354 illustrated in FIG. 23 to assign a confidence factor to a location determinant.

Sandwich/Confidence Factor—Proximity Confidence Map (354)
X-axis: Distance in Miles Between LKH and NKH
Y-axis: Mean confidence factor of LKH and NKH location determinants
Color: confidence factor
Confidence map weight: 50
Comments: After the sandwich LDM 144 identifies which of the NKH or LKH location determinants as a higher confidence factor, it assigns a confidence factor to the identified location determinant that is only nontrivial if the LKH and NKH location determinants are very close and have a high mean confidence factor.

Suffix LDM Location Generation

The suffix LDM 146 operates on hostnames. If a hostname is not available, the suffix LDM 146 does not run. Further, it requires that the hostname end in special words, specifically ISO country codes or state/province codes. Accordingly, the suffix LDM 146 does not employ artificial intelligence, and looks up the code (e.g., the ISO country code or a state/province code) and returns the corresponding geographic location information. The code lookup may be performed on the demographic/geographic database 31. For example, a hostname that ends in '.jp' is assigned to Japan; a hostname that ends in '.co.us' is assigned to Colorado, USA.

In addition to the country and state standards, the suffix LDM 146 can also identify dozens of large carriers that have presences in particular regions. For example, a hostname that ends in '.telstra.net' is assigned to Australia; a hostname that ends in '.mich.net' is assigned to Michigan, USA.

The suffix LDM 146 also has a special relationship with the location filter 122. Because of its accuracy and generally large scale, the suffix LDM 146 is the only LDM that can insert location determinants into the location filter 122, requiring that all other location determinants agree with the location determinant generated by the suffix LDM 146, or they are not permitted to pass onto the location synthesis process 124.

Similar to the Loc LDM 138, the likelihood of accuracy of the location determinant generated by the suffix LDM 146 is not considered to be circumstantial. Accordingly, the suffix LDM 146 attributes a static confidence factor for all location determinants that it returns. This static confidence factor may, for example, be 91.

Location Filter (122)

In general, the spectrum of LDM "intelligence" is fairly large and, as will be appreciated from the above description, ranges from the thorough, hard-working RegEx LDM 130, which may attempt to put a hostname with 'telco' in Telluride, Colo., to the precise Loc LDM 138, which may generate precise location determinants. While the location synthesis process 124, as will be described in further detail below, is intelligent enough to process a broader range of location determinants utilizing corresponding confidence factors, it is desirable to remove unreasonable location determinants from the location determinants that are forwarded to the location synthesis process 124 for consideration.

To this end, the suffix LDM 146, for example, has a very high success rate in geolocation of a plethora of hosts, especially foreign ones. While the suffix LDM 146 lacks the high precision to be used by itself, the location determinant produced thereby may, in one exemplary embodiment, be deployed as a "filter location determinant". Such a filter location determinant may, for example, be utilized by the location filter 122 to remove from the unified mapping process 61 location determinants that do not show a predetermined degree of correlation, agreement or consistency with the filter location determinant. A filter location determinant may, for example, be deployed to remove noise data, retaining a smaller, more manageable subset of location determinants that can be processed more quickly by the location synthesis process 124.

In one exemplary embodiment, the location filter 122 is tied directly to the suffix LDM 146. Because of the reliability and accuracy of the suffix LDM 146, the location determinant produced by this LDM 146 may be designated as the "filter location determinant".

Figure 24:
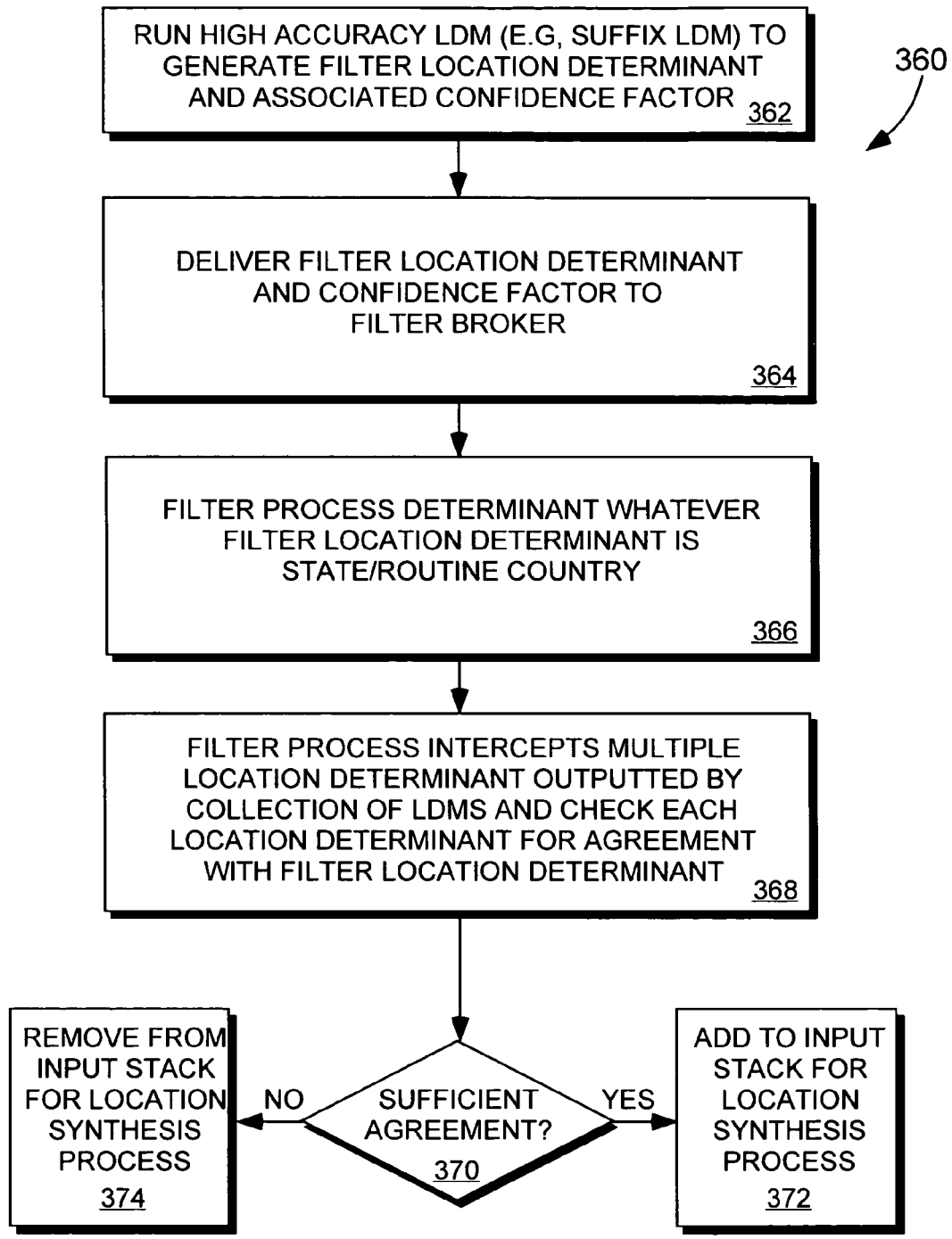
FIG. 24 is a flowchart illustrating a method, according to an exemplary embodiment of the present invention, of filtering location determinants received from a collection of LDMs utilizing a filter location determinants.

FIG. 24 is a flowchart illustrating a method 360, according to an exemplary embodiment of the present invention, of filtering location determinants received from the collection of LDMs utilizing a filter location determinant.

The method 360 commences at block 362 with the running of a high accuracy LDM (e.g., the suffix LDM 146) to generate the "filter location determinant" and optionally an associated confidence factor. At block 364, after the suffix LDM 146 has executed, the filter location determinant and confidence factor generated thereby are communicated to the location filter 122.

At block 366, the location filter 122 determines whether the received filter location determinant is a state or country. At block 368, the location filter 122 intercepts multiple location determinants outputted by the collection of LDMs and bound for the location synthesis process 124. The location filter 122 then checks to see if each of these location determinants adequately agrees with the filter location determinant. If they do, at block 372, the location determinants proceed onward to the location synthesis process 124 by being retained in an input stack being for this process 124. If they do not, at block 374, then the location determinants are removed from the input stack for the location synthesis process 124.

The agreement between the filter location determinant, and anyone of the multiple other location determinants received from the collection of LDMs, in one exemplary embodiment of the present invention, is a consistency between a larger geographic location (i.e., a location determinant of a relatively lower geographic location resolution) indicated by the filter location determinant and a more specific geographic location (i.e., a location determinant of a relatively higher geographic location resolution) that may be indicated by a subject location determinant. For example, location filter 122 may be effective in the debiasing of the United States data set. If the word 'london' is extracted from a hostname by way of the RegEx LDM 130, then the location synthesis process 124 may have a dozen or so 'Londons' to sort out. One is in the UK, and all the others are in the US. The confidence factors generated by the RegEx LDM 130 will reflect likelihood of correctness and highlight London, UK, as the best, but if there is a '.uk' at the end of the relevant hostname, then the location filter 122 can save the location synthesis process 124 from doing hundreds of thousands of extraneous operations.

Location Synthesis Process (126)

The collection 120 of LDMs can conceptually be thought of as a collection of independent, artificially intelligent agents that continuously look at data and use their respective artificial intelligences to make decisions. In the exemplary embodiment there are thus conceptually eight artificially intelligent agents mapping the Internet at relatively high speeds. An issue arises, however, in that there may be conflicts or disagreements in the results delivered by each of these artificially intelligent agents.

The collection 120 of different LDMs may disagree on any number of different levels. For example, two LDMs may return the same country and region, but different states and DMAs (Designated Marketing Areas). Alternatively, for example, one LDM may return a country only, while another LDM returns a city in a different country but on the same continent.

The unified mapping process 61, in one exemplary embodiment, includes the ability to analyze where the incoming location determinants agree, and where they disagree. From this analysis, the unified mapping process 61 operates to select the location determinant that has the highest likelihood of being correct. In order to perform this selection, the unified mapping process 61 includes the capability to assess the likelihood that it is correct.

To assist in the unified mapping process 61 with decision making, the LDMs provide associated confidence factors along with the location determinants, as described above. The confidence factors comprise quantitative values indicating levels of confidence that the LDMs have that the provided location determinants are in fact true. It should be noted that these confidence factors are not tied to any particular level of geographic granularity (or geographic resolution). In one exemplary embodiment of the present invention, the location synthesis process 124 operates to produce a separate confidence factor for each level of geographic resolution or granularity (e.g., country, state, etc.).

Figure 25:
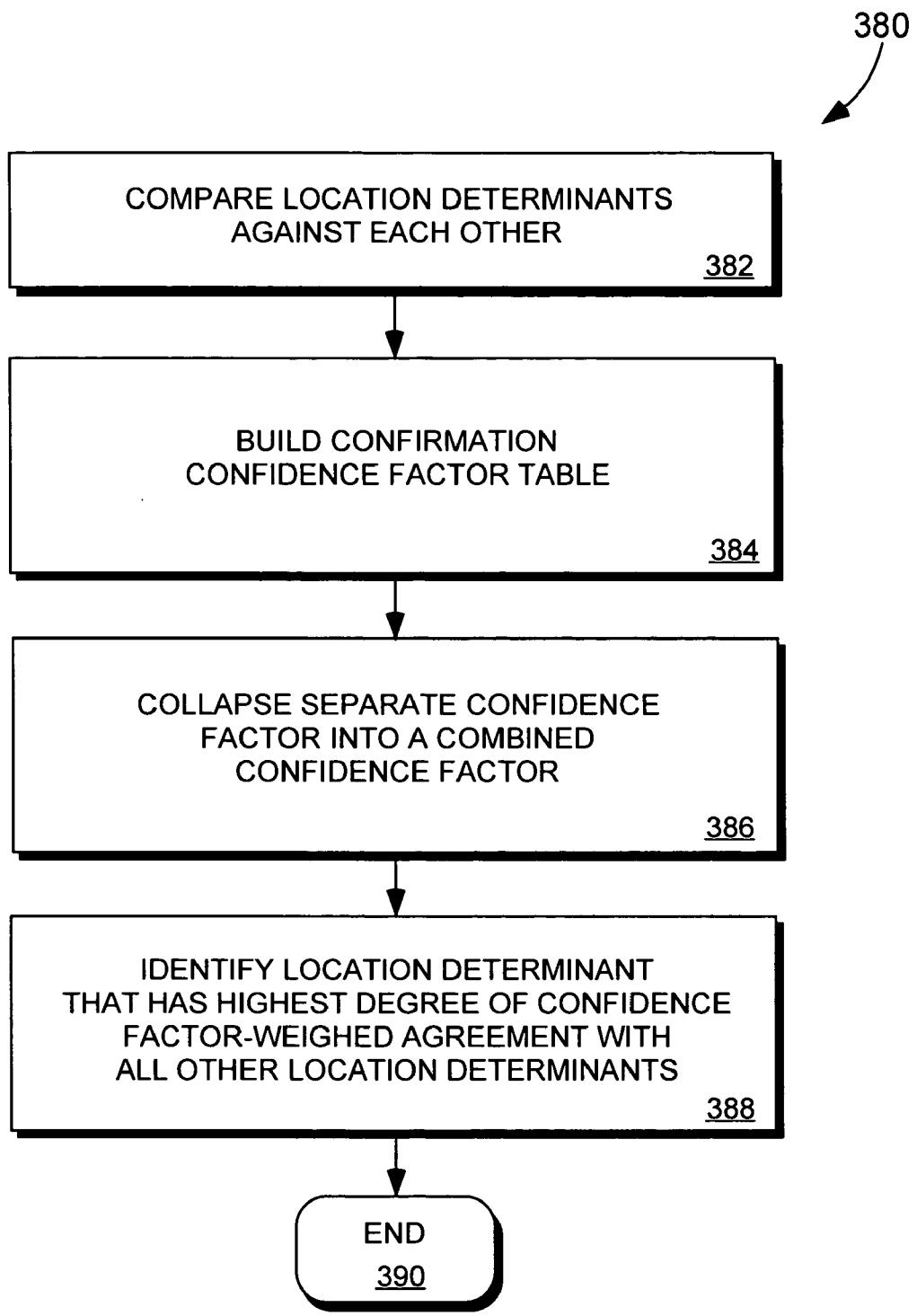
FIG. 25 is a flowchart illustrating a method, according to an exemplary embodiment of the present invention, performed by a location synthesis process to deliver a single location determinant that the unified mapping process has identified as a best estimate of a geographic location.

FIG. 25 is a flowchart illustrating a method 380, according to an exemplary embodiment of the present invention, performed by the location synthesis process 124 to deliver a single location determinant which the unified mapping process 61 has identified as being the best estimate of the "true" geographic location associated with any particular network address. An initial discussion provides a high-level overview of the method 380, with further details being provided below in the context of an illustrative example.

The method 380 commences at block 382, where the location synthesis process 124 compares every location determinant received from the location filter 122 against every other location determinant (where appropriate). At block 384, the location synthesis process 124 builds a confirmation confidence factor table. At block 386, the location synthesis process 124 collapses separate confidence factors into one or more confirmation confidence factors, and at block 388 chooses a single location determinant as the best estimate based on one or more confirmation confidence factors. The choice of the "best estimate" location determinant at block 388 is performed by identifying the location determinant that exhibits a highest degree of confidence factor-weighted agreement with all the other location determinants. A final table of confidence factors generated for the "best estimate" location determinant is reflective of that agreement. The method 380 then ends at block 390.

The location synthesis process 124 takes its input in the form of multiple sets of location determinants, as stated above. In one exemplary embodiment, a distinction is made between this method and a method of a flat set of all location determinants. The location determinants are provided to the location synthesis process 124 as multiple sets. The provision the location determinants in sets indicates to the location synthesis process 124 which location determinants should be compared against other. Specifically, efficiencies can be achieved by avoiding the comparison of location determinants within a common set, delivered from a common LDM.

To illustrate this issue, suppose that the RegEx LDM 130 extracts two strings, one that yields twenty (20) location determinants, and another that yields fifty (50). Also suppose that the LKH LDM 140 is able to generate a location determinant. Accordingly, in this example, a total of 71 location determinants require consideration by the location synthesis process 124. If the process 124 flatly compared all 71 against each other, this would result in (70+69+68+ . . . +3+2+1) 2485 comparisons. If, however each location determinant of each set can ignore all sibling location determinants of the same set, it will be appreciated that only (20*51+50*21+70) 2140 comparisons are required. A further advantage of considering LDMs in sets, in addition to the reduction in number of comparisons, is the set interpretation; location determinants generated from the exact same source should not, in one exemplary embodiment, be allowed to confirm one another.

Accordingly, at block 382 of the method 380 described above with reference to FIG. 25, the location synthesis process 124 iteratively compares each location determinant of each set with each location determinant of each other set. The comparison, in exemplary embodiment, because at a number of resolutions, for example:

1. Continent;
2. Country;
3. Region;
4. State;
5. DMA;
6. MSA;
7. PMSA; and
8. City.

These comparisons give rise to the confirmation confidence factor table, which is generated at block 384 of the method 380. The confirmation confidence factor table is a matrix of location determinants by geographic location resolution with their respective confirmation confidence factor. The confirmation confidence factor calculation can be interpreted as a calculation of the probability that any of the agreeing location determinants are correct, given that the associated confidence factors are individual probabilities that each is independently correct.

An illustrative example of the calculation of the confirmation confidence factor table, which uses a limited number of resolution levels and very few location determinants, is provided below. Table 4, below, illustrates an exemplary input of location determinants and associated confidence factors provided to the location synthesis process 124 from the location filter 122.

TABLE 4

Example input for the location synthesis process 124.
Post-Filter Location Synthesis Process Input (Location Determinants and associated Confidence Factors)

| Set 1 | Set 2 | Set 3 | Set 4 |
|---|---|---|---|
| New York, NY, USA [30] | Elizabeth, NJ, USA [25] | London, UK [20] | Newark, NJ, USA [50] |
| New York (ST), USA [25] | | | |

In this example, there are four input sets, each with one or more location determinants and a confidence factor for each location determinant. The initial (empty) confirmation confidence factor matrix takes the form of the Table 5 illustrated below:

TABLE 5

Initial confirmation confidence factor matrix.

| | Country | State | City |
|---|---|---|---|
| New York, NY, USA | | | |
| New York State, USA | | | |

TABLE 5-continued

Initial confirmation confidence factor matrix.

| | Country | State | City |
|---|---|---|---|
| Elizabeth, NJ, USA | | | |
| London, UK | | | |
| Newark, NJ, USA | | | |

Each element of the matrix is computed by comparing all relevant (no intra-set mingling) matches. For example, evaluating the country confidence factor for New York, N.Y., USA yields the following Table 6:

TABLE 6

Example Location Determinant Comparisons.

| Matches Country (always match self) | New York, NY, USA |
|---|---|
| Cannot Compare (same set) | New York State, USA |
| Matches Country | Elizabeth, NJ, USA |
| Does Not Match Country | London, UK |
| Matches Country | Newark, NJ, USA |

In order to collapse of the separate confidence factors into a combined confidence factor, at block 386 of the method 380 illustrated in FIG. 25, use is made of a confirmation confidence factor formula. An example of such a confirmation confidence factor formula is provided below:

If $mcf_i$ is the $i^{th}$ of n confidence factors from matching location determinants, then the confirmation confidence factor (CCF) is computed by:

$$CCF = 100 \times \left[1 - \prod_{i=1}^{n} \left(1 - \frac{mcf_i}{100}\right)\right]$$

In the illustrative example, New York City matches with itself, Elizabeth, and Newark at the country level (e.g., a first level of geographic resolution). Accordingly, utilizing the above confirmation confidence factor formula, the location synthesis process 124 combines these three associated confidence factors (30, 25, and 50) to deliver the following confirmation confidence factor:

CCF=100{1−[(1−0.30)(1−0.25)(1−0.50)]}

CCF=73.75

Confirmation confidence factors are, in this way, generated at a plurality of geographic resolutions (e.g., continent, country, state, city) by detecting correspondences between the location determinants at each of these geographic resolutions, and calculating the confirmation confidence factors for each of these geographic resolutions for each of the location determinants. Accordingly, utilizing the about calculation, the confirmation confidence factor table illustrated in Table 6 is populated as illustrated below in Table 7:

TABLE 6

Completed confirmation confidence factor table.

| | Country | State | City |
|---|---|---|---|
| New York, NY, USA | 73.75 | 30 | 30 |
| New York State, USA | 71.88 | 25 | NA |

TABLE 6-continued

Completed confirmation confidence factor table.

|  | Country | State | City |
|---|---|---|---|
| Elizabeth, NJ, USA | 80.31 | 62.5 | 25 |
| London, UK | 20 | 20 | 20 |
| Newark, NJ, USA | 80.31 | 62.5 | 50 |

It will be noted that the "state" and "city" confirmation confidence factors for the "New York, N.Y., USA" location determinant corresponded to the original, combined confirmation confidence factor (as generated by a LDM) for this location determinant, in view of the absence of any correspondence, or agreement, at the "state" and "city" geographic resolution levels for this location determinant. On the other hand, as two (2) agreement instances were detected for this location determinant at the "country" geographic resolution level, the confirmation confidence factor at this geographic resolution is higher than the original combined confirmation factor.

After the entire confirmation confidence factor table (or matrix) is generated at block 386, the location synthesis process 124 then has the task of identifying the "best estimate" location determinant at block 388. In the previous example, the correct answer is apparent from the combined confidence factor table. There is no better choice than Newark, N.J.; it is tied for first place on country and state levels, but it is first at the city level. However, consider the more complex examples in which one location determinant has the highest state confidence factor, but another has the highest DMA (Designated Marketing Area) confidence factor. To handle cases such as this, the location synthesis process 124 generates a combined confirmation confidence factor that is a linear combination of the constituent confirmation confidence factors.

For the purposes of generating the combined confirmation confidence factor, different weights may, in an exemplary embodiment, be assigned to each of a plurality of levels of geographic resolution. Exemplary weights that may be utilized in the linear combination of the confirmation confidence factors are provided below:

| | | |
|---|---|---|
| 1. | City | 30 |
| 2. | State | 20 |
| 3. | Country | 15 |
| 4. | Region | 10 |
| 5. | MSA | 0 |
| 6. | PMSA | 0 |
| 7. | DMA | 80 |
| 8. | Continent | 5 |

These exemplary weights are indicative of the importance and significance of agreement at a given level of geographic resolution. For example, the PMSA and MSA geographic resolutions each have a zero weight because of their close ties with the DMA and City geographic resolutions. Agreement at the continental geographic resolution level is common and easy to achieve, and this resolution level is weighted very low in the combined confirmation confidence factor. Because the DMA geographic resolution level is considered to be the most significant level in the exemplary embodiment, it is allocated the highest weight.

Any geographic resolution levels that are not available (e.g., foreign countries do not have DMAs) are not utilized in the averaging process, and accordingly neither detriment nor assist the combined confirmation confidence factor.

After the generation of the combined confirmation confidence factor, the location synthesis process 124 selects the largest valued combined confidence factor and uses that location determinant as the final result (i.e., the "best estimate" location determinant). The location synthesis process 124 returns the single "best estimate" location determinant, along with an associated LPT (Location Probability Table) that constitutes the relevant location determinant's row of the confirmation confidence factor table.

In an exemplary embodiment of the present invention, an LPT table (not shown) is maintained within the data warehouse 30 and stores the location probability tables generated for a block of network addresses (or for an individual network address). An exemplary LPT table entry is provided below as Table 7:

TABLE 7

LPT

| Column | Description |
|---|---|
| OCT1 | $1^{st}$ octet of the Network |
| OCT2 | $2^{nd}$ octet of the Network |
| OCT3 | $3^{rd}$ octet of the Network |
| OCT4 | $4^{th}$ octet of the Network |
| CONTINENT CODE | Continent code from the Continents Reference Table where the Network is located. |
| CONTINENT CONFIDENCE FACTOR | Confidence Factor Associated with the Identified Continent. |
| COUNTRY CODE | Country code from the Countries Reference Table where the Network is located. |
| COUNTRY CONFIDENCE FACTOR | Confidence Factor Associated with the Identified Country. |
| REGION CODE | Region code from the Regions Reference Table where the Network is located. This will be one of the Regions in the United States like Mid-West, West etc. |
| REGION CONFIDENCE FACTOR | Confidence Factor Associated with the Identified Region. |
| STATE CODE | State code or equivalent like Province Code, from the States Reference Table where the Network is located. |
| STATE CONFIDENCE FACTOR | Confidence Factor Associated with the Identified State. |
| DMA CODE | Designated Market Area Code in United States where the network is located. Applicable only for the networks in US |
| DMA CONFIDENCE FACTOR | Confidence Factor Associated with the Identified DMA |
| PMSA CODE | Primary Metropolitan Statistical Area Code in United States where the network is located. Applicable only for the networks in US. |
| PMSA CONFIDENCE FACTOR | Confidence Factor Associated with the Identified PMSA. |
| MSA CODE | Metropolitan Statistical Area Code in United States where the network is located. Applicable only for the networks in United States |
| MSA CONFIDENCE FACTOR | Confidence Factor Associated with the Identified MSA. |
| CITY CODE | City code from the Cities Reference Table where The Network is located |
| CITY CONFIDENCE FACTOR | Confidence Factor Associated with the Identified City. |
| ZIP CODE | ZIP CODE or equivalent of the location where the network is located. |

TABLE 7-continued

LPT

| Column | Description |
| --- | --- |
| ZIP CONFIDENCE FACTOR | Confidence Factor Associated with the Identified ZIP CODE |
| AREA CODE | Telephone Area Code of the location where the network is located. Applicable to United States networks. |
| AREA CODE CONFIDENCE FACTOR | Confidence Factor Associated with the Identified AREA CODE |
| LATUTUDE | Latitude of the location where the network is located. |
| LONGITUDE | Longitude of the location where the network is located. |
| TIMEZONE | Time Zone of location where the network is located. |

Confidence Accury Translator (126)

In one exemplary embodiment, in order to assist in the interpretation of the end data, the unified mapping process 61 outputs the "best estimate" location determinant together with a full Location Probability Table (LPT) (i.e., the end result 128 illustrated in FIG. 11). The values of the location probability table are the probabilities that the given location is correct at a number of geographic location resolution levels (or granularities). The location synthesis process 124 does return an application probability table, and while the values in that are self-consistent and relatively meaningful, they are not location probabilities in the formal sense.

In the exemplary embodiment, a translation is provided so that when a customer gets a result that is reported with a "90" confidence factor, the customer can know that if 100 records all with 90 confidence factor were pulled at random, roughly 90 of them would be correct. This translation function is performed by the confidence accuracy translator 126

Accuracy cannot be inferred by a single observation. A single observation is either right or wrong. It is only by looking at aggregate correctness that assertions can be made about accuracy.

Figure 26:
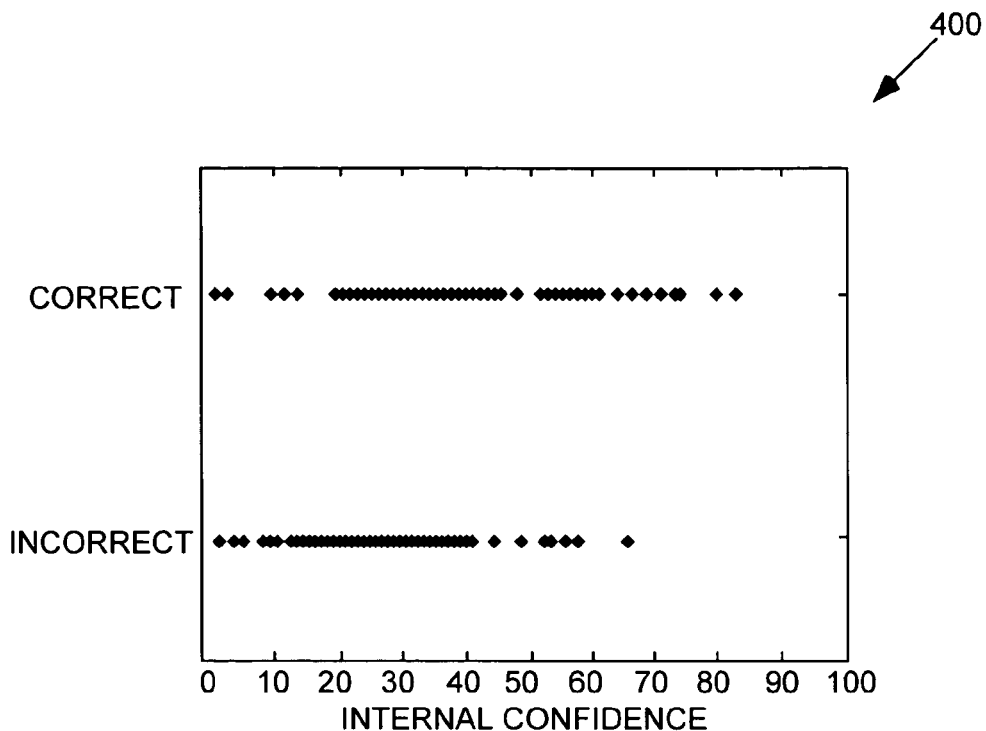
FIG. 26 is a graph illustrating correctness of location determinants, as a function of a post-location synthesis process confidence factor.

FIG. 26 is a graph 400 illustrating correctness of location determinants, as a function of post-location synthesis process confidence factor. It will be noted from the graph 400 that, in general, incorrect responses are generally given low confidence factors, and the higher confidence factors are generally associated with more correctness. To formalize this relationship, a moving average can be used to infer the rough relationship between confidence factors and accuracy.

Figure 27:
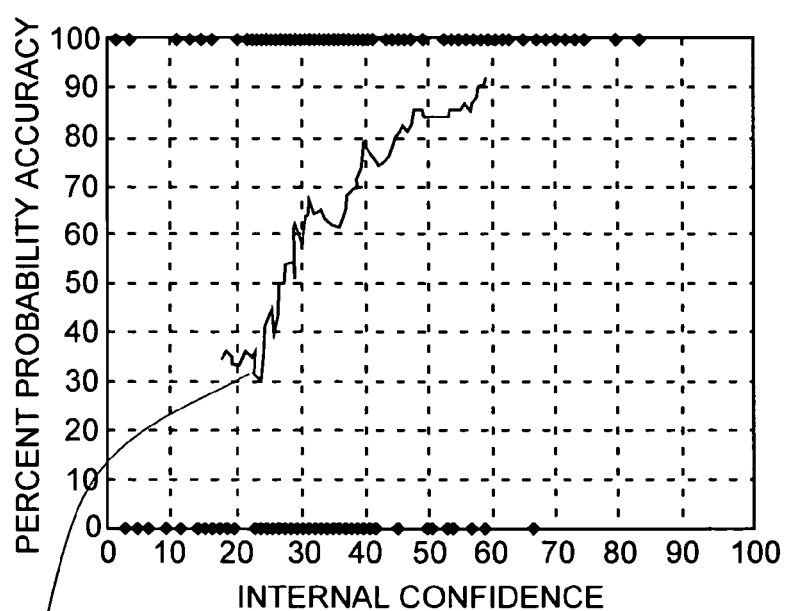
FIG. 27 is a graph illustrating correctness of location determinants as a function of post-location synthesis process confidence factor, and a smoothed probability of correctness given a confidence factor range.

FIG. 27 is a graph 402 illustrating correctness of location determinants as a function of post-LSP confidence factor, and the smoothed probability of correctness given a confidence factor range. In FIG. 27, a curve 404 is a 41-point moving average, representing the probability that the given responses in that confidence factor neighborhood are right. Again, it has the desired shape. Low confidence factors are associated with low accuracy, and conversely, high confidence factors are associated with high accuracy. Through this, it is clear that carrying the confidence factors throughout the unified mapping process 61 is beneficial, because, in this way, not only can the unified mapping process 61 generally be skillful, but it can know when it is less skillful. What remains, however, is the final translation of post-location synthesis process confidence factors into probabilistically meaningful confidence factors.

This translation is represented by the curve 404 of FIG. 27. To avoid over-fitting to the noise of the function, the confidence accuracy translator 126 uses a piecewise linear approximation of the function by binning the data into equally sized, disjoint confidence factor bins.

Figure 28:
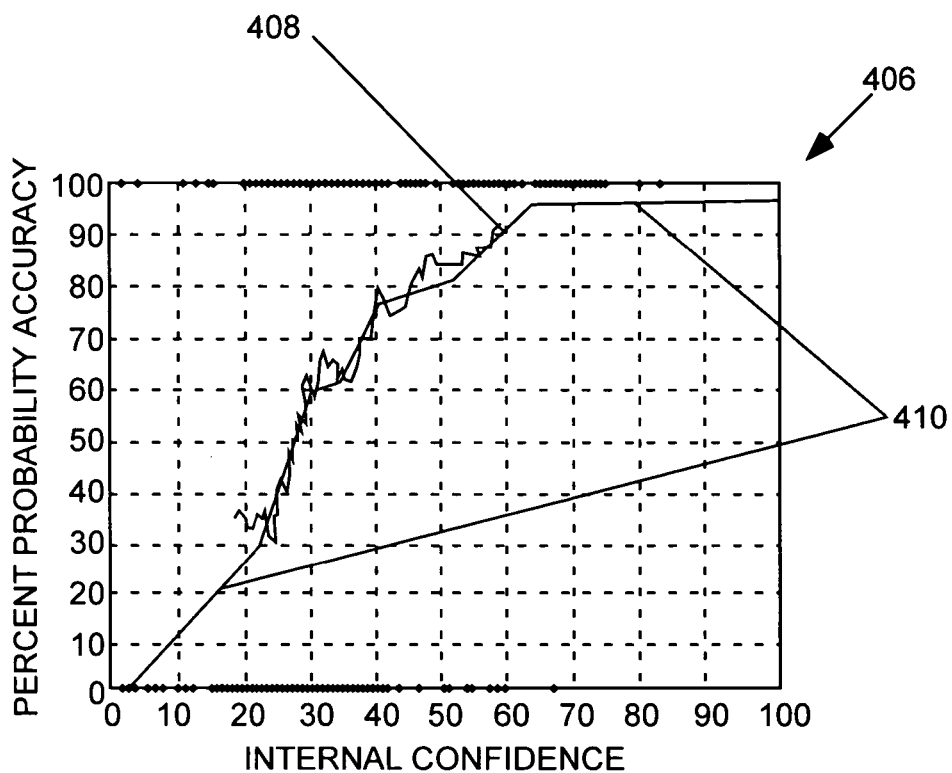
FIG. 28 is a graph illustrating correctness of location determinants as a function of a post-location synthesis process confidence factor, and a smoothed probability of correctness given a confidence factor range.

FIG. 28 is a graph 406 illustrating correctness of location determinants as a function of post-LSP confidence factor, and the smoothed probability of correctness given a confidence factor range with picewise linear approximation. As shown in FIG. 28, a curve 408 is the approximation of the confidence factor-Accuracy relationship generated with each abscissa being the average confidence factor of the bin and each ordinate being the number of accuracy within the bin. Accordingly, the curve 408 can be and is used as an interpolation scheme for unified mapping process 61 to make the needed translation.

While interpolation is a fairly low-risk method for inferring information, extrapolation can provide incorrect data. Note from FIG. 28 that there is insufficient data with confidence factor less than 20 or greater than 65 to establish a significant relationship. Yet, the required robust translation must account for any confidence factor in the valid range of 0 to 100. In this way, the confidence accuracy translator 126 is forced to extrapolate, but does so in a restraint manner. Erring on the side of less expected accuracy, the confidence accuracy translator 126 introduces two new points to the interpolation scheme: [0,0], and [100,max($CF_{avg}$)]. This implies that if the location synthesis process 124 returns with a zero confidence factor, it is incorrect and that if it returns with any confidence factor greater than the maximum of the binned interpolation nodes, then it has precisely the same accuracy as the best bin.

Figure 29:
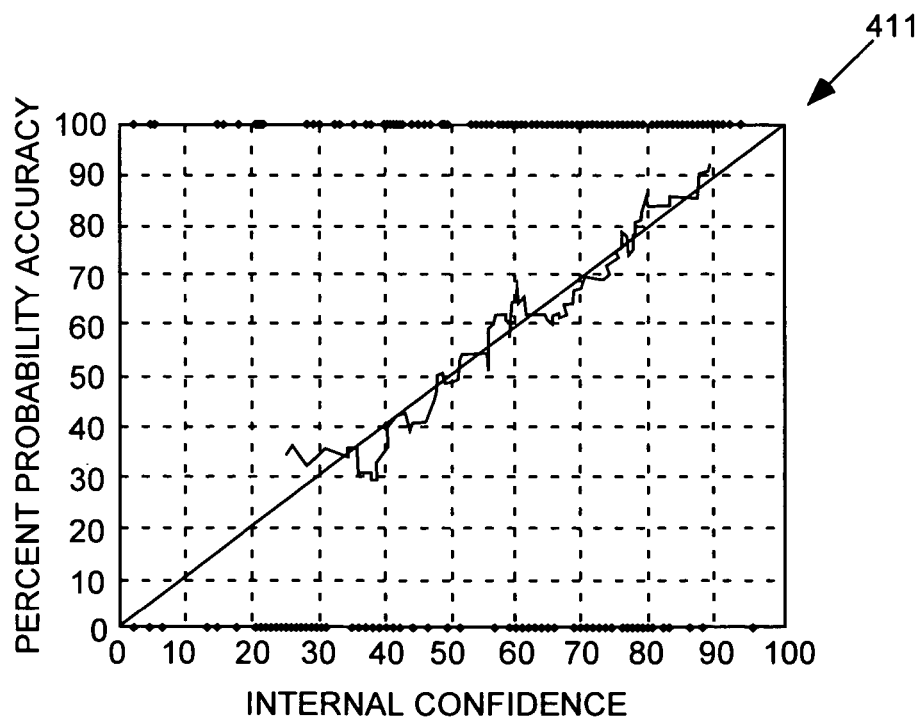
FIG. 29 is a graph illustrating correctness of location determinants as a function of a post-confidence accuracy translation confidence factor, and a smoothed probability of correctness.

These artificial extrapolations (shown at 410 in FIG. 28) will make the accuracy over the unified mapping process 61 appear lower than it really is. Combining the curves 408 and 410, the entire set of confidence factors can now be translated. This translation is illustrated in FIG. 29. More specifically, FIG. 29 shows a graph 411 plotting correctness of location determinants as a function of post-CAT confidence factor, and the smoothed probability of correctness. Final results of the post-CAT confidence factors are compared against the actual accuracy in FIG. 29. As can be noted, there is a strong correlation, thus giving the final confidence factor the probabilistic meaning that is useful to end users to make meaningful decisions. While there is strong correlation, it should be noted that this is a general relationship and that, while pulling a random subset and verifying should yield comparable results, data may be noisy, and some populations may show disparities between confidence and real accuracy.

A number of further algorithms are now described. These further algorithms may be deployed in alternative embodiments of the present invention, and in conjunction with any of the algorithms (e.g., LDMs) discussed above.

Latitude and Longitude Matching

In one embodiment of the present invention, a latitude and longitude matching process may be utilized used to assist in the determination the geographic location of a given record. Only a network address (e.g., and IP address) is required for the longitude and latitude matching process to be successful. However, additional information, such as the owner's location, or proximal routers, may be utilized to achieve a higher probability of success.

The geographic locations identified by the longitude and latitude matching is utilized to compute distances, using this information to determine accuracy of a given record. The information is compared with previous "hops" of the traceroute to the host. If the route forms a predictable pattern, a confidence factor maybe be increased.

Launching traces from network and geographically disperse locations, algorithms may compute the similarity of each trace, arriving at a final confidence factor ranking. The higher the ranking, the more likely the location attempt was successful.

EXAMPLE 1

The last four hops in a traceroute form a distal-proximal relationship, meaning that the next hop is geographically closer to its next successive hop:
Hop 5 is closer to hop 6
Hop 6 is closer to hop 7
Hop 7 is closer to hop 8

Thus, the traced route geographically progresses toward the final hop 8, leading to a decision that the destination is located within a certain range of accuracy.

EXAMPLE 2

The point of origin is Denver, Colorado, and the destination is Salt Lake City, Utah. The last four hops indicate a connection that is back-hauled through Denver, Colo., essentially geographically backtracking the route taken:
1 Denver Router
2 Grand Junction Router
3 Provo Utah Router
4 Salt Lake City Router
5 Salt Lake City Router
6 Denver Router
7 Provo Utah Router
8 Salt Lake City Router
9 Salt Lake City Destination This example indicates a geographic progression away from Denver toward Utah, directly back to Denver, and finally directly back to Utah with a destination that does not leave Utah. Thus, a human may assume that even though the route taken was very indirect, it did terminate in Utah. Using Latitude/Longitude coordinates, the data collection agents 18 will see the same scenario and arrive at an intelligent conclusion.

Triangulation

Using a translation process, in one exemplary embodiment of the present invention, an approximate radius containing the target network address be generated. Launching a latitude/longitude route discovery from geographically disperse locations, the final destination will likely proceed through the same set of routers. Thus, if the final 3 hops leading up to the point of entry into the destination network are proximal, or at the very least, form a line toward the destination's point of entry, one may assume that the destination resides within the common latitude/longitude coordinates. Using the attitude/latitude coordinates of other known landmarks allows a radius to be computed. Within this radius, metro areas and large cities will be known.

EXAMPLE

A traceroute is launched from the East Coast, the West Coast, and the North West. Route progression from the East Coast indicates a westward path, terminating in Texas. Route progression from the West Coast indicates an eastward path, terminating in Texas. Route progression from the North West indicates an eastward path, terminating in Texas.

Being that all routes terminated in Texas, and the associated record for the target indicates a Texas-based owner, specifically, Dallas, one may assume that in fact, the target resides in the DFW metro area.

Triangulation is the technique of using traceroutes originating from geographically widely separated locations and using the results to extrapolate a possible location for the target network address.

Once all the traceroutes have been completed, a general direction (e.g. Northward, Eastward) may be extrapolate from the traceroutes using knowledge of the locations of the routers in the traceroute. This can then be used to place bounds on the possible location by creating an intersection of all traceroutes. For example, a traceroute going East from San Francisco, West from New Jersey is probably somewhere in the Central time zones. Directions for the traceroutes can be inferred by subtracting the geographical locations of the originating network address from those of the latest router in the trace that has a known location. Additionally, information about the number of hops in the traceroutes can be used to obtain estimates of distance.

Because a number of traceroutes should be obtained for each target network address, an infrastructure is in place to distribute these requests. One exemplary manner of implementing the system is to have a single script on a single machine make "rsh" calls to remote machines to obtain the traceroutes. This avoids they need for buffering and synchronization (these are pushed off to the operating system calls that implement the blocking for the rsh command). The machines used may actually be the same machines as used for the dialup method. These are already connected to ISPs at widely separated locations.

In addition to a confidence factor, a translation process may also generate a resolution indication. This will depend on:

If all the traces seem to be going in the same direction. If so the resolution is low (do the trigonometry).

The number of traces available. The more traces, the higher the resolution.

The variance in the distances obtained. Each trace will result in a circle around the predicted point according to the expected variance in the distance. The intersection of these circles dictates the probable location. The area of the intersection dictates the resolution (the larger the area the lower the resolution). The distance scale and the variances can only be calibrated using experimental results from known locations.

Computer System

Figure 30:
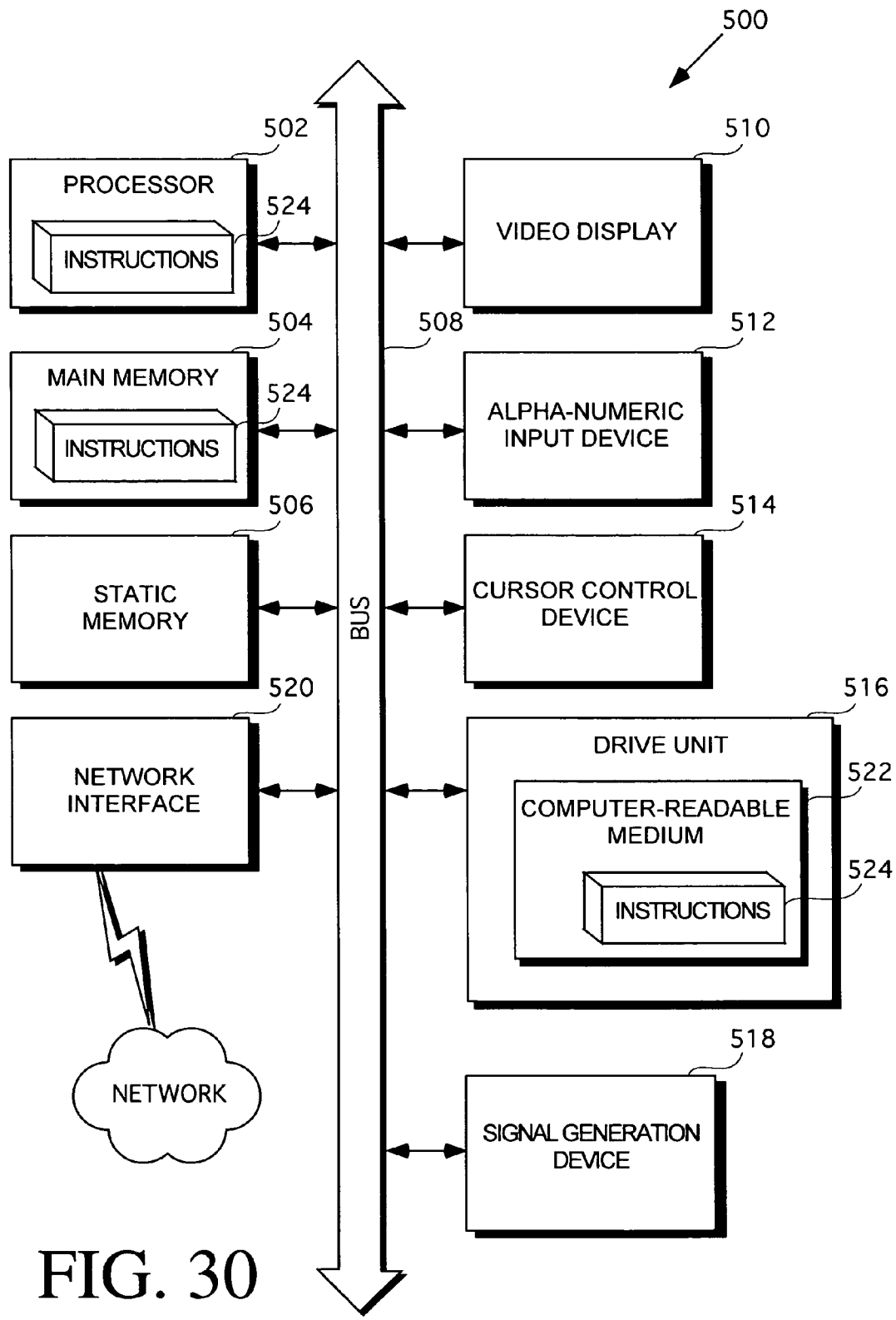
FIG. 30 shows a diagrammatic representation of a machine in exemplary form of a computer system within which a set of instructions, for causing the machine to perform any of the methodologies discussed above, may be executed.

FIG. 30 shows a diagrammatic representation of machine in the exemplary form of a computer system 500 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g. a keyboard), a cursor control device 514 (e.g. a mouse), a disk drive unit 516, a signal generation device 518 (e.g. a speaker) and a network interface device 520.

The disk drive unit 516 includes a machine-readable medium 522 on which is stored a set of instructions (i.e., software) 524 embodying any one, or all, of the methodologies described above. The software 524 is also shown to reside, completely or at least partially, within the main memory 504 and/or within the processor 502. The software 524 may further be transmitted or received via the network interface device 520. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system to initiate geolocation activities on demand have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to perform geolocation activities relating to a network address, the method including:
   receiving, at a geolocation system, a query, including a network address, from an external entity; and
   responsive to receipt of the query, initiating geolocation activities at the geolocation system to map the network address to a geographic location associated with the network address, wherein the network address is advanced sequentially through a plurality of sequential automated mapping operations to derive satisfactory geolocation information associated with the network address and associated location probability information,
   wherein the geolocation activities include tasking a plurality of data collection machines to collect data pertaining to the network address and mapping the network address to the geographic location based on the collected data.

2. The method of claim 1, wherein the query is received from the external entity responsive to a user accessing a website operated by the external entity, and the network address is the network address associated with a machine of the user.

3. The method of claim 1, wherein the query is received via an Application Program Interface (API).

4. The method of claim 1, wherein the query is received via a customer extranet.

5. The method of claim 1, wherein the mapping includes determining whether the network address is likely to fall within a consolidated domain of network addresses maintained within a database of the geolocation system.

6. The method of claim 5, wherein the consolidated domain of network addresses maintained within the database includes any one of a group of domains including an educational, business, service provider and government domain.

7. The method of claim 1, wherein the mapping includes identifying a network address block around the network address included within the query.

8. The method of claim 1, wherein the mapping includes running an exact geolocation process to determine geolocation information for the network address.

9. The method of claim 7, wherein the mapping includes running an exact geolocation process to determine geolocation information for the identified network address block around the network address.

10. The method of claim 8, wherein the exact geolocation process includes any one of a group of geolocation processes including a traceroute, a latency calculation, a hostname matching operation and a DNS process.

11. The method of claim 1, wherein the mapping includes running an inexact geolocation process to determine geolocation information for the network address.

12. The method of claim 1, wherein the mapping includes forwarding the network address for manual resolution.

13. The method of claim 1, wherein the mapping includes a tiered process, including the plurality of sequential automated mapping operations.

14. The method of claim 13, wherein the tiered process further includes at least one manual mapping operation, wherein the network address is advanced sequentially though the plurality of sequential automated mapping operations and to the at least one manual mapping operation until satisfactory geolocation information is associated with the network address.

15. The method of claim 13, wherein the plurality of sequential automated mapping operations include both exact and inexact automated mapping operations, the exact and inexact automated mapping operations providing different levels of confidence for geolocation information associated with the network address by the respective operations.

16. A geolocation system to perform geolocation activities relating to a network address, the geolocation system including:
   a first system to receive, at the geolocation system, a query, including a network address, from an external entity; and
   a second system, coupled to the first system and responsive to receipt of the query by the first system, to initiate geolocation activities to map the network address to a geographic location of the network address, wherein the network address is advanced sequentially through a plurality of sequential automated mapping operations to derive satisfactory geolocation information associated with the network address and associated location probability information,
   wherein the geolocation activities include tasking a plurality of data collection machines to collect data pertaining to the network address and mapping the network address to the geographic location based on the collected data.

17. The geolocation system of claim 16, wherein the query is received by the first system from the external entity responsive to a user accessing a website operated by the external entity, and the network address is the network address associated with a machine of the user.

18. The geolocation system of claim 16, including an Application Program Interface (API) via which the query is received by the first system.

19. The geolocation system of claim 16, including a customer extranet via which the query is received by the first system.

20. The geolocation system of claim 16, wherein the second system is to determine whether the network address is likely to fall within a consolidated domain of network addresses maintained within a database of the geolocation system.

21. The geolocation system of claim 20, wherein the consolidated domain of network addresses maintained within the database includes any one of a group of domains including an educational, business, service provider and government domain.

22. The geolocation system of claim 16, wherein the second system is to identify a network address block around the network address included within the query.

23. The geolocation system of claim 16, wherein the second system is to run an exact geolocation process to determine geolocation information for the network address.

24. The geolocation system of claim 22, wherein the second system is to run an exact geolocation process to determine geolocation information for the identified network address block around the network address.

25. The geolocation system of claim 23, wherein the exact geolocation process includes any one of a group of geolocation processes including a traceroute, a latency calculation, a hostname matching operation and a DNS process.

26. The geolocation system of claim 16, wherein the second system is to run an inexact geolocation process to determine geolocation information for the network address.

27. The geolocation system of claim 16, wherein the second system is to forward the network address for manual resolution.

28. The geolocation system of claim 16, wherein the second system is to implement a tiered process, including the plurality of sequential automated mapping operations.

29. The geolocation system of claim 28, wherein the second system is to implement at least one manual mapping operation, wherein the network address is advanced by the second system through the plurality of sequential automated mapping operations and to the at least one manual mapping operation until satisfactory geolocation information is associated with the network address.

30. The geolocation system of claim 28, wherein the plurality of sequential automated mapping operations include both exact and inexact automated mapping operations, the exact and inexact automated mapping operations providing different levels of confidence for geolocation information associated with the network address by the respective operations.

31. A machine-readable medium storing a set of instructions that, when executed by a machine, cause the machine to implement a method to perform geolocation activities relating to a network address, the method including:
   receiving, at a geolocation system, a query, including the network address, from an external entity; and
   responsive to receipt of the query, initiating geolocation activities at a geolocation system to map the network address to a geographic location associated with the network address, wherein the network address is advanced sequentially through a plurality of sequential automated mapping operations to derive satisfactory geolocation information associated with the network address and associated location probability information, wherein the geolocation activities include tasking a plurality of data collection machines to collect data pertaining to the network address and mapping the network address to the geographic location based on the collected data.

32. A geolocation system to perform geolocation activities relating to a network address, the system including:
   first means for receiving a query, at the geolocation system, including a network address, from an external entity; and
   second means, coupled to the first means and responsive to receipt of the query by the first means, for initiating geolocation activities to map the network address to a geographic location of the network address, wherein the network address is advanced sequentially through a plurality of sequential automated mapping operations to derive satisfactory geolocation information associated with the network address and associated location probability information,
   wherein the geolocation activities include collecting data pertaining to the network address and mapping the network address to the geographic location based on the collected data.

* * * * *

UNITED STATES PATENT AND TRADEMARK OFFICE
CERTIFICATE OF CORRECTION

PATENT NO. : 7,472,172 B2
APPLICATION NO. : 10/686102
DATED : December 30, 2008
INVENTOR(S) : Anderson et al.

It is certified that error appears in the above-identified patent and that said Letters Patent is hereby corrected as shown below:

On the Title page, in field (75), in "Inventors", in column 1, line 2, delete "Cupertino," and insert -- San Jose, --, therefor.

On Sheet 1 of 64, in FIG.1A (Box. 7), line 1, delete "GEOLOGATION" and insert -- GEOLOCATION --, therefor.

On Sheet 12 of 64, in FIG. 9B (Box. 94), line 1, delete "INSET" and insert -- INSERT --, therefor.

On Sheet 12 of 64, in FIG. 9B (Box. 96), line 1, delete "INSET" and insert -- INSERT --, therefor.

In column 5, line 24, delete "toga" and insert -- to a --, therefor.

In column 7, line 9, delete "the," and insert -- the --, therefor.

In column 7, line 42, after "shown)" insert -- . --.

In column 9, line 25, after "database" insert -- . --.

In column 31, line 4, after "size" insert -- . --.

In column 32, line 63, after "com)" insert -- . --.

In column 43, line 3, after "however" insert -- , --.

In column 46, line 4, delete "selects-the" and insert -- selects the --, therefor.

In column 47, line 21, delete "Accury" and insert -- Accuracy --, therefor.

In column 47, line 38, after "126" insert -- . --.

In column 48, line 9, delete "picewise" and insert -- piecewise --, therefor.

In column 49, line 2, after "maybe" delete "be".

UNITED STATES PATENT AND TRADEMARK OFFICE
CERTIFICATE OF CORRECTION

PATENT NO.         : 7,472,172 B2
APPLICATION NO.    : 10/686102
DATED              : December 30, 2008
INVENTOR(S)        : Anderson et al.

It is certified that error appears in the above-identified patent and that said Letters Patent is hereby corrected as shown below:

In column 52, line 19, in Claim 14, delete "though" and insert -- through --, therefor.

Signed and Sealed this

Seventeenth Day of March, 2009

JOHN DOLL
*Acting Director of the United States Patent and Trademark Office*